US012638327B2

(12) United States Patent
Yokono et al.

(10) Patent No.: US 12,638,327 B2
(45) Date of Patent: May 26, 2026

(54) WEIGHING SALES SYSTEM AND WEIGHING DEVICE

(71) Applicant: Teraoka Seiko Co., Ltd., Tokyo (JP)

(72) Inventors: Syuusaku Yokono, Tokyo (JP);
Tsutomu Yamada, Tokyo (JP)

(73) Assignee: Teraoka Seiko Co., Ltd., Tokyo (JP)

( * ) Notice: Subject to any disclaimer, the term of this patent is extended or adjusted under 35 U.S.C. 154(b) by 273 days.

(21) Appl. No.: 18/350,115

(22) Filed: Jul. 11, 2023

(65) Prior Publication Data

US 2023/0349749 A1     Nov. 2, 2023

Related U.S. Application Data

(63) Continuation of application No. PCT/JP2022/003076, filed on Jan. 27, 2022.

(30) Foreign Application Priority Data

| Apr. 7, 2021 | (JP) | ................................. 2021-065265 |
| Jun. 29, 2021 | (JP) | ................................. 2021-107787 |
| Nov. 18, 2021 | (JP) | ................................. 2021-188107 |
| Nov. 19, 2021 | (JP) | ................................. 2021-188320 |

(51) Int. Cl.
*G01G 19/414*        (2006.01)
*G06Q 20/20*        (2012.01)

(52) U.S. Cl.
CPC ....... *G01G 19/4144* (2013.01); *G06Q 20/201* (2013.01); *G06Q 20/208* (2013.01)

(58) Field of Classification Search
CPC ............... G06Q 20/201; G06Q 20/208; G06Q 10/087; G01G 19/4144
See application file for complete search history.

(56) References Cited

U.S. PATENT DOCUMENTS

| 2010/0001019 A1 | 1/2010 | Sollazzo |
| 2018/0218562 A1* | 8/2018 | Conway ................. A47F 1/035 |

FOREIGN PATENT DOCUMENTS

| CN | 104200569 A | 12/2014 |
| JP | 2001-317990 A | 11/2001 |
| JP | 2007-225551 A | 9/2007 |

(Continued)

OTHER PUBLICATIONS

Partial Supplementary European Search Report issued in corresponding European Application No. 22784310.9, issued Jan. 16, 2025 (19 pages).

(Continued)

*Primary Examiner* — Ariel J Yu
*Assistant Examiner* — Denisse Y Ortiz Roman
(74) *Attorney, Agent, or Firm* — Osha Bergman Watanabe & Burton LLP

(57) ABSTRACT

A weighing sales system includes: a plurality of weighing devices that weigh articles; and an information terminal. Each of the weighing devices includes: a weighing device processor that: detects a weight of the articles, and transmits the detected weight and identification information of each of the weighing devices, and the information terminal includes: a terminal processor that: receives the detected weight and the identification information, and acquires article information from a predetermined storage based on the identification information.

7 Claims, 37 Drawing Sheets

(56) References Cited

FOREIGN PATENT DOCUMENTS

JP          2018-151383  A       9/2018

OTHER PUBLICATIONS

International Search Report issued in corresponding International Application No. PCT/JP2022/003076 mailed Mar. 22, 2022 (5 pages).
Written Opinion issued in corresponding International Application No. PCT/JP2022/003076 mailed Mar. 22, 2022 (4 pages).
First Office Action issued in corresponding Chinese Application No. 202280027505.X, dated Mar. 21, 2026 (18 pages).

* cited by examiner

FIG. 8

| Article identification information | Name of article | Weighing classification | Unit price | Unit weight (g) |
|---|---|---|---|---|
| SH001 | AAA | 0 (non-fixed price) | 250 | 100 |
| SH002 | BBB | 0 (non-fixed price) | 225 | 100 |
| SH003 | CCC | 0 (non-fixed price) | 310 | 100 |
| SH004 | DDD | 0 (non-fixed price) | 240 | 100 |
| ... | .... | ... | ... | ... |
| SH103 | ABC | 1 (fixed price) | 90 | 80 |
| SH104 | ABD | 1 (fixed price) | 70 | 50 |
| ... | ... | ... | ... | ... |

FIG. 24A

Display details of each behavior mode

| Behavior mode | Display details | | |
|---|---|---|---|
| | Unit price | Purchase amount | Sales price |
| Mode A | Second unit price | Converted amount in which the weight difference is converted to the second unit weight | Calculated monetary amount based on first unit price and weight difference (calculated monetary amount based on second unit price and converted amount) |
| Mode B | First unit price | Weighed weight | Calculated monetary amount based on first unit price and weighed weight |

FIG. 24B

Display details of each behavior mode

| Behavior mode | Display details | | |
|---|---|---|---|
| | Unit price | Purchase amount | Sales price |
| Mode C | Second unit price | Converted amount in which the weighed weight is converted to the second unit weight | Calculated monetary amount based on first unit price and weighed weight (calculated monetary amount based on second unit price and converted amount) |
| Mode D | First unit price | Difference weight | Calculated monetary amount based on first unit price and weight difference |

FIG. 25

Stored information

| Weighing device identification information | Current behavior mode | First weighed weight (standard weight) | Second weighed weight | Warning weight |
|---|---|---|---|---|
| K001 | A | 2040(g) | — | 200(g) |

| First unit weight | First unit price | Second unit weight (1 spoonful) | Second unit price (1 spoonful) |
|---|---|---|---|
| 100(g) | 500(yen/100g) | 20 (g/spoon) | 100 (yen/spoon) |

FIG. 27B
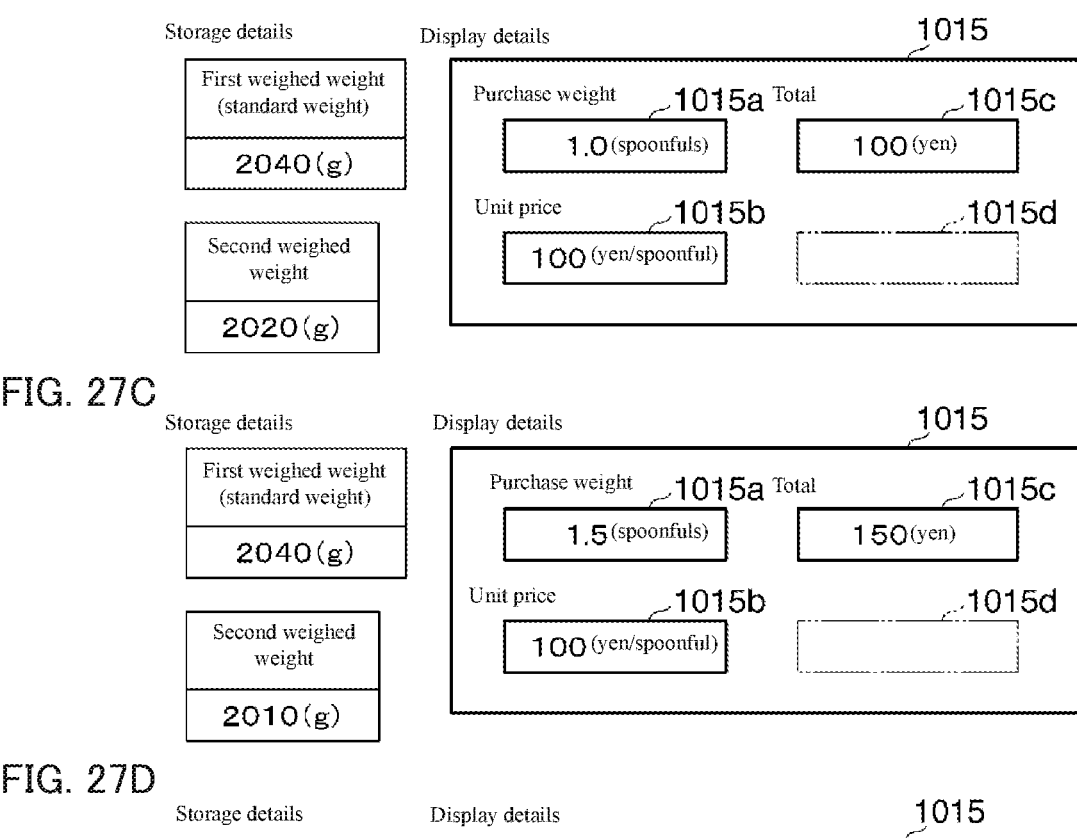
FIG. 27C
FIG. 27D
FIG. 28
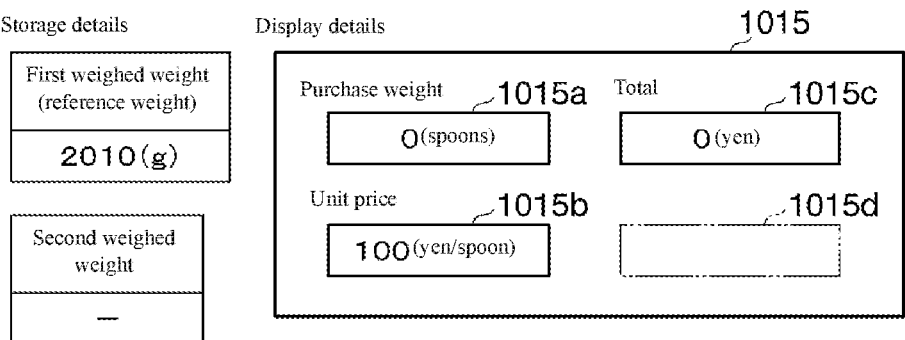

WEIGHING SALES SYSTEM AND WEIGHING DEVICE

CROSS-REFERENCE TO RELATED APPLICATION

The present application is a continuation application of International Application No. PCT/JP2022/003076 filed on Jan. 27, 2022, and claims priority to Japanese Patent Application No. 2021-065265 filed on Apr. 7, 2021, Japanese Patent Application No. 2021-107787 filed on Jun. 29, 2021, Japanese Patent Application No. 2021-188107 filed on Nov. 18, 2021, and Japanese Patent Application No. 2021-188320 filed on Nov. 19, 2021, all of which are incorporated by reference in entirely.

BACKGROUND

Technical Field

The present invention relates to art for supplying any amount of articles.

Description of the Related Art

Due to, inter alia, loss from food waste, there is an increasing tendency to recommend sales utilizing selling by weight, whereby only a necessary amount is purchased. In conjunction therewith, self-weighing sales, whereby a customer per se makes a purchase, are also being reexamined, and further improvements in operability are being sought.

Here, as illustrated in patent literature 1, a system is known of calculating a monetary amount by weighing a product or other articles.

Patent Literature 1: JP 2001-317990 A

However, in the above system, operability is low, and a weighing sales system that can be easily operated by a customer and that realizes operability providing a high degree of freedom is sought.

SUMMARY

One or more embodiments of the present invention provide a weighing sales system that can provide any amount of articles.

A weighing sales system of one or more embodiments of the present invention is provided with: a plurality of weighing devices that weigh articles; and an information terminal; wherein the weighing device is provided with a detection processing unit for detecting a weight of the articles and a first communication processing unit for transmitting the detected weight of the articles and predetermined identification information, and the information terminal is provided with a second communication processing unit for receiving the weight of the articles and the predetermined identification information and an article information acquisition unit for acquiring article information from a predetermined storage on the basis of the predetermined identification information.

BRIEF DESCRIPTION OF DRAWINGS

FIG. 8 shows a diagram illustrating an example of information stored in an article information storage unit.

FIG. 18C shows an exploded perspective diagram of another weighing device illustrating a second member and the like.

FIG. 24A shows an explanatory diagram describing operation modes of the weighing device.

FIG. 24B shows an explanatory diagram describing operation modes of the weighing device.

FIG. 25 shows an example of information stored by the weighing device.

FIG. 27B shows an explanatory diagram describing display and the like of the weighing device.

FIG. 27C shows an explanatory diagram describing display and the like of the weighing device.

FIG. 27D shows an explanatory diagram describing display and the like of the weighing device.

FIG. 28 shows an explanatory diagram describing a status indicator.

DETAILED DESCRIPTION OF EMBODIMENTS

First Embodiment

Summary

Figure 1:
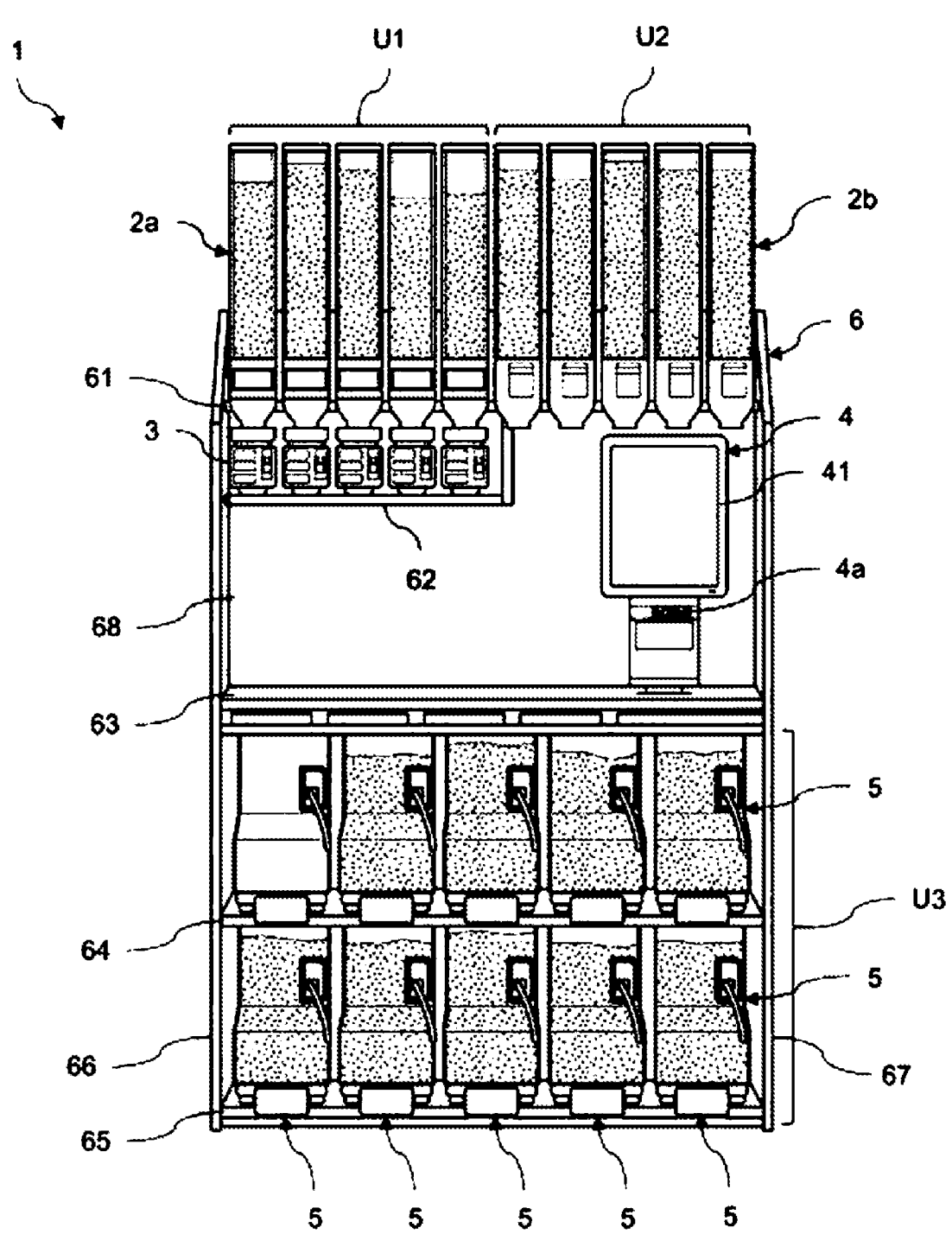
FIG. 1 shows an external perspective diagram of a weighing sales system according to a first embodiment of the present invention.

Below, a weighing sales system and weighing device constituting the weighing sales system according to a first embodiment of the present invention is described with reference to drawings. FIG. 1 is an external perspective diagram of a weighing sales system (may also be referred to as a "sales processing system" as in a sales processing system 1001 according to a second embodiment) 1 according to the first embodiment of the present invention. The weighing sales system 1 is a system for selling articles (product) by weight in response to an operation from a customer. The articles sold by weight using the weighing sales system 1 are foods such as dry fruits, nuts, or beans provided to a customer at a store. However, the articles sold by weight using the weighing sales system 1 may be any articles that can be sold by weight, and are not limited to foods.

(Configuration of the Weighing Sales System 1)

The weighing sales system 1, as illustrated in FIG. 1, is constituted by a first unit U1, a second unit U2, a third unit U3, and an information terminal 4 (may also be referred to as a "display and printing device" as in a display and printing device 1020 according to a second embodiment).

The first unit U1 is constituted by an article supplying device 2*a* and a weighing device 3. A number of the article supplying device 2*a* constituting the first unit U1 may be one or more, and is not particularly limited. A number of the weighing device 3 constituting the first unit U1 may be one or more, and is not particularly limited.

The second unit U2 is constituted by an article supplying device 2*b*. A number of the article supplying device 2*b* constituting the second unit U2 may be one or more, and is not particularly limited.

The third unit U3 is constituted by an article supplying device 5. A number of the article supplying device 5 constituting the third unit U3 may be one or more, and is not particularly limited.

Note that regardless of the example of FIG. 1, the weighing sales system 1 may be constituted by the first unit U1 and the information terminal 4.

As illustrated in FIG. 1, the first unit U1, second unit U2, third unit U3, and information terminal 4 and arranged on a shelf 6. The shelf 6 is constituted by a pair of side-surface boards 66, 67, a plurality of levels of shelf boards 61, 62, 63, 64, 65 suspended between the side-surface boards 66, 67, and a back-surface board 68.

The shelf board 61 is provided on a top level. An upper part of the shelf board 61 is open. The article supplying device 2*a*, 2*b*—which are tall—are arranged on the shelf board 61. Moreover, unlike the other shelf boards 63, 64, 65 projecting up to a front surface, the shelf board 61 has a shallow depth.

The shelf board 62 is a bottom level of the shelf board 61 and is provided below the article supplying device 2*a*. The weighing device 3 is arranged on the shelf board 62.

The shelf board 63 is below the shelf board 61 and the shelf board 62 and is provided at a substantially middle level of the shelf 6. A space between the shelf board 62 and the shelf board 63 is relatively wide. In particular, of the space between the shelf board 62 and the shelf board 63, a space below the second unit U2 has height and width of an amount in which the shelf board 62 is not provided. The information terminal 4 is arranged on the shelf board 63. Specifically, the information terminal 4 is arranged in the space below the second unit U2. In more detail, as illustrated, the information terminal 4 is arranged approaching one end side of the space below the second unit U2. An open space next to the information terminal 4 on the shelf board 63 is a work space.

The shelf boards 64, 65 are provided farther below the shelf board 63. The article supplying device 5 is arranged on the shelf boards 64, 65. Note that in the example of FIG. 1, the article supplying device 5 is arranged on two levels by the two shelf boards 64, 65, but may be arranged on one level or on three or more levels.

Next, a summary of a configuration of the first unit U1, second unit U2, third unit U3, and information terminal 4 will be described.

The first unit U1 provides any amount of articles to a customer. The first unit U1, as described above, is constituted by the article supplying device 2a and the weighing device 3. In the illustrated first unit U1, an installed number of the article supplying device 2a and the weighing device 3 is the same. That is, the article supplying device 2a and the weighing device 3 are provided one-to-one.

Note that regardless of the above description, the article supplying device 2a and the weighing device 3 need not be provided one-to-one. For example, an installed number of the article supplying device 2a may be greater than an installed number of the weighing device 3. In this case, a portion of or all of each of the weighing devices 3 is shared by the plurality of article supplying devices 2a. Furthermore, for example, an installed number of the article supplying device 2a may be less than an installed number of the weighing device 3. In this case, a portion of or all of each of the article supplying devices 2a is shared by the plurality of weighing devices 3.

As described above, when the article supplying device 2a and the weighing device 3 are not provided one-to-one, the above sharing may be achieved by, for example, the following.

For example, sharing may be achieved by providing on the shelf 6 a rail or the like that can move the article supplying device 2a or weighing device 3 in a parallel direction (left-right direction in the drawing) and, as appropriate, moving the article supplying device 2a or the weighing device 3 in the parallel direction using the rail or the like. Furthermore, for example, sharing may be achieved by providing a relay pipe that links between the article supplying device 2a and the weighing device 3 and can switch a relay destination, and, as appropriate, switching a relay destination.

Note that the invention may be configured so that a position of the article supplying device 2a or the weighing device 3 is changed and a desired article supplying device 2a is connected to the weighing device 3 manually.

The article supplying device 2a accumulates and retains articles internally and supplies any amount of articles to the weighing device 3 in response to a predetermined operation. The weighing device 3 weighs a weight of articles supplied from the article supplying device 2a. The weighing device 3 transmits the weight of the articles (weighed value) and device identification information that identifies the weighing device 3 to the information terminal 4. The weighing device 3 supplies the weighed articles to a container or the like of a customer.

Note that the information terminal 4 calculates a sales price based on a unit price and weight of the articles associated with the device identification information.

The second unit U2 provides a set weight of articles to the customer for each operation. The second unit U2, as described above, is constituted by the article supplying device 2b.

The article supplying device 2b accumulates and retains articles internally and supplies a set amount of articles to a container or the like of a customer for each of a number of operations in response to a predetermined operation.

The article supplying device 2b, when articles are supplied, transmits information relating to a number of provisions of articles and device identification information that identifies the articles provision device 2b to the information terminal 4.

Note that the information terminal 4 calculates a sales price based on a unit price and number of provisions of articles associated with the device identification information.

The third unit U3 provides any amount of articles to a customer. The third unit U3, as described above, is constituted by the article supplying device 5.

The article supplying device 5 is provided with a retention body that accumulates and retains articles internally, a mechanism for taking out any amount of articles from inside the retention body (for example, a scoop and scoop housing unit), and a weighing unit that weighs a weight of articles inside the retention body.

The article supplying device 5, when articles are taken out of the retention body, transmits a weight of articles in the retention body after the articles are taken out and device identification information that identifies the article supplying device 5 to the information terminal 4.

Note that the information terminal 4 calculates a sales price based on a unit price of the articles associated with the device identification information and a weight before and after the articles were taken out.

Note that information relating to a weight of articles inside the retention body after the articles were taken out is recorded, and, by a next successive operation, is treated as a weight before the articles were taken out. That is, the weight before the articles are taken out is reduced in response to an operation for taking out the articles in the article supplying device 5. An error is produced when the weight before the articles are taken out is increased. For example, data may be output to forcibly interpose a clerk. Note that an increase of weight due to replenishment of articles into the retention body will not produce an error due to a predetermined operation (reset operation) by a clerk.

The information terminal 4 receives predetermined information relating to provision of articles from the first unit U1, the second unit U2, and the third unit U3, issues a label or receipt according to the predetermined information, and outputs transaction data (for example, purchase history, points, or the like) linked to a member code or the like of a customer.

The information terminal 4 is provided with a storage unit that associates device identification information of the weighing device 3 constituting the first unit U1, device identification information of the article supplying device 2b constituting the second unit U2, device identification information of the article supplying device 5 constituting the third unit U3, and article identification information (PLU code) of the articles accumulated inside each device, and stores such. Moreover, as described above, the information terminal 4 also stores a unit price of the articles associated with the device identification information in the storage unit. Thus, the information terminal 4 specifies the articles supplied by the weighing device 3, the article supplying device 2*b*, or the article supplying device 5, then calculates a sales price based on the weight and number of provisions of the articles, issues an adjustment label or receipt, and outputs transaction data.

Note that use of any of the first unit U1, the second unit U2, or the third unit U3 is at the discretion of the customer. Therefore, the information terminal 4, whichever of the first unit U1, the second unit U2, and the third unit U3 is used, is arranged at a position which is easily accessed by a customer and which the customer can easily operate without stooping—near a substantially middle level of the shelf 6. Furthermore, the information terminal 4 is arranged approaching one end side (a side on which the second unit U2 is provided) of the width direction below the first unit U1 and the second unit U2, and the open space next to the information terminal 4 is provided as a work space.

(First Unit U1)

Figure 2:
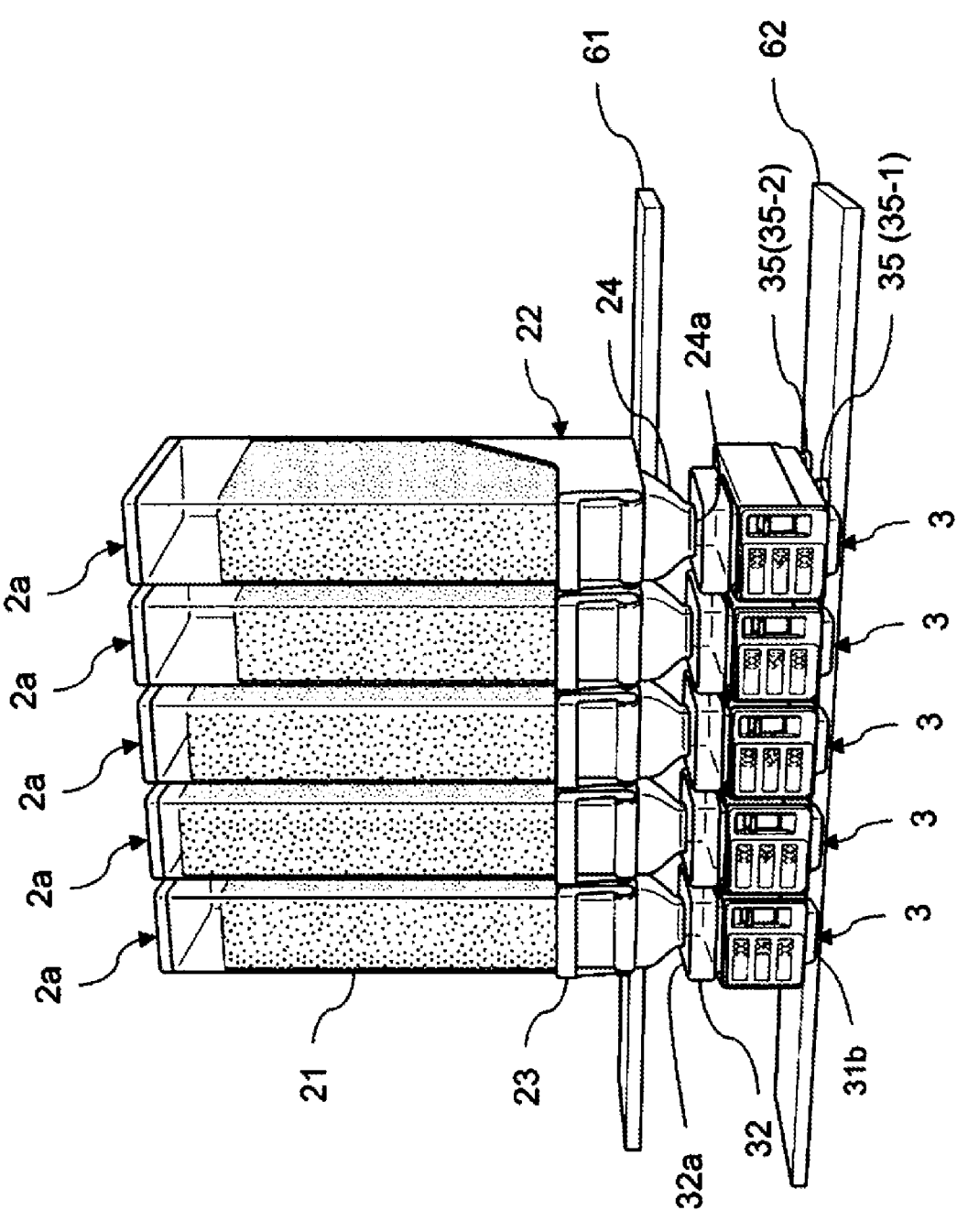
FIG. 2 shows an external perspective diagram of a first unit constituting the weighing sales system.

FIG. 2 is an external perspective diagram of a first unit constituting the weighing sales system 1. The first unit U1 is a unit for so-called selling by weight, and provides any amount of articles to a customer. The first unit U1, as illustrated in FIG. 2, has a plurality of the article supplying device 2*a* the weighing device 3 provided for each of the article supplying devices 2*a*. A set of the article supplying device 2*a* and the weighing device 3 is provided for each kind of the articles provided. However, articles of the same kind may be provided with two or more sets of the article supplying device 2*a* and the weighing device 3.

(Article Supplying Device 2a)

The article supplying device 2*a*, as illustrated in FIG. 2, is constituted by an accumulation unit 21 provided above, a supply unit 22 provided below the accumulation unit 21, an operation unit 23 for performing an operation of supplying the articles, and a supply port unit 24 that supplies the articles to the weighing device 3. The accumulation unit 21 and the supply unit 22 are connected. The articles inside the accumulation unit 21 are supplied to the weighing device 3 from the supply unit 22 via the supply port unit 24.

Note that the accumulation unit 21 and the supply unit 22 may be configured integrally, or may be configured removably by a predetermined attachment mechanism. When the accumulation unit 21 and the supply unit 22 are configured removably, the articles can be replenished to the article supplying device 2*a* by replacing the accumulation unit 21 in which the articles are accumulated. Moreover, when the accumulation unit 21 and the supply unit 22 are configured removably, management of an expiry period and the like of the articles may be performed in response to replacement of the accumulation unit 21. For example, the information terminal 4 may receive input of information such as best-before/expiry date, best-before/expiry period, date, or replenishment amount and issue a label based on the input information. The issued label may, for example, be affixed to the accumulation unit 21 after replacement or may be affixed to a management slip.

The accumulation unit 21 is a hollow container and has an opening part on a supply unit 22 side. The articles accumulated in the accumulation unit 21 are ejected from the opening part to the supply unit 22.

The supply unit 22 supplies articles of an amount corresponding to an operation of a customer to the weighing device 3. The supply unit 22 has a receiving port connected to the opening part of the accumulation unit 21 and a housing part for housing the articles.

The supply port unit 24 is below the supply unit 22 and is provided at a position inclined towards a front-surface side of the article supplying device 2*a*. The supply port unit 24 has a supply port 24*a* that opens and closes in response to an operation using the operation unit 23. The supply port 24*a* faces a receiving-side opening part 32*a* of a guiding body 32 provided by the weighing device 3 and the articles are supplied (inserted) to the guiding body 32 from the supply port 24*a* via the receiving-side opening part 32*a*. The supply port unit 24 faces a guiding body 32 side and has a shape with a narrowed port so that the articles are supplied to the guiding body 32 via the supply port unit 24 without spilling.

The operation unit 23 is a part for operating an opening and closing mechanism of the supply port 24*a* provided on the supply port unit 24. The operation unit 23 is basically operated by the customer. The operation unit 23 is, for example, a lever or the like exposed to the outside. In response to a lever operation, the supply port 24*a* is opened and the articles inside the housing part are supplied from the supply port unit 24 to the weighing device 3.

Here, a positional relationship of the article supplying device 2*a* and the shelf board 61 on which the article supplying device 2*a* is placed will be explained. The shelf board 61 supports the supply unit 22 at a position on the bottom surface of the supply unit 22 that avoids the supply port unit 24 provided on the front-surface side, and further toward a rear-surface side than the supply port unit 24. Thus, the supply port unit 24 provided inclined towards a front-surface side of the supply unit 22 is provided in a depth direction of the shelf board 61 at a position protruding from an end portion of a front-surface side of the shelf board 61. Moreover, the shelf board 61 supporting the supply unit 22 has a shallow depth and approaches a back-surface board 68 side, and thus, the article supplying device 2*a* is contained without the front-surface side thereof jutting beyond a front surface of the shelf 6.

(External Configuration of the Weighing Device 3)

Figure 3:
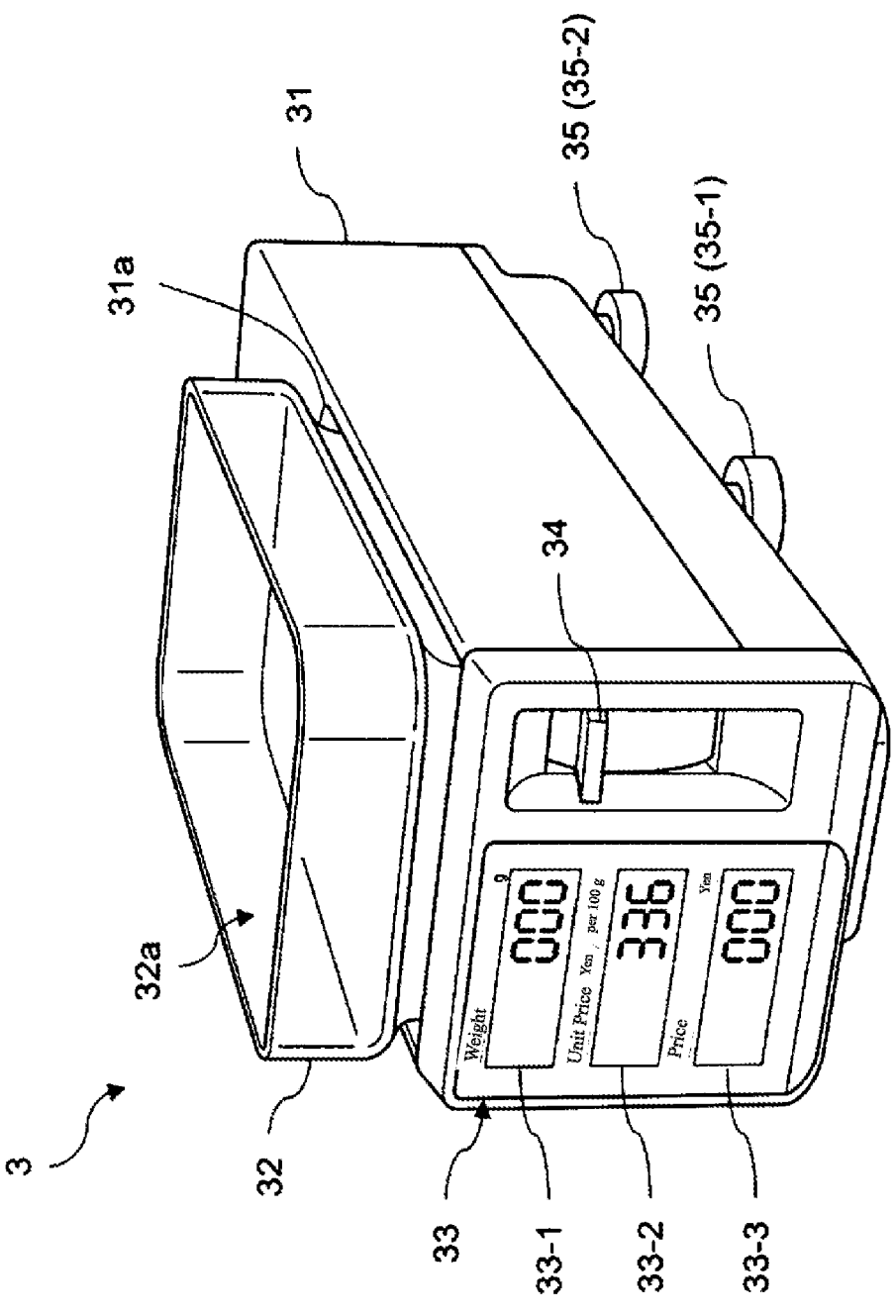
FIG. 3 shows an external perspective diagram of a weighing device according to the first embodiment of the present invention.
Figure 4A:
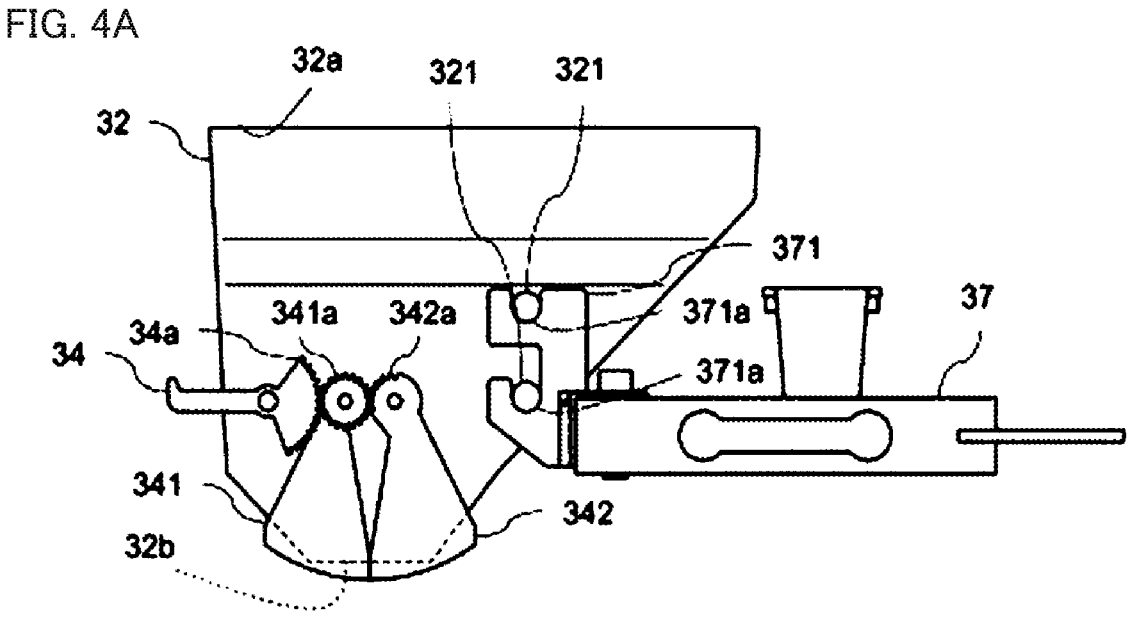
FIG. 4A shows a side surface diagram illustrating an internal structure of the weighing device, and a side surface diagram of when an ejection-side opening part is in a closed state.
Figure 4B:
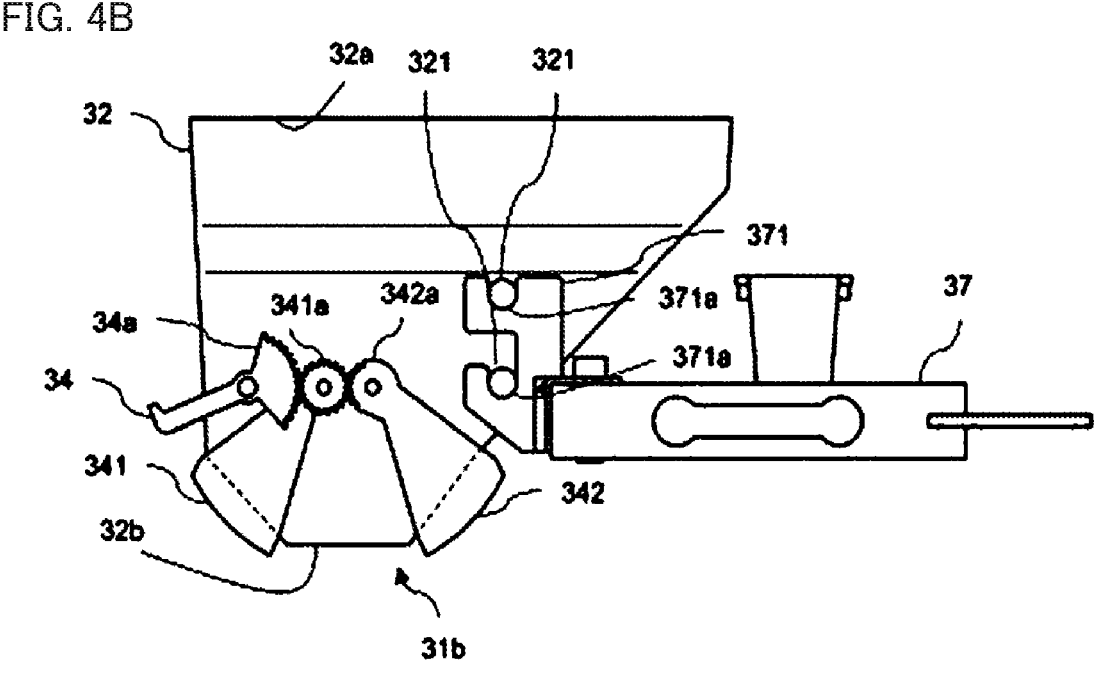
FIG. 4B shows a side surface diagram illustrating an internal structure of the weighing device, and a side surface diagram of when an ejection-side opening part is in an open state.

FIG. 3 is an external perspective diagram of the weighing device 3. FIG. 4A is a side surface diagram illustrating an internal structure of the weighing device 3, and a side surface diagram of when an ejection-side opening part 32*b* is in a closed state. FIG. 4B is a side surface diagram illustrating an internal structure of the weighing device 3, and a side surface diagram of when an ejection-side opening part 32*b* is in an open state. The weighing device 3 is provided below the article supplying device 2*a*. The weighing device 3 temporarily houses and weighs the articles supplied from the article supplying device 2*a*.

The weighing device 3, as illustrated in FIG. 3 is provided with a main body 31, the guiding body 32, a display unit 33 (or display device), an operation unit (or operation device that may comprise at least one of a lever, button, or sensor) 34, and a support unit (or support leg) 35.

The main body 31 is a casing made of a substantially cuboid shape. The main body 31 has a hollow portion open vertically provided internally. The guiding body 32 described later is set into the hollow portion from the opening part 31*a* of a top-surface side connected to the hollow portion. Moreover, as illustrated in FIG. 4A and FIG. 4B, a pair of lid bodies 341, 342 that open and close in response to an operation of the operation unit 34 described later are provided on a bottom-surface side of the weighing device 3. The opening part of a bottom-surface side constitutes a provision port 31*b* that opens and closes using the pair of lid bodies 341, 342 and, via the provision port 31*b*, provides the articles housed inside the weighing device 3 to the customer by ejecting to the outside.

The opening part 31*a* of a top-surface side is formed along a length-direction of the main body 31 from a front-surface side of the main body 31 extending to the rear via a central portion. Moreover, the freely opening and closing provision port 31*b* has an opening width narrower than the opening part 31*a* and is provided on a front-surface side of the main body 31, at least further toward a front-surface side than the support unit 35. Further, the main body 31 is supported on the shelf board 62 at a position on the bottom surface avoiding the provision port 31*b* provided on the front-surface side and further toward a rear-surface side then the provision port 31*b*. Thus, the provision port 31*b* provided inclined towards a front-surface side of the main body 31 is provided in a depth direction of the shelf board 62 at a position protruding from an end portion of a front-surface side of the shelf board 62.

The guiding body 32 is a funnel-shaped part fit into the hollow portion from the opening part 31*a* of the main body 31 and also plays a role of a packing container. As illustrated in FIG. 4A and FIG. 4B, a joining protrusion 321 is provided on a side surface on the guiding body 32. The joining protrusion 321 is removably joined to a joining indent 371*a* provided on a weighing unit 37 described later. Thus, a weight of articles housed inside the guiding body 32 is weighed by the weighing unit 37. Moreover, the guiding body 32 can be appropriately removed or replaced during cleaning or the like by releasing a joint of the joining protrusion 321 and the joining indent 371*a*.

Moreover, the guiding body 32 is provided with a receiving-side opening part 32*a* and an ejection-side opening part 32*b* on upper and lower surfaces, and when articles supplied from the article supplying device 2*b* are received from the receiving-side opening part 32*a*, the articles are housed internally when the lid bodies 341, 342 are closed. Moreover, when the lid bodies 341, 342 are opened, articles are ejected outside the weighing device 3 via the provision port 31*b* by the ejection-side opening part 32*b*. Thus, articles can be provided to the customer.

An opening width of the receiving-side opening part 32*a* may be relatively wide compared to an opening width of the ejection-side opening part 32*b*, or may be wider than an opening width of the supply port 24*a* of the article supplying device 2*a*. Moreover, the guiding body 32 is attached to the main body 31 so that a portion below the ejection-side opening part 32*b* is contained inside the housing part of the main body 31. Thus, the guiding body 32 receives articles supplied from the article supplying device 2*a* internally without spilling.

The display unit 33 is achieved by a liquid crystal display or the like and displays a weight of articles weighed by the weighing unit 37 described later, a unit price of the articles, and a sales price of the articles corresponding to the weight. The display unit 33 is configured by three display units 33-1, 33-2, 33-3 arranged vertically in parallel. For example, the weight of the articles supplied to the weighing device 3 from the article supplying device 2*a* is displayed on the display unit 33-1, the unit price of the articles is displayed on the display unit 33-2, and the sales price is displayed on the display unit 33-3. Note that, in the illustrated example, the unit price of the articles displayed on the display unit 33-2 is a unit price per 100 g, but the unit weight may be a unit price per 50 g, and is not particularly limited.

Because the weight, unit price, and sales price of the articles are displayed on the weighing device 3 in this manner, the customer can operate the article supplying device 2*a* to supply articles to the weighing device 3 while understanding this information, and can confirm that the articles inside the weighing device 3 have reached a desired amount, to then perform an operation to stop supplying the articles.

The operation unit 34 is a part for operating an opening and closing mechanism for opening and closing the provision port 31*b*. In the first embodiment, the operation unit 34 is achieved by a lever operable from a front-surface side and the opening and closing mechanism is achieved by the pair of lid bodies 341, 342 that open and close the provision port 31*b* using the operation unit 34. Gear units 34*a*, 341*a*, 342*a* are respectively provided on one end of the operation unit 34 and of the lid bodies 341, 342, and the gear unit 34*a* and gear unit 341*a* and the gear unit 341*a* and the gear unit 342*a* are mutually engaged. When the operation unit 34 is raised upward, the pair of lid bodies 341, 342 mutually abut and close the provision port 31*b*, and when the operation unit 34 is pushed downward, the engaging gear units 34*a*, 341*a*, 342*a* interlock, the lid bodies 341, 342 separate, and the provision port 31*b* is opened. When the provision port 31*b* is opened, the articles inside the guiding body 32 are ejected from the provision port 31*b* via the ejection-side opening part 32*b*. Thus, the articles are provided to the customer.

Note that the lid bodies 341, 342 normally lower downward under their own weight to close the provision port 31*b*, and the operation unit 34 raises upward in response to this. In this respect, the operation unit 34 may be separately provided with a biasing means such as a spring and biased upward so that it reliably rises upward when it is not pushed downward and the provision port 31*b* closes. In a state where the provision port 31*b* is closed, ejection of the articles inside the guiding body 32 is regulated and the articles remain housed inside the guiding body 32.

Note that the opening and closing mechanism operated by the operation unit 34 and executing opening and closing of the provision port 31*b* is not limited to the above configuration. For example, a shutter-like shielding board sliding to open and close the provision port 31*b* may be configured, or a lid-like shielding board that blocks the provision port 31*b* fitting into and out of the provision port 31*b* to open and close the provision port 31*b* may be configured. Moreover, the opening and closing mechanism may open and close the provision port 31*b* by electric control.

The support unit 35 is a leg part that supports the weighing device 3 on the shelf board 62, and four are provided on a bottom surface of the main body 31. Note that in FIG. 2 and FIG. 3, among the four support units 35, only two support units 35-1, 35-2 are shown, but support units 35-3, 35-4 are respectively provided at symmetrical positions in the width direction of each of the support units 35-1, 35-2.

The four support units 35 are each provided with a height adjusting mechanism capable of independently adjusting height, and the main body 31 can be levelly supported on the shelf board 62 by appropriately adjusting the height of each support unit 35. Such a height adjusting mechanism is achieved by, for example, a pole-like shaft part provided with a disk-like base portion wherein a female screw is cut into a center portion, and a male screw shape that screws into the female screw of the disk-like base portion. The height of each support unit 35 can be adjusted by placing the disk-like base portion on the shelf board 62 and inserting the pole-like shaft part in the female screw to an appropriate depth.

Moreover, the support units 35 are provided inclined toward a rear-surface side on a bottom surface of the main body 31. That is, among the four support units 35, the support unit 35-1 and the support unit 35-3 provided in a line in a width direction are provided in a substantial center of a length-direction of the main body 31, and the other support unit 35-2 and support unit 35-4 provided in a line in a width direction are provided near an end portion of a rear-surface side of the main body 31. Such a position of the support units 35 is a position that does not cover the provision port 31*b* and a position that cannot support the weighing device 3 on the shelf board 62.

Note that the height adjusting mechanism provided by the support units 35 may be made to be controlled by electronic control. Furthermore, in this case, the weighing device 3 is provided with a sensor for detecting levelness such as a gyro sensor or accelerometer, and the height adjusting mechanism may be controlled so that the weighing device 3 is level in response to detection results of the sensor.

(Provision Steps of Articles by the First Unit U1)

Figure 5A:
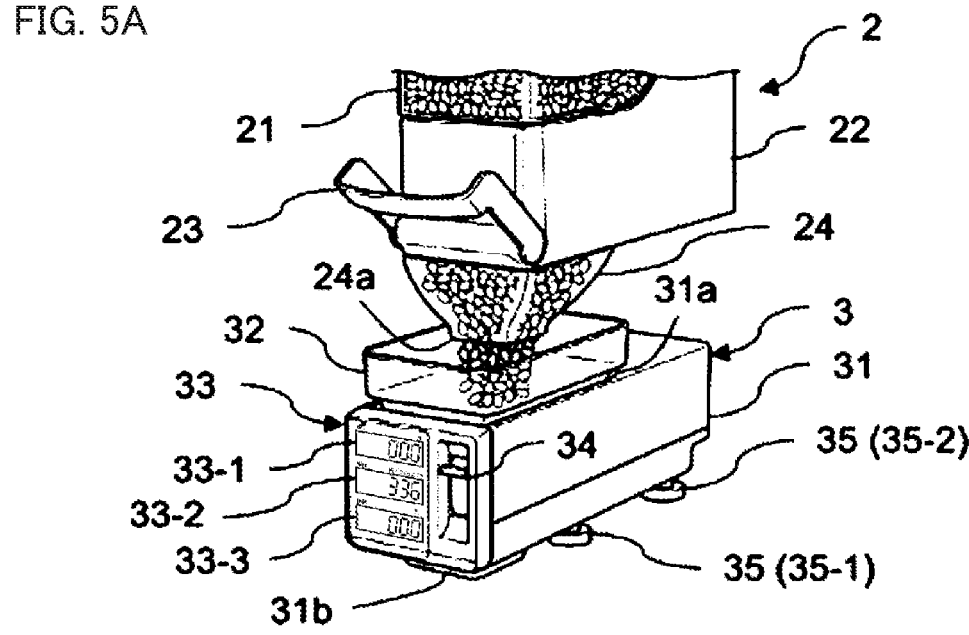
FIG. 5A illustrates a state wherein articles are being supplied to the weighing device from an article supplying device in relation to providing articles using the first unit.
Figure 5B:
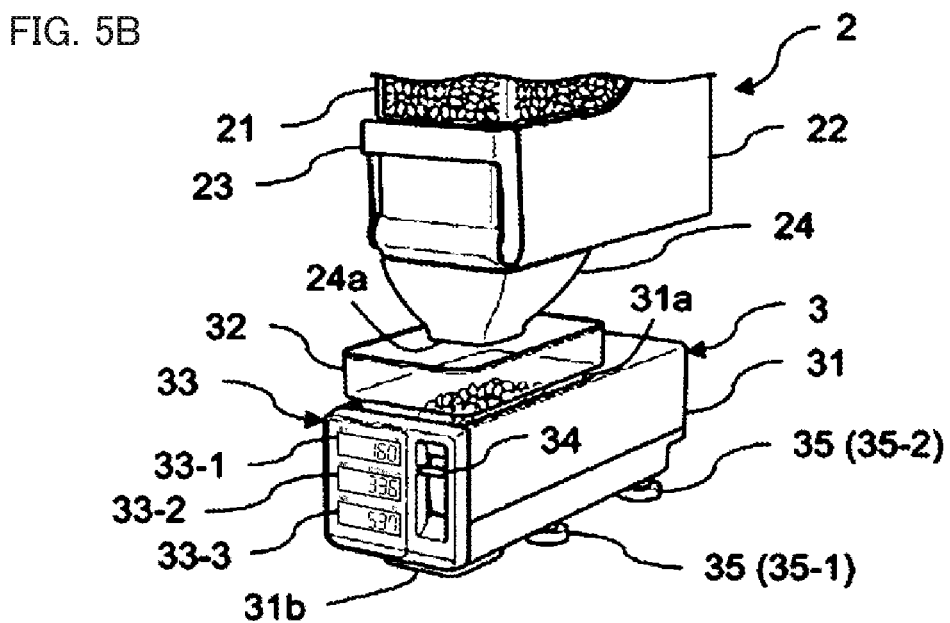
FIG. 5B illustrates a state wherein articles have finished being supplied to the weighing device from the article supplying device in relation to providing articles using the first unit.
Figure 5C:
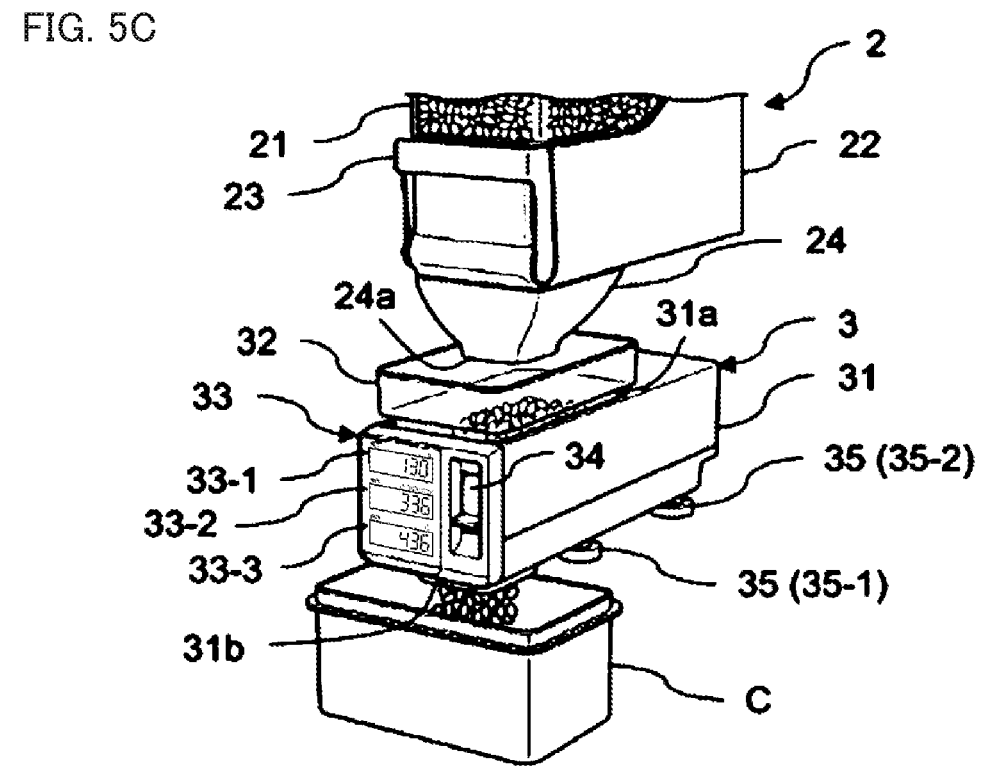
FIG. 5C illustrates a state wherein articles are being supplied to a container from the weighing device in relation to providing articles using the first unit.

The customer providing articles using the first unit U1 will be described with reference to FIG. 5A to FIG. 5C. FIG. 5A illustrates a state wherein articles have begun being supplied to the weighing device 3 from the article supplying device 2*b* in relation to providing articles using the first unit U1. In FIG. 5A, a weight of articles "000" is displayed on the display unit 33-1, a unit price per 100 g "336" is displayed on the display unit 33-2, and a sales price "000" is displayed on the display unit 33-3. FIG. 5B illustrates a state wherein articles have finished being supplied to the weighing device 3 from the article supplying device 2*b* in relation to providing articles using the first unit U1. In FIG. 5B, a weight of articles "160" is displayed on the display unit 33-1, a unit price per 100 g "336" is displayed on the display unit 33-2, and a sales price "537" is displayed on the display unit 33-3. FIG. 5C illustrates a state wherein articles are being supplied to a container C from the weighing device 3 in relation to providing articles using the first unit U1. In FIG. 5C, a weight of articles "130" is displayed on the display unit 33-1, a unit price per 100 g "336" is displayed on the display unit 33-2, and a sales price "436" is displayed on the display unit 33-3.

The customer, when provision of articles is received by the first unit U1, selects the article supplying device 2*b* in which desired articles are contained. Then, the customer operates the operation unit 23 of the article supplying device 2*b* to open the supply port 24*a* of the supply port unit 24. Thus, as illustrated in FIG. 5A, articles accumulated in the accumulation unit 21 are supplied into the guiding body 32 of the weighing device 3. Note that while the articles are supplied into the guiding body 32, the weight, unit price, and sales price of the supplied articles are displayed on the display unit 33 of the weighing device 3. Thus, the customer can operate the operation unit 23 while understanding a supply amount of the articles.

Then, when the articles supplied to the weighing device 3 reach a desired amount, as illustrated in FIG. 5B, the customer operates the operation unit 23 to close the supply port 24*a* of the supply port unit 24. Thus, as illustrated in FIG. 5B, supply of the articles into the guiding body 32 stops.

Then, the customer who supplied articles of a desired amount to the weighing device 3, as illustrated in FIG. 5C, places the container C such as a cup, bag, or bottle below the provision port 31*b* provided on a bottom surface of the weighing device 3. Then, the customer operates the operation unit 34 of the weighing device 3 to open the provision port 31*b*. Thus, as illustrated in FIG. 5C, articles housed in the weighing device 3 are ejected to the container C. Note that the customer may place the container C below the provision port 31*b* before the articles housed in the weighing device 3 are ejected. For example, as illustrated in FIG. 5A, the customer may place the container C below the provision port 31*b* before operating the operation unit 23 of the article supplying device 2*b*.

Following the above steps, articles may be provided to the customer by the first unit U1 based on an operation by the customer.

(Hardware Configuration of the Weighing Device 3)

Figure 6:
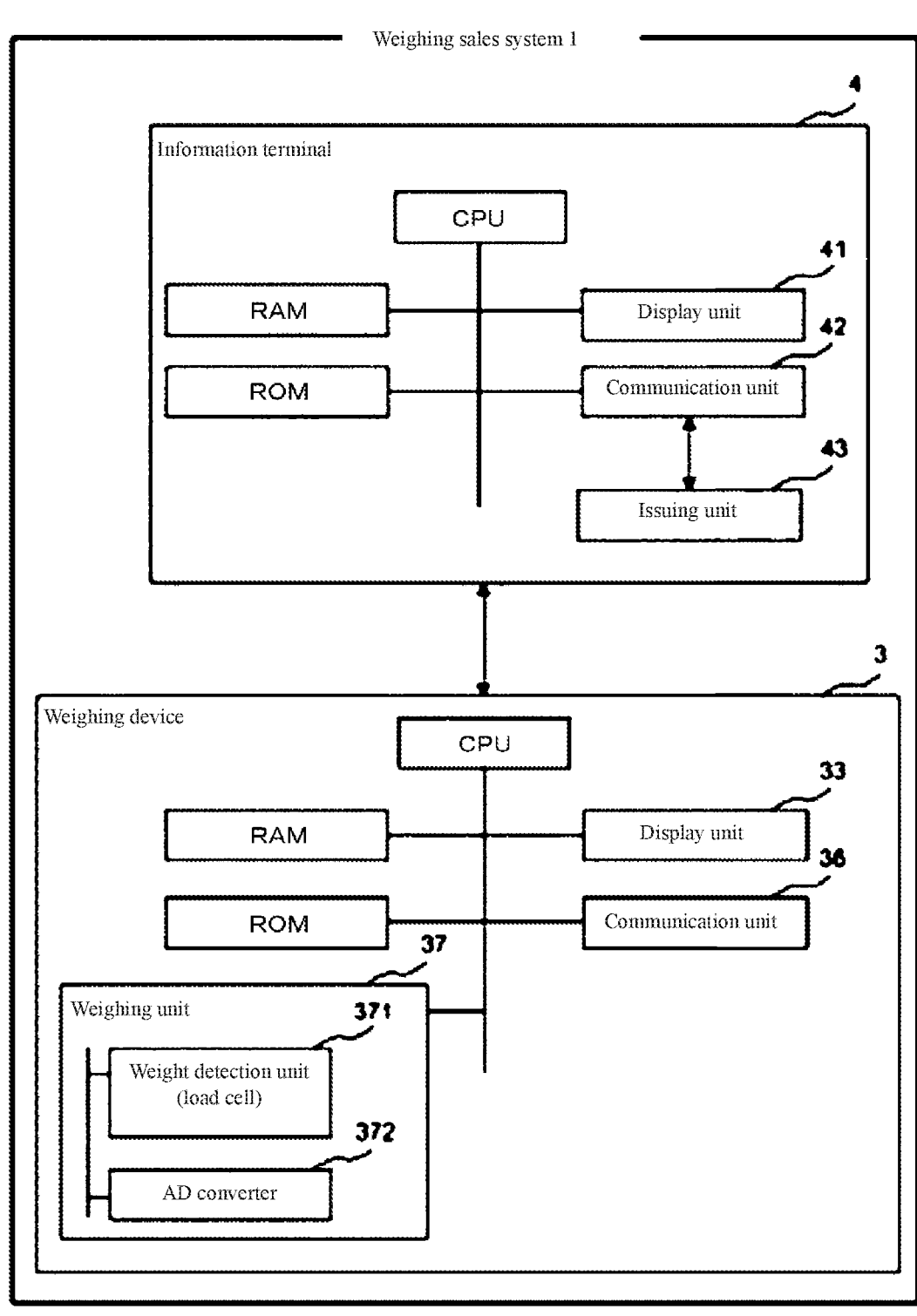
FIG. 6 shows a block diagram illustrating a hardware configuration of the weighing sales system.

FIG. 6 is a block diagram illustrating a hardware configuration of the weighing sales system 1. Specifically, FIG. 6 illustrates a hardware configuration of the weighing device 3 and a hardware configuration of the information terminal 4.

The weighing device 3, as illustrated in FIG. 6, is provided with a CPU (Central Processing Unit), a RAM (Random Access Memory), the display unit 33, a communication unit 36, and the weighing unit 37. The CPU is a calculation unit (calculation device) or a processor (or a weighing device processor) that executes information processing. The RAM and a ROM are a storage unit (storage device) for storing various information. The display unit 33 stores various information.

The communication unit 36 achieves a connection between each terminal and device—or is achieved by a plurality of communication means. For example, a mutual connection with the information terminal 4 is achieved by a wired or wireless LAN. Note that when the communication unit 36 is achieved by a wired LAN, a power source of the weighing device 3 may be secured by a PoE (Power over Ethernet) power supply from the information terminal 4 connected to an external power source. However, this does not interfere with power supply by the weighing device 3 directly connecting to an external power source or an internal battery.

The weighing unit 37 weighs the articles supplied from the article supplying device 2*a* to the weighing device 3 by, for example, a weight detection method using a load cell. As described above, the guiding body 32 is removably attached to the weighing unit 37. Thus, the weighing unit 37 weighs the articles supplied into the guiding body 32. The weighing unit 37 is configured by a weight detection unit (or weight detector) 371 and an AD converter 372. The weight detection unit 371 is achieved by a load cell and the AD converter 372 converts an analog signal input from the weight detection unit 371 to a digital signal. In converting to a digital signal, a range at which a weight (weighed value) can be appropriately acquired is set, then values of 0 and a maximum measured weight are recorded. The value converted to digital data is displayed as a weight (weighed value) on the display unit 33.

Note that the weighing device 3 may be provided with an alerting unit of a speaker and sign lamp in addition to this. For example, in a state where articles are supplied to the weighing device 3 from the article supplying device 2*a* by an operation of the customer, when the weight of the articles supplied to the weighing device 3 has approached a designated weight that is a weight designated in advance, the alerting unit may alert by emitting sound or light indicating that the designated weight has been approached. For example, a message such as "Almost at designated weight" or "Please supply little by little" may be emitted by voice. Note that a form of alerting by sound or light as the designated weight is approached may be changed.

Note that the designated weight must first be set by the customer and, for example, may be set by a number pad provided on a scale. That is, when a number is entered using the number pad in a state where a weight is not being detected, it is displayed in a manner different to that in which a detected value is displayed, such as a flashing display of a numerical value on the display unit 33-1 that displays weight, and when the supply of articles begins, display switches to an actual weight. Moreover, in instances such as when the articles and a weight are designated on the information terminal 4 and the articles are purchased, so long as weight data is transmitted to the information terminal 4 from the weighing device 3, alerting of the same can be achieved on the information terminal 4 side.

(Software Configuration of the Weighing Device 3)

Figure 7:
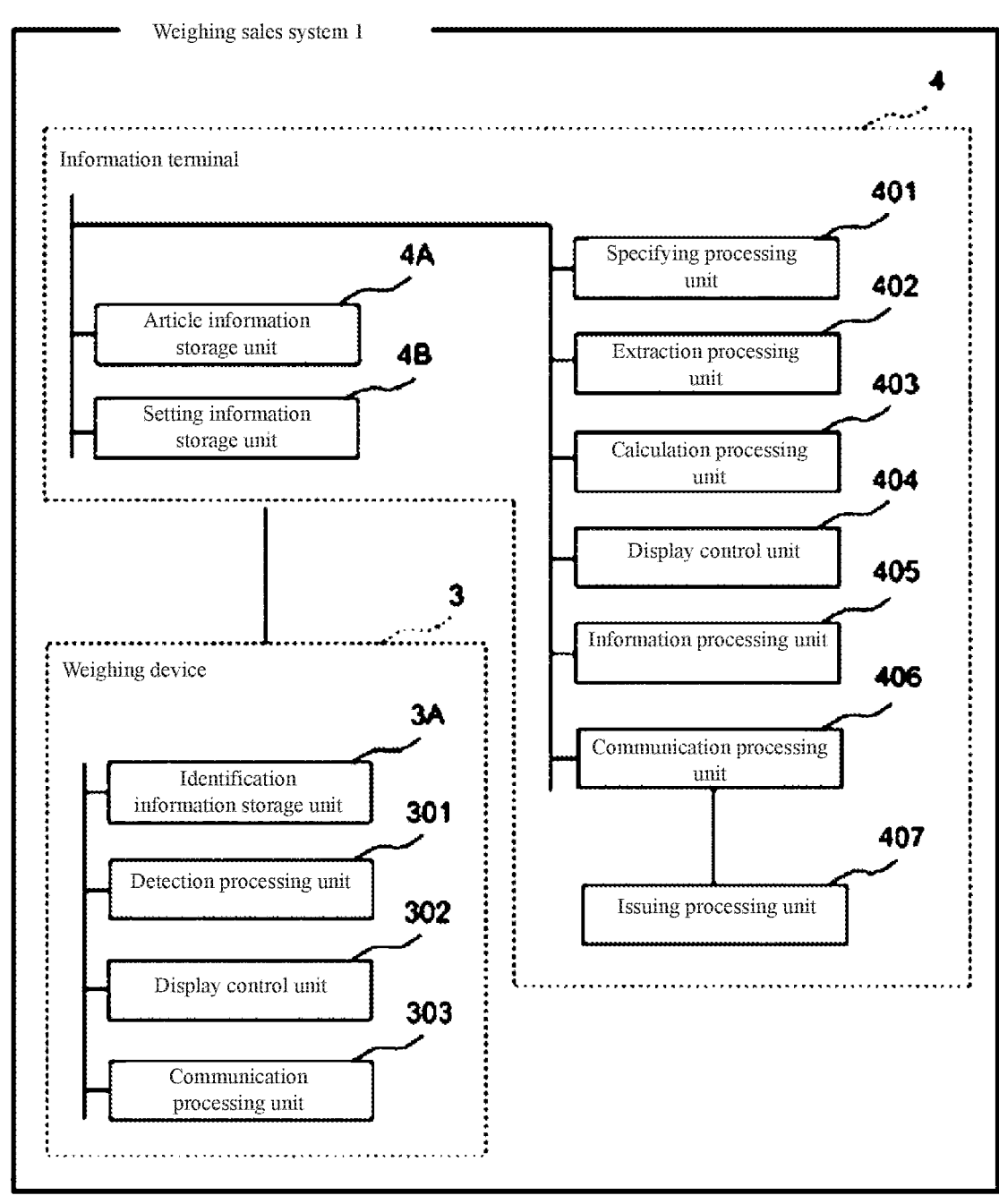
FIG. 7 shows a block diagram illustrating a software configuration of the weighing sales system.

FIG. 7 is a block diagram illustrating a software configuration of the weighing sales system 1. Specifically, FIG. 7 illustrates a software configuration of the weighing device 3 and a software configuration of the information terminal 4.

The weighing device 3, as illustrated in FIG. 7, is provided with, as software resources, an identification information storage unit (or identification information storage) 3A, and a detection processing unit 301, a display control unit 302, and a communication processing unit 303, which are implemented by the CPU.

The identification information storage unit 3A stores device identification information that can identify the weighing device 3. The device identification information is information unique to each weighing device 3, and is specified by one weighing device 3 from the plurality of weighing devices 3 by related device identification information.

Note that the device identification information may be information that can identify the weighing device 3, and, for example, may be constituted by converter identification information retained by the AD converter 372 and which can identify the AD converter 372. Moreover, the device identification information may also be settable by a DIP switch or the like separately provided by the weighing device 3.

Moreover, a relay may be provided on a network between the weighing device 3 and the information terminal 4, and the relay may be provided with the identification information storage unit 3A instead of the weighing device 3. When the relay is provided with the identification information storage unit 3A, the relay may transmit device identification information to the information terminal 4.

The detection processing unit 301 detects a weight of articles supplied to the weighing device 3 from the article supplying device 2a by the weighing unit 37 and detects stability of the weight. When stability of the weight is detected after the weight of the articles inside the weighing device 3 is detected by the detection processing unit 301, the detected weight of the articles and the device identification information is transmitted to the information terminal 4. Note that article identification information may be retained in the weighing device 3 by, for example, directly inputting article identification information. When the weighing device 3 retains article identification information, the article identification information is transmitted along with the weight (weighed value) to the information terminal 4 instead of the device identification information.

The display control unit 302 controls the display unit 33 to display various information on the display unit 33. For example, the display control unit 302 causes display of the weight of the articles, the unit price of the articles, and the sales price on the display unit 33. For example, the display control unit 302 acquires the weight of the articles from the detection processing unit 301 and causes display of such on the display unit 33. The display control unit 302 causes display of the unit price of the articles stored by the weighing device 3 per se (for example, the unit price of the articles stored by the weighing device 3 on a separately provided storage unit) on the display unit 33. Note that the display control unit 302 may acquire the unit price of the articles from the information terminal 4 and cause such to be displayed on the display unit 33. The display control unit 302 may cause the sales price calculated based on the weight of the articles and the unit price of the articles to be displayed on the display unit 33. Thus, it is convenient because the sales price is understood at the point when the articles are supplied to the weighing device 3 from the article supplying device 2a. Note that calculation processing of the sales price may be executed by the weighing device 3 per se, or may be executed by the information terminal 4.

Here, a method for the weighing device 3 acquiring a unit price of articles when the unit price of the articles is acquired and retained from the information terminal 4 by the weighing device 3 is described. For example, at start-up of the weighing sales system 1, the information terminal 4 transmits information relating to the unit price of articles provided by each weighing device 3 (unit price of articles associated with and stored in the device identification information of respective weighing devices 3) to each weighing device 3. Moreover, the information terminal 4 may transmit information relating the unit price of the articles to the weighing device 3 not just at start-up of the weighing sales system 1. For example, based on an operation designating a weighing device 3 (operation designating a weighing device 3 that transmits information relating to a unit price of the articles) on a maintenance screen displayed by the information terminal 4, the information terminal 4 may transmit information relating to the unit price provided by the designated weighing device 3 to the designated weighing device 3. Note that the information terminal 4, based on an operation designating all devices on the maintenance screen (or an operation not designating a device) may transmit information relating to the unit price of the articles provided by each weighing device 3 to each weighing device 3. Moreover, the information terminal 4, based on a predetermined operation by a clerk on the weighing device 3 (in response to requested information based on an operation), may transmit information relating to the unit price of the articles provided by the weighing device 3 to the weighing device 3.

Furthermore, information relating to the unit price of the articles may be transmitted from the information terminal 4 to the weighing device 3 at any time. Moreover, after an update flag is set when the unit price of the articles on the information terminal 4 side is changed, when there has been access from the weighing device 3, an update of information may be requested and information relating to the changed unit price of the articles may be transmitted to the weighing device 3. Thus, sale of articles with an incorrect unit price can be avoided.

Note that when the weighing device 3 does not retain information relating to the unit price of the articles, when the weighing device 3 does not detect a weight change, the information terminal 4 may be requested to acquire information relating to the unit price of the articles along with the device identification information, and the information relating to the unit price of the articles may be acquired. That is, the weighing device 3 may acquire information relating to the unit price of the articles each time articles are supplied.

The communication processing unit 303 is a functional unit that executes sending and receiving of data to and from the information terminal 4 and higher-order devices and the like by the communication unit 36, and achieves data communication according to a predetermined communication protocol.

The weighing device 3, by the communication processing unit 303, transmits to the information terminal 4 information relating to the weight of the articles supplied from the article supplying device 2*a* as weighing results from the weighing unit 37. At this time, the weighing device 3 is able to reference the identification information storage unit 3A to transmit to the information terminal 4 the weight of the articles relating to the weighing results from the weighing unit 37 along with the device identification information.

Note that the timing at which the weighing device 3 transmits the weight of the articles and the device identification information to the information terminal 4 may be, for example, the time at which stability of the weight is detected. Moreover, in another example, a time at which the operation unit 34 of the weighing device 3 is operated and the articles are actually provided to the customer is also possible.

Note that the weighing device 3 may be provided with a timing function. For example, the weighing device 3 provided with a timing function may be able to manage a current time, a remaining time until a certain time, and an elapsed time since entering a certain state. Moreover, the weighing device 3 may provide information acquired by the timing function to the information terminal 4.

Moreover, the weighing device 3 may be integrally configured with the article supplying device 2*a*.

(Hardware Configuration of the Information Terminal 4)

The information terminal 4 is a device that executes input and output of predetermined information and issues adjustment labels for articles. The information terminal 4 acquires information relating to the articles provided to the customer from the first unit U1, the second U2, and the third unit U3, and in response, issues an adjustment label on which is printed information for the sale of the articles provided to the customer.

The information terminal 4, as illustrated in FIG. 6, is provided with a CPU or a processor (or a terminal processor), a RAM, a ROM, a display unit (or display device) 41, a communication unit (or communication interface) 42, and an issuing unit (or issuing device that may comprise a printer) 43. The CPU is a calculation unit (calculation device) that executes information processing. The RAM and a ROM are a storage unit (storage device) for storing various information. Note that the issuing unit 43 may be integrally configured, or may be a separate body connected via a cable.

The display unit 41 is achieved by a touch panel display or the like, and displays various information such as weighing results of the articles and sales price to the customer. Moreover, the display unit 41 can receive various operations from the customer, and in this respect it can be said that the display unit constitutes the operation unit.

The communication unit 42 achieves a connection between each terminal and device or is achieved by a plurality of communication means. For example, a mutual connection with the issuing unit 43 is achieved by a predetermined dedicated cable. Moreover, a mutual connection with the weighing device 3 is achieved by, for example, a wired or wireless LAN.

The issuing unit 43 generates an adjustment label by printing print data generated by an information processing unit 405 described later on a predetermined medium and ejects the adjustment label from a label issuing port 4*a* illustrated in FIG. 1. Note that the adjustment label may be a so-called receipt of a paper medium, or may be a seal that can be affixed on a container or the like in which the articles are put.

Note that the information terminal 4, in addition to the above, may be provided with a scanner unit, a voice output unit, a tag-reading unit, or the like according to a sales condition of articles-like product or by appropriate specifications.

The scanner unit is a functional unit that optically reads various information and reads a one-dimensional code or two-dimensional code that encodes predetermined information. Thus, for example, it is possible to acquire information by encoding article identification information that can identify articles and adjustment information in a two-dimensional code and reading the encoded information.

The voice output unit outputs predetermined information by voice. Thus, for example, it is possible to output voice guidance or the like and to output an error sound or operation sound.

The tag-reading unit executes reading and writing of information to a contactless IC tag. An example of a contactless IC tag is an RFID (radio frequency identifier) tag. The tag-reading unit executes reading and writing of information by short-range wireless communication utilizing electromagnetic waves, radio waves, or the like between contactless IC tags.

For example, information necessary for container adjustment (for example, information relating to the weight of the container in which the articles are put, container identification information that identifies the container, and the like) may be written to a contactless ID tag and a label incorporating the contactless ID tag may be affixed to the container. The tag-reading unit may acquire information necessary for container adjustment from the contactless ID tag incorporated in the label affixed to the container.

Moreover, the information terminal 4, like the weighing device 3, may alert in response to a state of supply of articles from the article supplying device 2*a* to the weighing device 3 by a message displayed on the display unit 41 or a voice emitted by a separately provided voice output unit. For example, when information relating to a detected value of the weight of the articles is received from the weighing device 3 and the weight of the articles supplied to the weighing device 3 has approached a designated weight, the information terminal 4 may alert that the designated weight has been approached by sound, light, or message.

(Software Configuration of the Information Terminal 4)

The information terminal 4, as illustrated in FIG. 7, is provided with an article information storage unit (or article information storage unit) 4A and a setting information storage unit (or setting information storage) 4B, and a specifying processing unit 401, an extraction processing unit 402, a calculation processing unit 403, a display control unit 404, an information processing unit 405, a communication processing unit 406, and an issuing processing unit 407, which are implemented by the CPU, as software resources. Note that in FIG. 7, the issuing processing unit 407 is connecter to other functional units via the communication processing unit 406, but may be connected to other functional units without going through the communication processing unit 406.

Note that for configuration of the information terminal 4, a configuration wherein the information terminal 4 is linked to the first unit U1 is exemplified, but when the information terminal 4 is linked to the second unit U2 or third unit U3, a configuration other than that described above is possible.

FIG. 8 is a diagram illustrating an example of information stored in an article information storage unit 4A.

The article information storage unit 4A is a storage unit that stores basic information of articles that are to be weighed. The article information storage unit 4A, for example, as illustrated in FIG. 8, stores article identification information, an article name, a weighing classification, a unit price, and a unit weight.

Note that, information stored in the article information storage unit 4A may be that received from a management device installed in a store, a cloud browser existing outside a store, or the like.

The weighing classification is a classification relating to weighing. A weighing classification "0" is a weighing classification corresponding to "non-fixed price". Non-fixed price is a sales method by which a sales price is determined based on a unit price per pre-set unit weight (for example "100 g") and a weight to be sold (weighed value). For articles with the weighing classification "0 (non-fixed price)", a weight to be sold becomes necessary when the sales price is determined. In the first embodiment, articles are provided at a non-fixed price in at least the first unit U1.

When the weighing classification is "0 (non-fixed price)", a unit price per unit weight is stored in a unit price section and a unit weight is stored in a unit weight section. For example, for articles with article identification information "SH001" (article name "AAA"), a unit price of 250 yen per 100 g is stored. Accordingly, articles with the article name "AAA", for example, have a sales price of 125 yen at a weighed value of 50 g and a sales price of 500 yen at a weighed value of 200 g.

A weighing classification "1" is a weighing classification corresponding to "fixed price". Fixed price is a sales method by which a sales price is determined based on a unit price per pre-set unit quantity (for example "1 item") and a sales quantity converted from the unit weight. For articles with the weighing classification "1 (fixed price)", it is necessary to weigh the articles because a numerical quantity of the articles is calculated or estimated from the unit weight of the articles (weight for a unit quantity of 1 item) and the weighed value and the sales price is determined from the calculated or estimated numerical quantity of the articles and the unit price per unit quantity. In the first embodiment, articles are provided at a fixed price in the first unit U2.

Moreover, a weight difference of individual items may use a precision correction function provided on a counting scale or the like.

When the weighing classification is "1 (fixed price)", a unit price per unit weight (that is, numerical "1") is stored in the unit price section and a unit weight corresponding to a numerical quantity "1" is stored in the unit weight section. For example, for a product with article identification information "SH103" (product name "ABC"), a unit price of 90 yen per 1 item (weight 80 g) is stored. Accordingly, articles with the product name "ABC", for example, have a sales price of 90 yen for 1 item at a weighed value of about 85 g and a sales price of 180 yen for 2 items at a weighed value of about 150 g.

The setting information storage unit 4B stores setting information associated with device identification information that can identify the weighing device 3 and article identification information of articles provided by the weighing device 3. Articles provided to the customer by each weighing device 3 can be specified by referencing the setting information storage unit 4B.

Note that, as described above, the device identification information capable of identifying the weighing device 3 may be replaced with converter identification information capable of identifying the AD converter 372 provided by the weighing device 3, but in this case, the setting information storage unit 4B associates and stores converter identification information and article identification information as setting information.

The specifying processing unit 401, when the weight of the articles and device identification information is received from the weighing device 3, references the setting information storage unit 4B to specify article identification information associated with the device identification information based on the device identification information.

The extraction processing unit 402 executes processing for extracting from each storage unit information necessary to execute various processes. For example, for articles specified by the specifying processing unit 401, the extraction processing unit 402 references the article information storage unit 4A to extract article information relating to the name and unit price, etc. of the articles. In this regard, the extraction processing unit 402 constitutes the article information acquisition unit for acquiring article information from the article information storage unit 4A.

The calculation processing unit 403 executes processing for calculating a predetermined value based on various numeric data. For example, the calculation processing unit 403 calculates the sales price of the articles provided to the customer based on the weight of the articles received from the weighing device 3 and the unit price of the articles extracted by the extraction processing unit 402. Note that when a paid container is provided to the customer when the articles are provided, the calculation processing unit 403 may add the purchase price of the container in the sales price calculation.

Moreover, when there is a plurality of articles provided to the customer, the calculation processing unit 403 may calculate the sales price in which the sales prices of the plurality of articles are summed.

Moreover, when there is a plurality of articles provided to the customer, the calculation processing unit 403 may calculate a weight ratio of the plurality of articles. That is, at what proportion the plurality of articles provided to the customer were provided can be represented as a ratio. Such calculation processing is useful when, for example, mixing articles at a predetermined mixture ratio such as when the articles are coffee beans or nuts.

The display control unit 404 causes display of various information on the display unit 41. For example, the display control unit 404 causes display of information extracted from the article information storage unit 4A by the extraction processing unit 402 and information relating to the sales price of the articles calculated by the calculation processing unit 403 on the display unit 41. Moreover, the display control unit 404 receives the above-described information that has been appropriately processed, edited, and configured as selectable information (first information display region described later), and the operation to complete the registration of articles to cause an operation object (e.g., button, icon, etc.) for receiving an issue request for an adjustment label to also be displayed on the display unit 41.

The information processing unit 405 generates print information relating to details to be printed on an adjustment label. Print information generated at this time includes at least information relating to the sales price of the articles calculated by the calculation processing unit 403, as well as information such as the name of the articles stored in the article information storage unit 4A, and adjustment information necessary for adjustment of articles, such as information relating to the weighing results of the articles by the weighing device 3.

The information processing unit 405 transmits generated print information to the issuing processing unit 407.

Note that print information or adjustment information included in the print information may be encoded in a one-dimensional or two-dimensional code.

The communication processing unit 406 executes sending and receiving of data with the issuing processing unit 407 and sending and receiving of data with the weighing device 3 in accordance with a predetermined communication protocol.

The information terminal 4 receives device identification information as well as information relating to the weight of the articles from the weighing device 3 by the communication processing unit 406 and transmits print information to the issuing processing unit 407.

Note that the communication processing unit 406 may further execute sending and receiving of data with higher-order devices and the like by a wired or wireless LAN (Local Area Network), Bluetooth (registered trademark), or the like. Moreover, it may execute sending and receiving of data with an external server via a network such as the Internet.

The issuing processing unit 407 controls the issuing unit 43 to cause printing of print information generated by the information processing unit 405 on a predetermined medium and causes an adjustment label to be issued.

The information terminal 4, in addition to these functional units, is also provided with a setting file and the like relating to a GUI layout and the like to be expanded on the display unit 41.

Using FIG. 6 and FIG. 7, a hardware configuration and software configuration have been described, but the software resources described above may be dispersed or aggregated in any hardware resources by appropriate design, and the hardware resources may be configured as a physically integrated device or as separate devices.

For example, instead of or in addition to the information terminal 4, the one or more weighing devices 3 may be provided with an article information storage unit 4A or calculation processing unit 403. In this case, the weighing device 3 may transmit to the information terminal 4 device identification information, weight information of the articles, and unit price information of the articles, and the weighing device 3 may, after calculating the sales price of the articles provided to the customer from the unit price and weight of the articles, transmit the calculated sales price to the information terminal 4.
(First Operation Mode)

Below, a first operation mode will be described as an example of an operation mode of the information terminal 4 in the weighing sales system 1 when articles are provided by the first unit U1.
(Flow of Processing)

Figure 9:
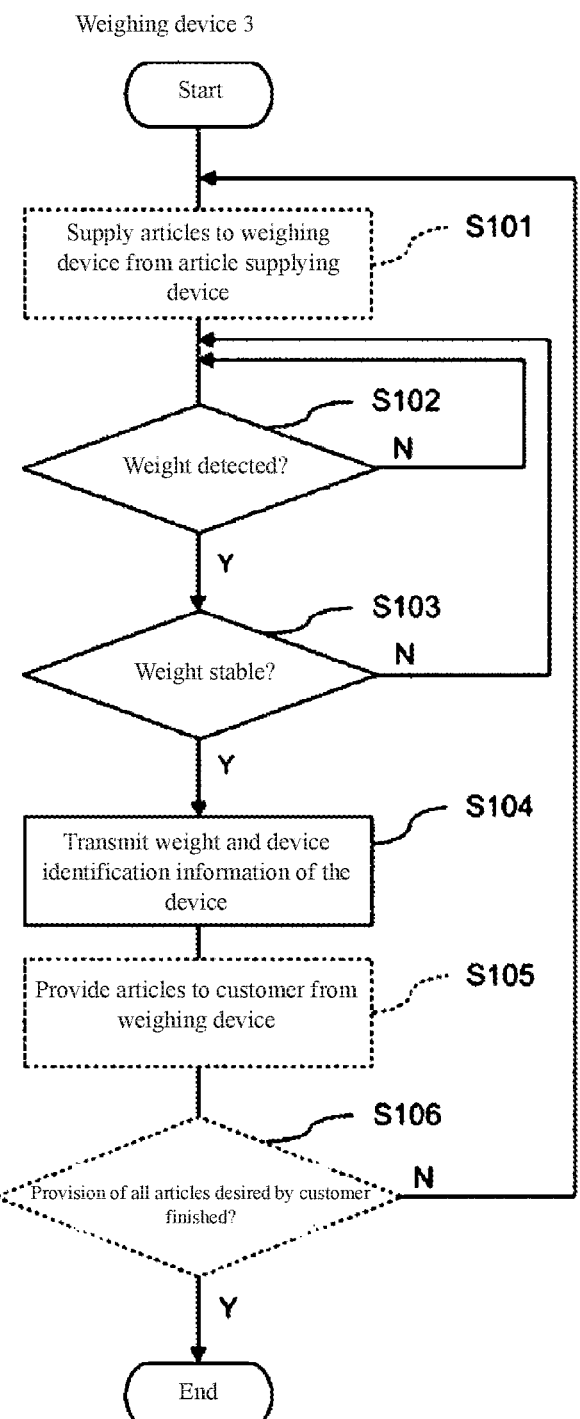
FIG. 9 shows a flowchart illustrating a flow of operation of the weighing device.
Figure 10:
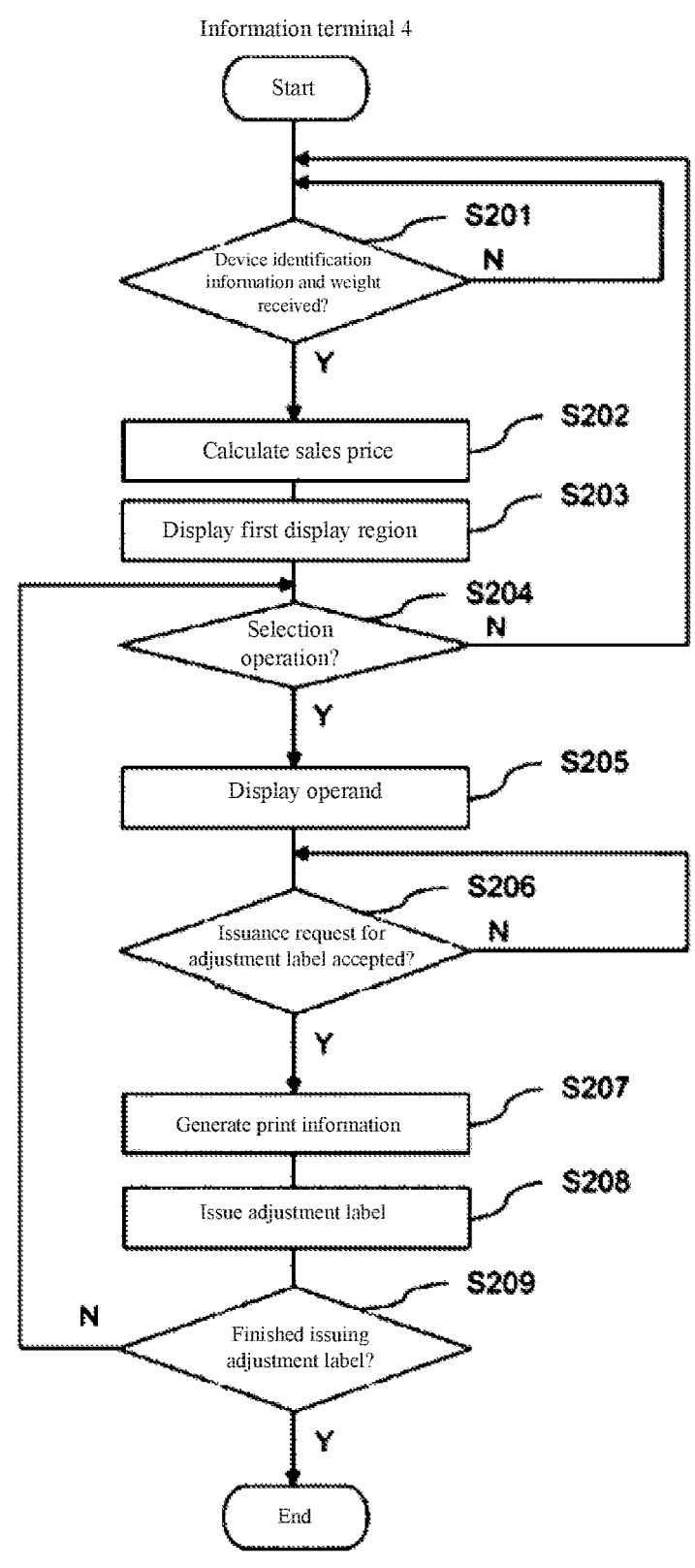
FIG. 10 shows a flowchart illustrating a flow of operation according to a first operation mode of the information terminal.

The first operation mode and the like of the information terminal 4 when articles are provided by the first unit U1 will be described with reference to FIG. 9 and FIG. 10. FIG. 9 is a flowchart illustrating a flow of operation of the weighing device 3. FIG. 10 is a flowchart illustrating a flow of operation according to the first operation mode of the information terminal 4. Note that operation of the weighing device 3 illustrated in FIG. 9 is shared regardless of the particular operation mode of the information terminal 4 (first operation mode to third operation mode).

On the store side, before use of the weighing sales system 1, device identification information that can identify each weighing device 3 and article identification information of the articles provided to a customer via each weighing device 3 are associated and retained in the setting information storage unit 4B.

Moreover, when a paid container is provided to the customer, a paid container purchase operation is received from the customer on the information terminal 4. The purchase operation of the container, for example, expands a container selection screen by size on the display unit 41, causes the customer to select, and registers the selected container as a product. Moreover, an IC tag pre-attached to the actual container is read on a separately provided tag-reading unit, a one-dimensional or two-dimensional code affixed or printed on the actual container is read by a separately provided scanner, and the identified container is registered as a product.

As illustrated in FIG. 9, the customer selects the article supplying device 2a in which desired articles are contained, operates the operation unit 23, and when the articles are provided to the weighing device 3 from the article supplying device 2a (S101), the detection processing unit 301 detects a weight of articles provided to the weighing device 3 by the weighing unit 37 (S102).

When the customer ends the operation to provide articles to the weighing device 3 from the article supplying device 2a, the detection processing unit 301 detects that the weight of the articles supplied to the weighing device 3 is stable (S103). In response to this, the weight of the articles and device identification information of the device itself (weighing device 3 stored in the identification information storage unit 3A) is transmitted from the weighing device 3 to the information terminal 4 (S104).

When supply of articles of a desired weight to the weighing device 3 ends, the customer operates the weighing device 3 and puts the articles of a desired weight in the container (S105). The customer repeats the operation until provision for all desired articles is received (S106).

Note that for processing executed by the weighing device 3 in response to an operation of the weighing device 3 by the customer, in the above example, when the detection processing unit 301 detects that the weight of the articles is stable, the weight of the articles and device identification information of the weighing device 3 are transmitted to the information terminal 4 from the weighing device 3. Regarding this, in another example, the configuration may be such that after the weight has stabilized, when the customer presses a predetermined completion button, the weight of the articles is finalized and data relating to the weight is stored in memory. In this case, after the weight of the articles is finalized, when the customer operates the operation unit 23, in response, articles are provided to the customer and the weight of the articles and device identification information of the weighing device 3 are transmitted from the weighing device 3 to the information terminal 4. Here, until the operation unit 23 is operated, it is possible to supply additional articles to the weighing device 3, and when the customer again presses the predetermined completion button, the weight of the articles is updated and data relating to the weight after update is overwritten to the memory.

Furthermore, as a result of the customer operating the operation unit 23, the weight of the articles and device identification information is transmitted to the information terminal 4, and when the operation unit 23 returns to its original state, a zero reset is automatically performed on the weighing device 3. At this time, if the weight of the articles remaining in the weighing device 3 is at or above a control value, an error may be alerted. Note that a time of operation start of the operation unit 23 or a state at a time of operation can be determined by, for example, providing a predetermined completion button and a switch on the operation unit 23.

Meanwhile, as illustrated in FIG. 10, the information terminal 4, when device identification information and information relating to the weight of the articles are received from the weighing device 3 (S201), the sales price of the articles provided to the customer are calculated (S202).

Here, details of steps for calculating the sales price of the articles will be described. First, the specifying processing unit 401 references the setting information storage unit 4B to specify articles associated with the device identification information based on device identification information received from the weighing device 3. For the specified articles, when the extraction processing unit 402 extracts information relating to a unit price of the articles from the article information storage unit 4A, the calculation processing unit 403 calculates the sales price of the articles based on the unit price of the articles and the weight of the articles received from the weighing device 3. Note that when a paid container is provided to the customer when the articles are provided, the purchase price of the container is added in the sales price calculation.

Note that in the information terminal 4, information relating to the weight of the articles received from the weighing device 3 and information relating to the calculated sales price are made to be stored in a temporary storage region or the like, but even when information relating to the weight of the articles is received a plurality of times and the sales price is calculated a plurality of times, if the information is overwritten and registered each time, accuracy of the information is not harmed.

When the sales price of the articles is calculated, a first information display region corresponding to the articles for which the sales price is calculated is displayed on the display unit 41 (S203). The first information display region will be redescribed in a latter part (Screen Example), but is a button (preset key) that receives a selection operation for completing registration of the articles as an adjustment target and targeting the articles for adjustment label issuing, and the weight of the provided articles and information of sales price and the like is displayed thereon.

On the display unit 41, information and the like relating to weight is received at step S201, and the first information display region corresponding to each kind of articles for which the sales price is calculated is displayed at step S203. From among these, the customer completes registration as a purchase target and selects the first information display region corresponding to articles for which issuing of an adjustment label is requested (S204).

When the predetermined first information display region is selected by the customer, the information terminal 4 displays on the display unit 41 an operation object for receiving an operation to complete registration of the articles corresponding to the predetermined first information display region and for receiving an issue request for an adjustment label of the articles (S205).

When the operation object is pressed and the issue request for the adjustment label is thus received (S206), the information processing unit 405 generates print information relating to details to be printed on the adjustment label (S207). The print information generated at this time includes information of the articles corresponding to the selected first information display region and information relating to the sales price of the articles.

The print information generated by the information processing unit 405 is transmitted to the issuing processing unit 407 and the issuing processing unit 407 controls the issuing unit 43 to issue an adjustment label (S208). Information of the articles corresponding to the selected first information display region and the sales price of the articles are appropriately encoded and displayed on the adjustment label issued at this time.

The customer performs a selection operation using the first information display region and an issue request for an adjustment label for each kind of the articles for which provision has been received, and issuing of an adjustment label is received for each of the articles for which provision has been received (S209).

The customer who has received an adjustment label ejected from the label issuing port 4a inputs information and the like relating to the sales price of the articles printed on the adjustment label to a prepared store terminal or the like for adjustment and executes a settlement operation corresponding to a predetermined settlement means.

The above processing allows the customer to receive provision of articles of a desired amount.

Note that in order to prevent the customer from forgetting to take the adjustment label, a sensor for preventing the customer from forgetting to take the label may be installed to alert of forgetting to take the label.

Moreover, adjustment processing for articles using an adjustment label may be executed by a clerk receiving the adjustment label from the customer.

Moreover, in the first operation mode, when a detected value of the weight of the articles is stable in the weighing device 3, the weight of the articles and device identification information are transmitted from the weighing device 3 to the information terminal 4, but the timing for this may be when the operation unit 34 of the weighing device 3 is operated and the articles are actually provided to the customer.

Moreover, when the operation unit 34 of the weighing device 3 is operated without the detected value of the weight of the articles stabilizing in the weighing device 3, the weighing sales system 1 may detect this as an unauthorized operation and output an alert.

Moreover, the weighing device 3 may be made to automatically perform a zero reset of a weight detected value after the operation unit 34 is operated and the articles are provided to the customer (processing for setting the weighed value at that time to a zero standard). At this time, if articles remain in the weighing device 3, it is favorable to display a message or the like that "articles are still left" on the display unit 41 to alert the customer to take caution. Thus, the customer can receive provision of articles without leaving behind even a small amount. Meanwhile, when no articles remain in the weighing device 3 or the amount is a miniscule amount that is in a range where a zero reset is permitted, a zero reset may be performed without alerting. Thus, a zero reset is reliably performed each time for a detected value of the weight and an accurate weight (weighed value) is detected without requesting a zero reset from the customer.

(Screen Example)

Figure 11A:
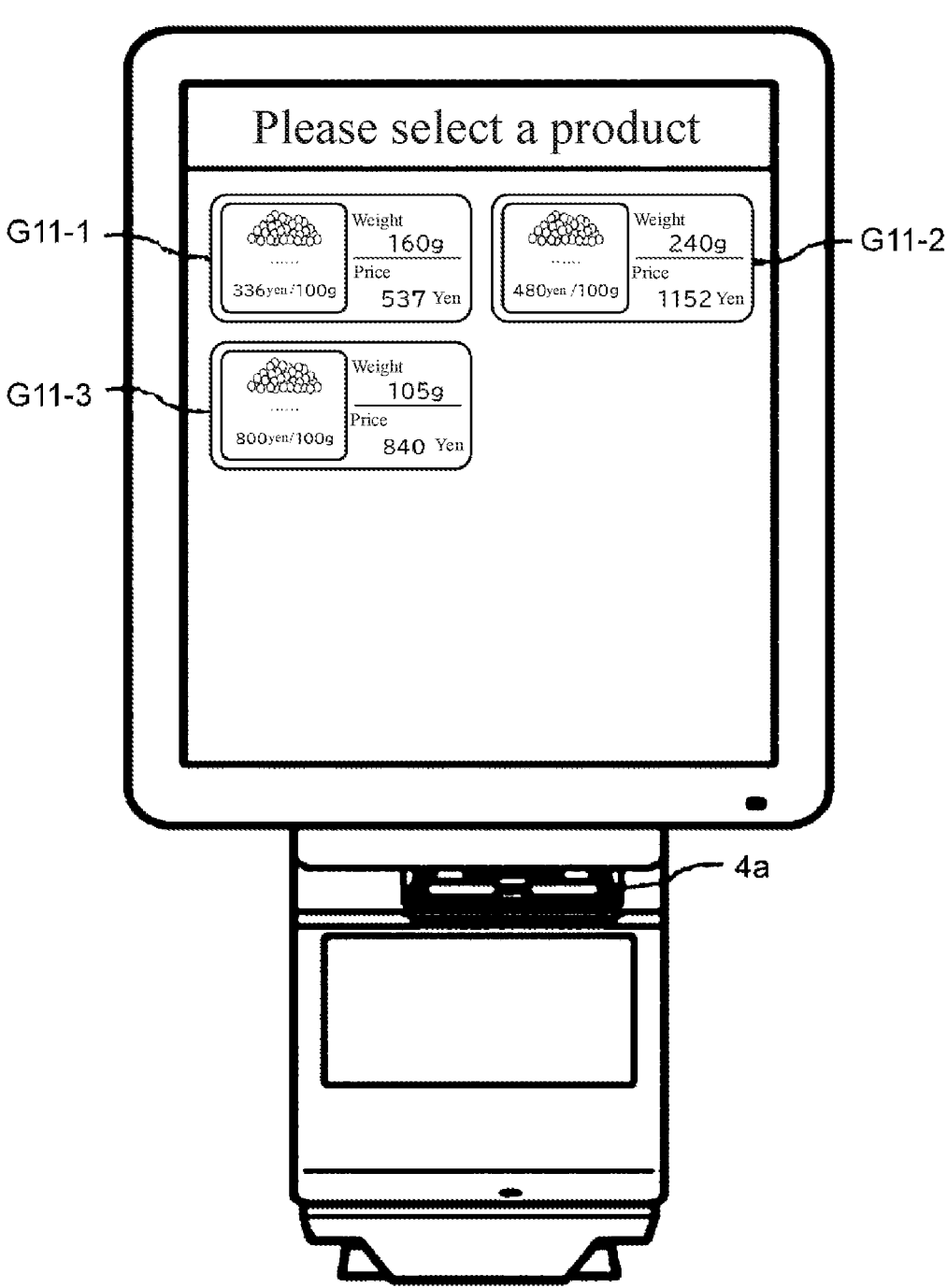
FIG. 11A shows a diagram describing, in the first operation mode, display and the like of the information terminal in a situation before a product is selected.

Display and the like on the information terminal 4 in the first operation mode will be described with reference to FIG. 11A to FIG. 11C. FIG. 11A is a diagram describing, in the first operation mode, display and the like of the information terminal 4 in a situation before a product is selected.

A first information display region G11 generated for each kind of articles provided to the customer (first information display region G11-1, first information display region G11-2, first information display region G11-3) is displayed on the screen illustrated in FIG. 11A. Note that the information terminal 4 displays the first information display region G11 each time a process of step S203 in FIG. 10 is executed.

A name of the articles, an article image, as well as a unit price, weight, and sales price are displayed in the first information display region G11. For example, a unit price "336", a weight "160", and a sales price "537" are displayed in the first information display region G11-1 Moreover, the first information display region G11 is also configured as a button that can be pressed on the screen, and by pressing, a selection operation for registering as an adjustment target and targeting for adjustment label issuing is received. Note that at the top of the screen, a message "Please select a product" is displayed, promoting pressing of the first information display region G11.

Note that in the example of FIG. 11A, information displayed in the first information display region G11 is one example. Other information relating to the articles may be further displayed, and different information from this example and information restricted to less than this may be displayed.

Figure 11B:
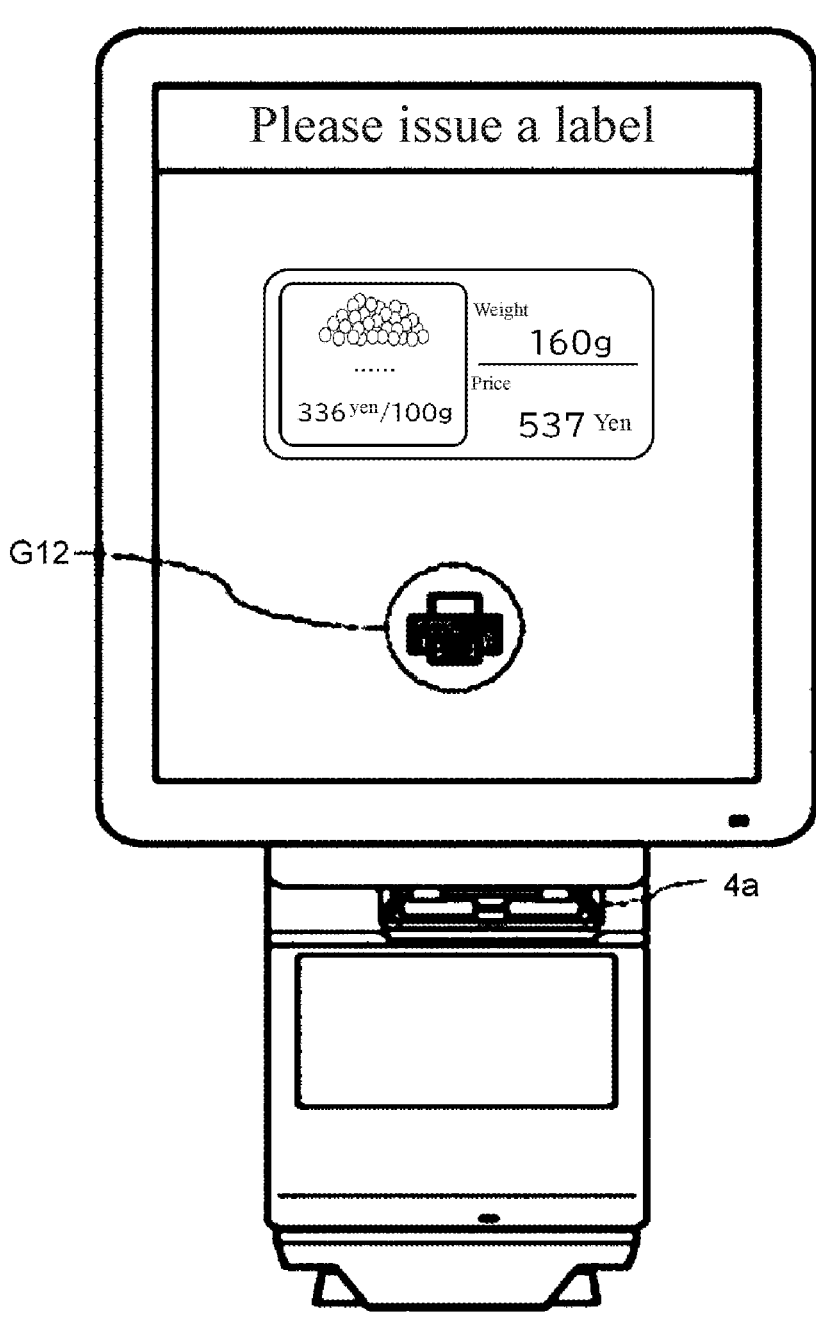
FIG. 11B shows a diagram describing, in the first operation mode, display and the like of the information terminal in a situation after a product is selected.

FIG. 11B is a diagram describing, in the first operation mode, display and the like of the information terminal 4 in a situation after a product is selected.

The screen illustrated in FIG. 11B is a screen when the first information display region G11-1 is selected by the customer in the screen illustrated in FIG. 11A.

Details corresponding to the first information display region G11-1 selected by the customer are displayed in an enlarged manner in the center on the screen illustrated in FIG. 11B. Moreover, below the first information display region G11-1 displayed in an enlarged manner, an operation object G12 for receiving an operation to complete the registration and for receiving issue requests for an adjustment label for articles shown by the first information display region G11-1 is displayed on the screen. Moreover, a message "Please issue a label" is displayed at the top of the screen, and pressing of the operation object G12 is promoted.

Figure 11C:
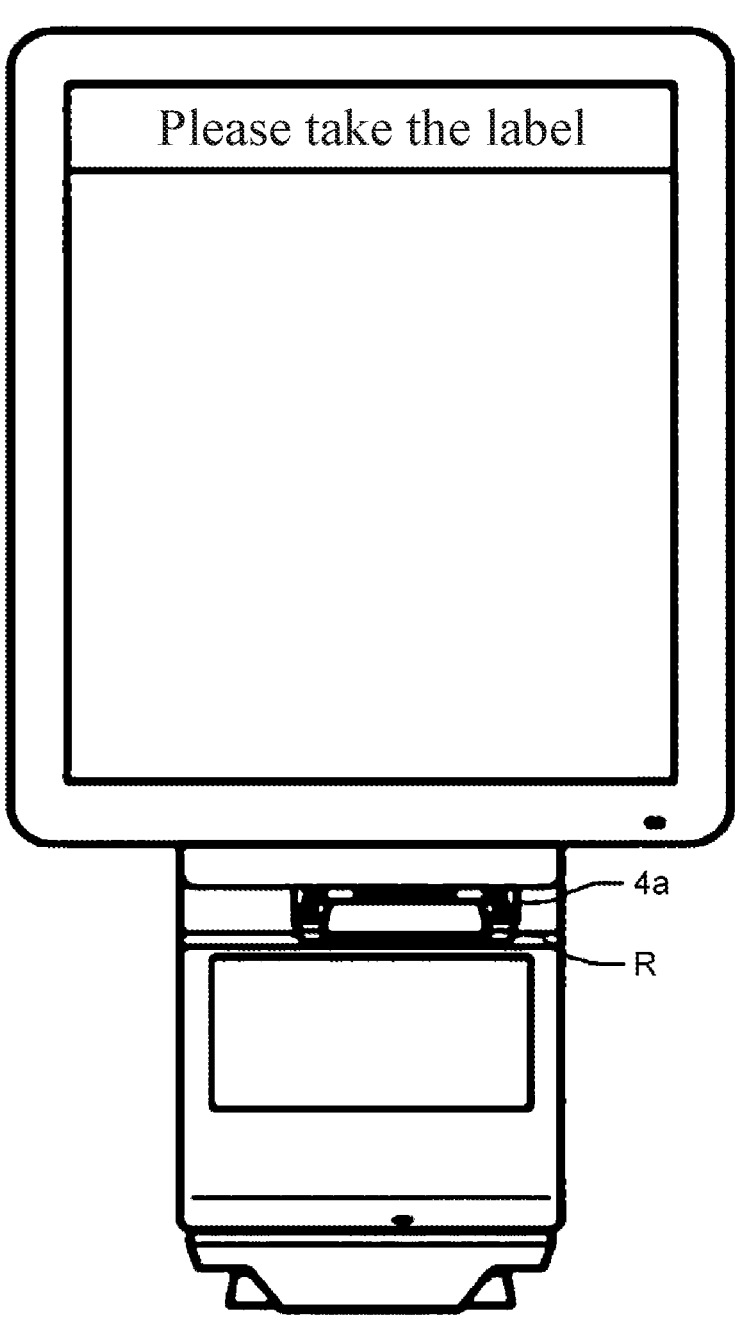
FIG. 11C shows a diagram describing, in the first operation mode, display and the like of the information terminal in a situation where a label is issued.

FIG. 11C is a diagram describing, in the first operation mode, display and the like of the information terminal 4 in a situation where a label is issued.

The screen illustrated in FIG. 11C is a screen when the operation object G12 is pressed on the screen illustrated in FIG. 11B.

From the label issuing port 4a of the information terminal 4, an adjustment label R of the articles corresponding to the first information display region G11-1 is ejected in response to pressing of the operation object G12.

A message "Please take the label" is displayed at the top of the screen, and taking of the adjustment label R is promoted.

When the customer pulls the adjustment label R out of the label issuing port 4a, a screen on which the remaining first information display regions G11-2, G11-3 can be selected is expanded, and the customer performs the same operation for the first information display regions G11-2, G11-3 as for the first information display region G11-1.

Note that the weighing sales system 1 does not prevent a plurality of customers from operating at the same time. Therefore, under use wherein simultaneous operation of the weighing sales system 1 by a plurality of customers is allowed, the first information display region G11 generated in response to operation of a plurality of customers is displayed on the display unit 41 of the information terminal 4. However, issuing of the adjustment label R is executed in response to selection of the first information display region G11 and pressing of the operation object G12 after selection, so the customer can select only the first information display region G11 corresponding to the articles for which they have received provision and can receive issuing of the adjustment label R without mistakenly selecting the first information display region G11 displayed in response to operation of someone else.

Moreover, under use wherein one customer monopolizes and operates the weighing sales system 1, the adjustment label R may be automatically issued for each kind of articles in response to operation of the weighing device 3 without displaying the first information display region G11 on the screen of the information terminal 4.

(Second Operation Mode)

Next, a second operation mode will be described as an example of an operation mode of an information terminal 4 in the weighing sales system 1 when articles are provided by the first unit U1.

(Flow of Processing)

Figure 12:
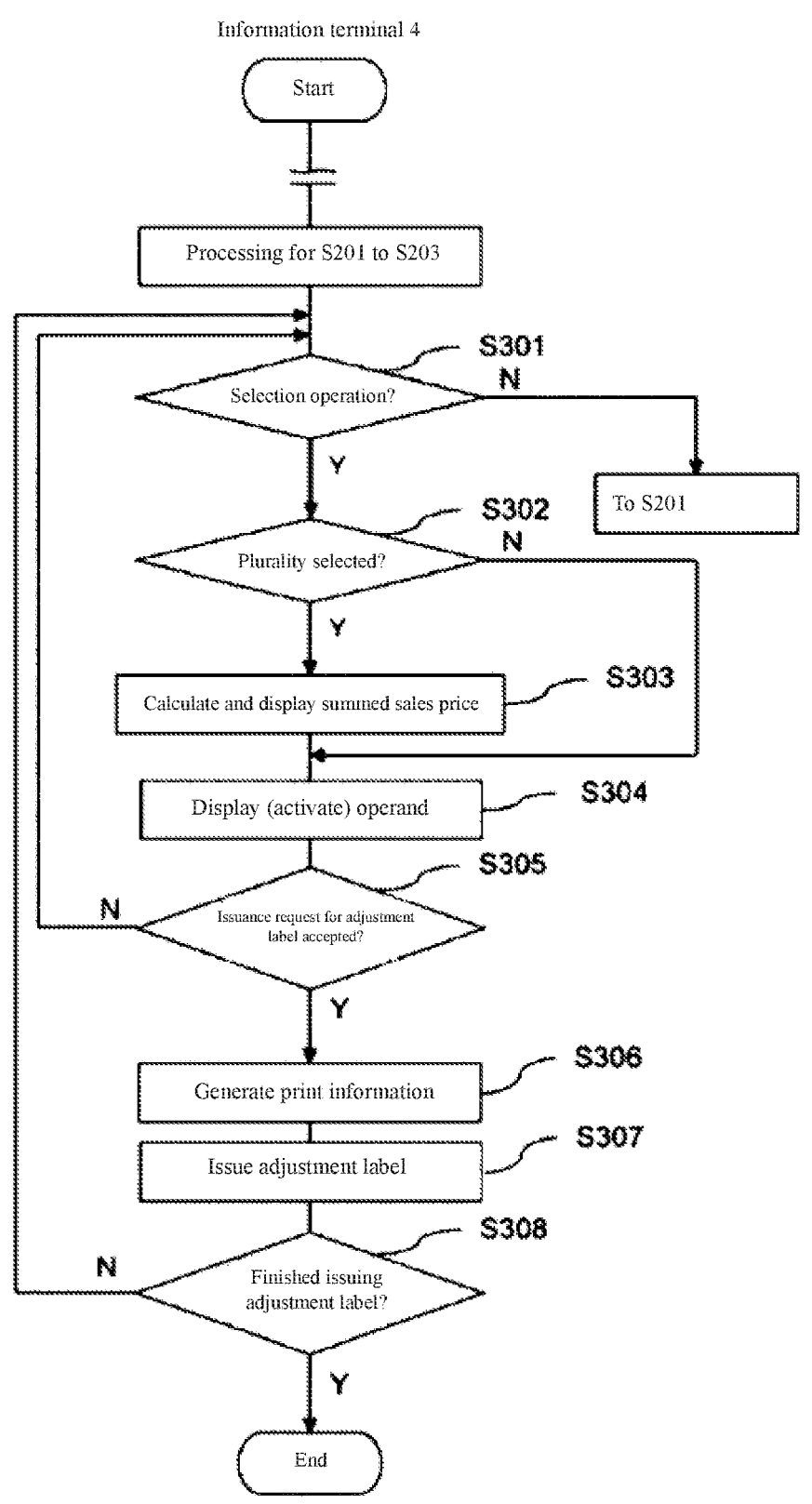
FIG. 12 shows a flowchart illustrating a flow of operation according to a second operation mode of the information terminal.

The second operation mode of the information terminal 4 when articles are provided by the first unit U1 will be described with reference to FIG. 12. FIG. 12 is a flowchart illustrating a flow of operation according to the second operation mode of the information terminal 4.

In the first operation mode, the information terminal 4 issues an adjustment label for each kind of articles, but in the second operation mode, the information terminal 4 issues a consolidated adjustment label for a plurality of articles.

Note that a portion of processing in the second operation mode is similar to the second operation mode.

Note that as described above, operation and the like of the weighing device 3 when the information terminal 2 behaves in the second operation mode is similar to operation and the like of the weighing device 3 when the information terminal 2 behaves in the first operation mode.

As illustrated in FIG. 12, like in the first operation mode, when device identification information and information relating to the weight of the articles are received from the weighing device 3 (S201), the information terminal 4 calculates the sales price of the articles provided to the customer (S202), and displays the first information display region corresponding to the articles for which the sales price was calculated on the display unit 41 (S203).

On the display unit 41, information and the like relating to weight is received at step S201, and the first information display region corresponding to each article for which the sales price is calculated is displayed at step S203. From among these, the customer completes registration as a purchase target and selects the first information display region corresponding to articles for which issuing of an adjustment label is requested (S301).

Here, when a plurality of the first information display region is selected (S302), the sales prices of the articles corresponding to the plurality of selected first information display regions are summed by the calculation processing unit 403 and the summed sales price is displayed (S303).

Meanwhile, when there is one selected first information display region, the sales price of the articles corresponding to the one selected first information display region is displayed on the display unit 41.

Moreover, in conjunction with a selected operation of the customer, an operation object for receiving the operation to complete the registration of the articles corresponding to the first information display region selected by the customer and for receiving an issue request for an adjustment label of the articles is displayed on the display unit 41 (S304).

When the operation object is pressed and registration of the articles corresponding to the selected first information display region and the issue request for the adjustment label are thus received (S305), the information processing unit 405 generates print information relating to details to be printed on the adjustment label (S306). The print information generated at this time includes information of the articles corresponding to the selected first information display region and information relating to the sales price of the articles. Moreover, when a plurality of the first information display region is selected, information of the articles corresponding to the plurality of first information display regions and information relating to the sales price in which the sales prices of the plurality of articles were summed are included in print information.

The print information generated by the information processing unit 405 is transmitted to the issuing processing unit 407 and the issuing processing unit 407 controls the issuing unit 43 to issue an adjustment label (S307). Information of the articles corresponding to the selected first information display region and the sales price in which the sales prices of the articles are summed, and the like are appropriately encoded and displayed on the adjustment label issued at this time, so information of the plurality of articles is consolidated on one adjustment label.

The customer performs a selection operation using the first information display region and an issue request for an adjustment label for all of the articles for which provision has been received, and issuing of an adjustment label is received for each of the articles for which provision has been received (S308).

The customer who has received the adjustment label ejected from the label issuing port 4a inputs information relating to the sales price of the articles printed on the adjustment label to a prepared store terminal or the like for adjustment and executes a settlement operation corresponding to a predetermined settlement means.

A consolidated adjustment label is issued for articles optionally selected by the customer by the above processing. As a result, work is reduced compared to when issuing individual adjustment labels for all articles.

Note that although the second operation mode displays the operation object when the first information display region is selected, the operation object is regardless always displayed on the display unit 41 and when the first information display region is displayed on the display unit 41 or when the displayed first information display region is selected, the operation object may be activated to be pressable.

Moreover, when only one first information display region is displayed on the display unit 41, the operation object is displayed regardless of a selection operation of the first information display region and pressing of the operation object may be received. In this case, from a state in which only one first information display region is displayed, when another first information display region is displayed and a plurality of first information display regions is displayed, the operation object may be temporarily deactivated and the operation object activated when any first information display region is selected.

(Screen Example)

Figure 13A:
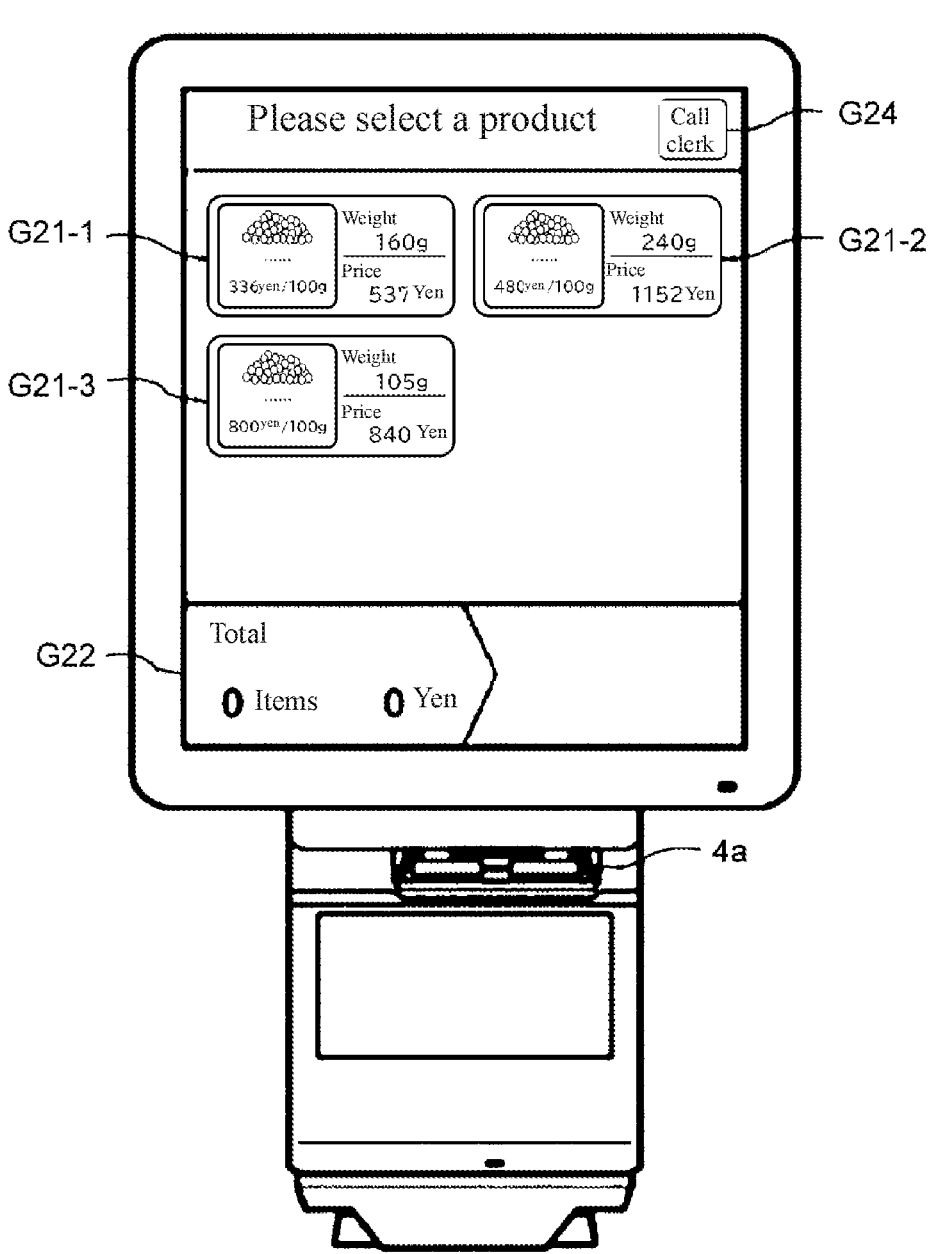
FIG. 13A shows a diagram describing, in the second operation mode, display and the like of the information terminal in a situation before a product is selected.

Display and the like on the information terminal 4 in the second operation mode will be described with reference to FIG. 13A to FIG. 13D. FIG. 13A is a diagram describing, in the second operation mode, display and the like of the information terminal 4 in a situation before a product is selected.

A first information display region G21 generated for each kind of articles provided to the customer (first information display region G21-1, first information display region G21-2, first information display region G21-3) is displayed on the screen illustrated in FIG. 13A. Note that the information terminal 4 displays the first information display region G21 each time a process of step S203 in FIG. 12 (FIG. 10) is executed.

The first information display region G21, like the first information display region G11 described above, has predetermined information displayed therein. For example, a unit price "336", a weight "160", and a sales price "537" are displayed in the first information display region G21-1 and a unit price "480", a weight "240", and a sales price "1152" are displayed in the first information display region G21-2. Moreover, the first information display region G21, like the first information display region G11 described above, is also configured as a button that can be pressed on the screen, and by pressing, a selection operation for registering as an adjustment target and targeting for adjustment label issuing is received.

The second information display region G22 is provided at the bottom of the screen. A number of articles corresponding to the selected first information display region G21 and the sales price in which the sales prices of articles corresponding to the selected first information display region G21 are summed are displayed in the second information display region G22. Note that in the case of FIG. 13A, because the first information display region G21 has not been selected, the number of articles is displayed as "0" and the sales price is displayed as "0 yen" on the second information display region G22.

At the top of the screen, a message "Please select a product" is displayed, promoting pressing of the second information display region G21. Moreover, a "Call clerk" button G24 for calling a clerk is provided at the top of the screen. When the "Call clerk" button G24 is pressed, a notification that a call has been made is transmitted to a terminal or the like used by the clerk and the clerk who checks this goes to the information terminal 4 that made the call.

The "Call clerk" button G24 is pressed when there is a malfunction in the device or when the customer has trouble with some operation. For example, it is pressed when the customer supplies articles of more than a desired amount to the weighing device 3 from the article supplying device 2a due to a mistaken operation or the like. Even when articles of more than a desired amount are supplied to the weighing device 3 in this way, so long as the articles are in the weighing device 3, that is, in a stage before the articles are put into the customer's container or the like, return of the articles is possible by handling of the called clerk.

Note that the "Call clerk" button G24 may always be displayed on the screen or may be displayed on the screen only when in a state where intervention by a clerk is necessary. Moreover, when it is determined that intervention by a clerk is indeed necessary due to a malfunction of the device or the like, calling of a clerk may be executed automatically without pressing of the "Call clerk" button G24 by the customer.

Moreover, the information terminal 4 may be provided with "Call clerk" as a mechanical key instead of or in addition to display of the "Call clerk" button G24.

Figure 13B:
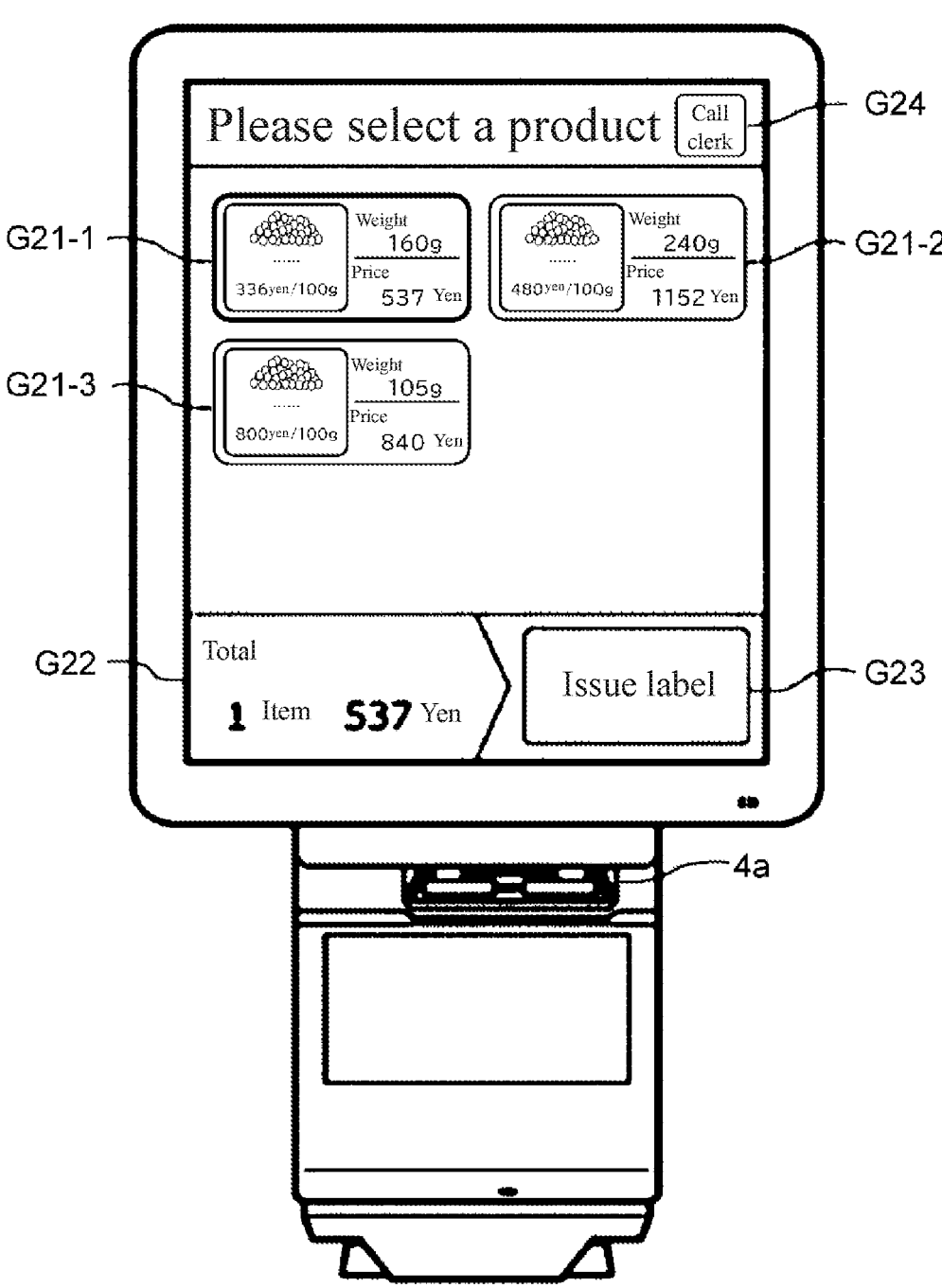
FIG. 13B shows a diagram describing, in the second operation mode, display and the like of the information terminal in a situation after a first product is selected.

FIG. 13B is a diagram describing, in the second operation mode, display and the like of the information terminal 4 in a situation after a first product is selected.

The screen illustrated in FIG. 13B is a screen when the first information display region G21-1 is selected by the customer on the screen illustrated in FIG. 13A.

On the screen illustrated in FIG. 13B, in order to distinguish between the first information display region G21 selected by the customer and the first information display region G21 which was not selected, they are displayed using respectively different display forms. Specifically, on the screen illustrated in FIG. 13B, the first information display region G21-1 selected by the customer is displayed using a bold-line frame to distinguish from the first information display regions G21-2, G21-3 which were not selected. In the second information display region G22 of the screen, in accordance with the first information display region G21-1 being selected, the number of articles is displayed as "1" and the sales price is displayed as "537 yen". At the bottom of screen and next to the second information display region G22, an operation object G23 for receiving the operation to complete the registration and for receiving issue requests for an adjustment label for articles corresponding to the selected first information display region G21-1 is displayed.

Figure 13C:
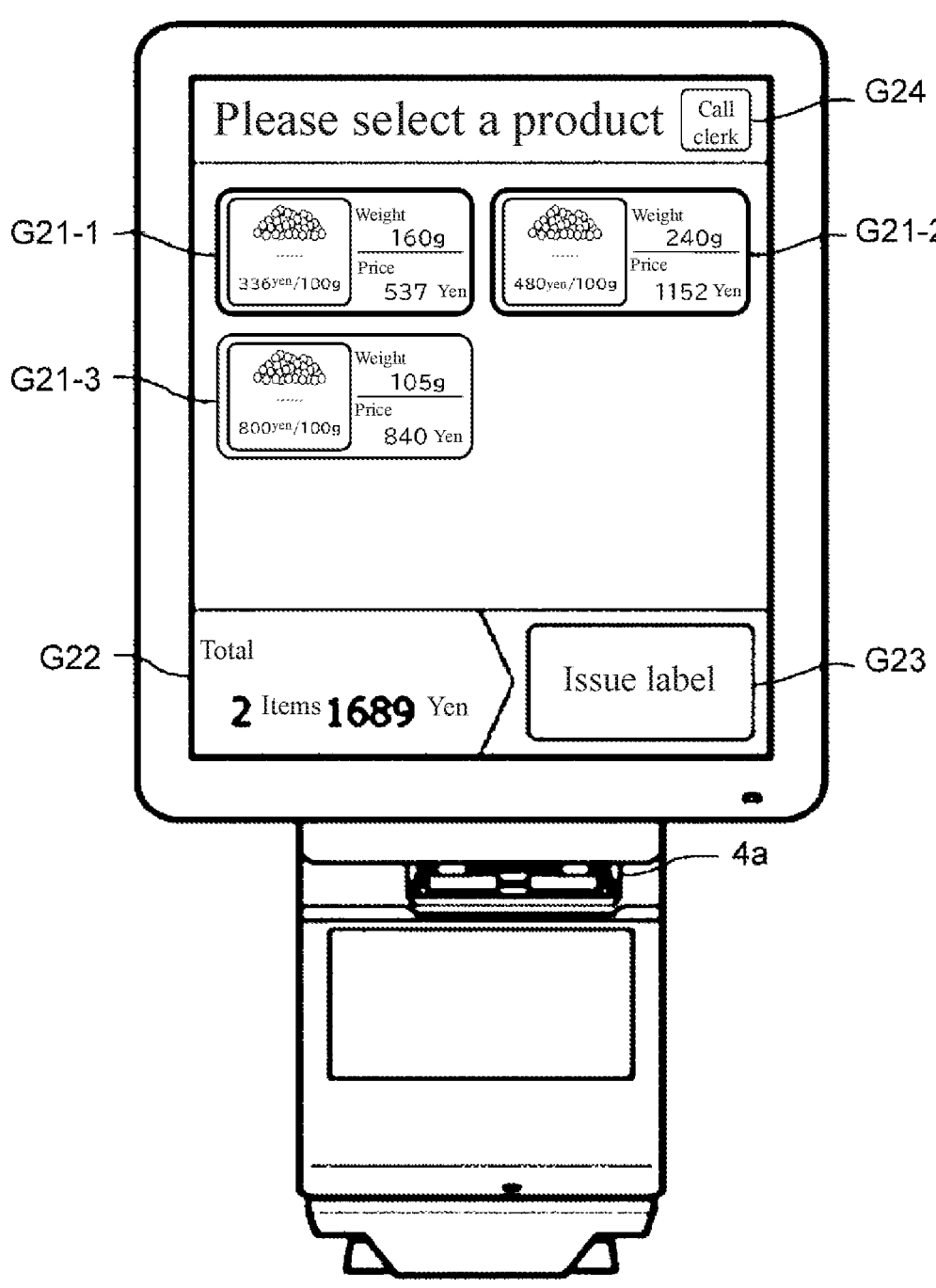
FIG. 13C shows a diagram describing, in the second operation mode, display and the like of the information terminal in a situation after a second product is selected.

FIG. 13C is a diagram describing, in the second operation mode, display and the like of the information terminal 4 in a situation after a second product is selected.

The screen displayed in FIG. 13C is a screen when the first information display region G21-2 is further selected by the customer on the screen illustrated in FIG. 13B. That is, the screen illustrated in FIG. 13C illustrates a screen when a plurality of the first information display region G21 (first information display regions G21-1, G21-2) are selected.

On the screen illustrated in FIG. 13C, the first information display regions G21-1, G21-2 selected by the customer are displayed using a bold-line frame to distinguish from the other first information display region G21-3 which was not selected. In the second information display region G22 of the screen, in accordance with the first information display region G21-1 and the first information display region G21-2 being selected, the number of articles is displayed as "2" and the sales price is displayed as "1689 yen" (sales price in which the sales prices of the selected articles are summed).

Note that on the screen, the first information display region G21 corresponding to articles for which registration is complete can be displayed distinguished from the first information display region G21 corresponding to articles for which registration is not complete, and thus, the customer can prevent operation oversights for articles for which provision has been received.

Moreover, when the first information display region G21 corresponding to articles which have been provided to a predetermined customer is displayed, the first information display region G21 corresponding to articles which have been provided to a customer other than the predetermined customer can be made to not display until processing for the predetermined customer is complete. Then, in this case, when there is a first information display region G21 which is not selected despite being displayed on the screen, an error may be alerted. Moreover, when processing for another customer is not executed until processing for one customer is complete, selection of the first information display region G21 may be made unnecessary. However, the first information display region G21 may be selected for a final confirmation by the customer. Furthermore, when the customer notices the mistake at this point, it is necessary to have the clerk perform an operation such as cancellation, so the customer presses the "Call clerk" button G24 (the mechanical key when provided as a mechanical key for "Call clerk") to call the clerk. Note that the cancellation operation may be performed by the customer, but it is favorable to have the clerk intervene from the perspective of fraud prevention. However, by determining a member rank or the like of the customer, customers of a predetermined member rank or above may be made able to perform a "cancellation operation". In this case, it is favorable to alert the customer with guidance such as "Please bring the product (articles) to be returned to a clerk".

Note that when allowing a plurality of customers to perform an operation at the same time, a mistakenly displayed first information display region G21 will be left up, so a mistakenly displayed first information display region G21 may be removed from the screen by a timer control. However, considering the possibility of unauthorized operation, it is favorable to record an operation log or to prompt confirmation by the clerk using a terminal or the like used by the clerk in response to a predetermined situation.

Figure 13D:
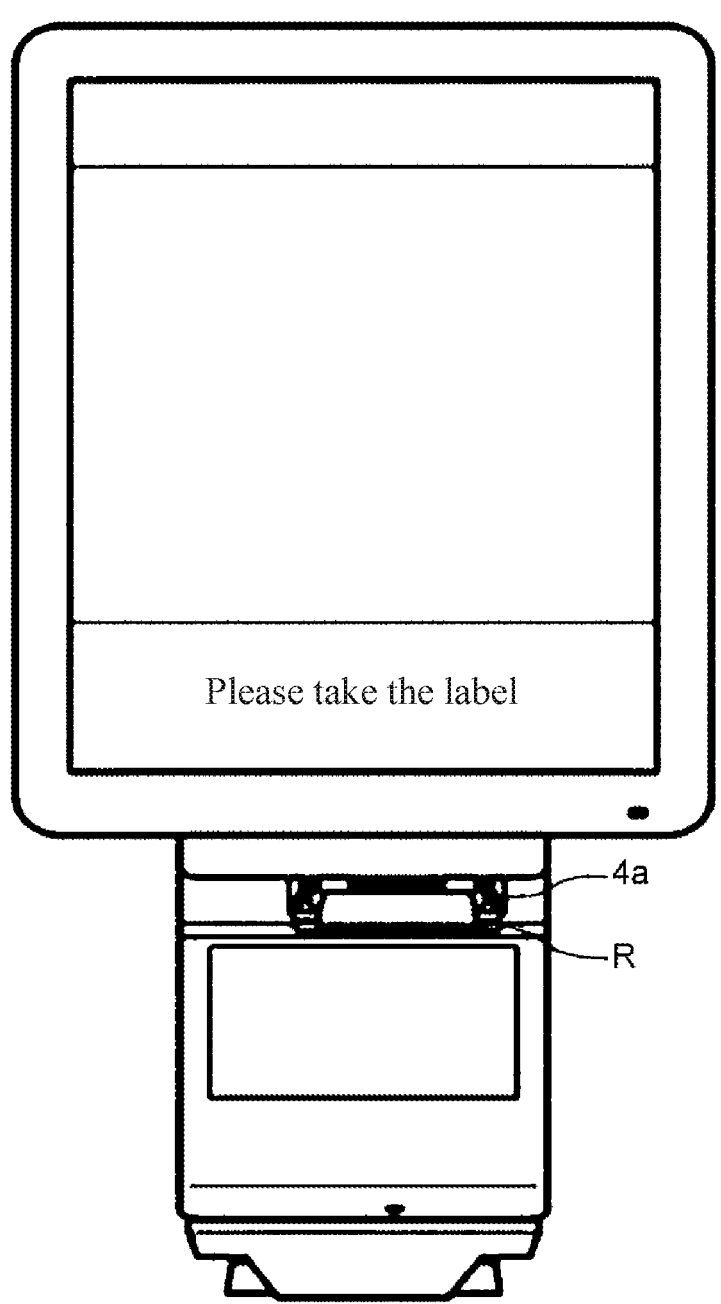
FIG. 13D shows a diagram describing, in the second operation mode, display and the like of the information terminal in a situation where a label is issued.

FIG. 13D is a diagram describing, in the second operation mode, display and the like of the information terminal 4 in a situation where a label is issued.

The screen illustrated in FIG. 13D is a screen when the operation object G23 is pressed on the screen illustrated in FIG. 13C.

From the label issuing port 4a of the information terminal 4, the adjustment label R in which the articles corresponding to the first information display region G21-1 and the articles corresponding to the first information display region G21-2 are consolidated is ejected in response to pressing of the operation object G23.

A message "Please take the label" is displayed at the bottom of the screen, and taking of the adjustment label R is promoted.

When the customer takes the adjustment label R out of the label issuing port 4a, a screen on which the remaining first information display region G21-3 is displayed is expanded, and the customer performs the same operation for the first information display region G21-3 as for the first information display regions G21-1, G21-2.

Note that even in the second operation mode, issuing of the adjustment label R may be executed automatically for each single kind of articles at a time when the weighing is complete. However, when a weighing operation of predetermined articles is executed on one weighing device 3, that is, when a weighing operation of other articles is executed by another weighing device 3 is executed before the articles are provided to the customer by the one weighing device 3, it is favorable to display the screen illustrated in FIG. 13A to promote selection of the first information display region G21 to the customer. In response to this, the customer can select the first information display region G21 corresponding to the articles for which the customer performed a weighing operation and receive issuing of the adjustment label R.

Moreover, for a plurality of displayed first information display regions G21, when a portion of the adjustment labels R are issued and one remains, the one remaining adjustment label R may be automatically issued or the adjustment label R may be issued after selection of the first information display region G21 is received, as with the operations up to then.

Moreover, at a time when the customer starts an operation, the customer may be allowed to declare an operation to buy a plurality of articles together. That is, a button to declare "Buy together" is provided on an initial operation screen, and in response to pushing the button, an operation to issue the adjustment label R in which the plurality of articles are collected is received. Note that in this case, in response to a second first information display region G21 being selected as described above, control to cause the operation object G23 that receives an issue request of the adjustment label R to be displayed on the screen is unnecessary and the operation object G23 may be made to be displayed from the start. Moreover, when the operation object G23 is made to be displayed from the start in this way, when the customer who had planned to buy a plurality of articles together has changed to purchasing one article in the middle of the operation, the operation object G23 displayed at this point should be pressed to receive issuing of the adjustment label R and end the operation.

Note that such an operation to declare "Buy together", like a third operation mode described later, may also be applied to an operation for issuing the adjustment label R on which is displayed a weight ratio of the plurality of articles. Moreover, when the weighing sales system 1 is monopolized and operated by one customer, it is convenient for the customer to buy together without selecting the first information display region G21 and to be able to receive issuing of the adjustment label R in response to this. However, this does not prevent application to operation at the same time by a plurality of customers.

(Third Operation Mode)

Next, a third operation mode will be described as an example of an operation mode of an information terminal 4 in the weighing sales system 1 when articles are provided by the first unit U1.

(Flow of Processing)

Figure 14:
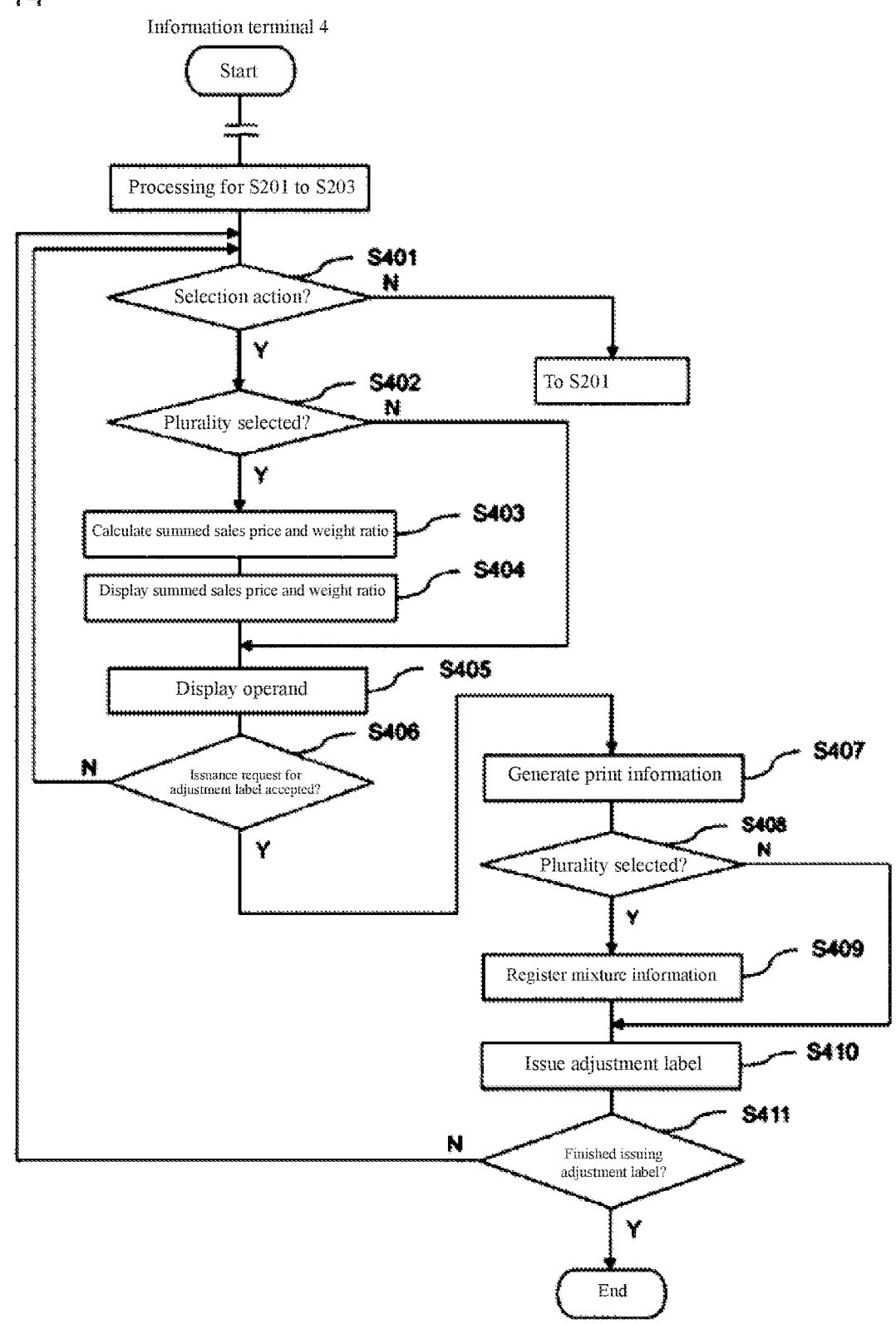
FIG. 14 shows a flowchart illustrating a flow of operation according to a third operation mode of the information terminal.

The third operation mode of the information terminal 4 when articles are provided by the first unit U1 will be described with reference to FIG. 14. FIG. 14 is a flowchart illustrating a flow of operation according to the second operation mode of the information terminal 4.

In the second operation mode, the information terminal 4 issues the consolidated adjustment label for the plurality of articles, but in the third operation mode, the information terminal 4, in addition to issuing the adjustment label collectively for the plurality of articles, calculates a weight ratio of the plurality of articles and issues the adjustment label on which is printed information relating to the weight ratio. Specifically, in the third operation mode, the information terminal 4 displays information relating to the weight ratio on the screen and prints information relating to the weight ratio on the adjustment label.

Note that a portion of processing in the third operation mode is similar to the first operation mode.

Note that as described above, operation and the like of the weighing device 3 when the information terminal 2 behaves in the third operation mode is similar to operation and the like of the weighing device 3 when the information terminal 2 behaves in the first operation mode.

As illustrated in FIG. 12, like in the first operation mode, when device identification information and information relating to the weight of the articles are received from the weighing device 3 (S201), the information terminal 4 calculates the sales price of the articles provided to the customer (S202), and displays the first information display region corresponding to the articles for which the sales price was calculated on the display unit 41 (S203).

On the display unit 41, information and the like relating to weight is received at step S201, and the first information display region corresponding to each article for which the sales price is calculated is displayed at step S203. From among these, the customer completes registration as a purchase target and selects the first information display region corresponding to articles for which issuing of an adjustment label is requested (S401).

Here, when a plurality of the first information display region is selected (S402), the summed sales prices and weight ratio of the articles corresponding to the plurality of selected first information display regions are calculated by the calculation processing unit 403 (S403). The sales price and weight ratio after the calculated summing are displayed on the display unit 41 (S404).

Display of the weight ratio of the articles in the display unit 41 is, for example, displayed as "Weight ratio: 2:3 (product A/160 g:articles B/240 g)".

Meanwhile, when there is one selected first information display region, the sales price of the articles corresponding to the one selected first information display region is displayed on the display unit 41.

Moreover, in conjunction with a selected operation of the customer, an operation object for receiving the operation to complete the registration of the articles corresponding to the first information display region selected by the customer and for receiving an issue request for an adjustment label of the articles is displayed on the display unit 41 (S405).

When the operation object is pressed and registration of the articles corresponding to the selected first information display region and the issue request for the adjustment label are thus received (S406), the information processing unit 405 generates print information relating to details to be printed on the adjustment label (S407). The print information generated at this time includes information of the articles corresponding to the selected first information display region and information relating to the sales price of the articles. Moreover, when a plurality of the first information display region is selected, information of the articles corresponding to the plurality of first information display regions and information relating to the sales price in which the sales prices of a plurality of articles were summed as well as the weight ratio of the plurality of articles are included in print information.

Moreover, when a plurality of the first information display region is selected (S408), in conjunction with generation of print information, information relating to the weight ratio of the plurality of articles is registered in a predetermined mixture information storage unit as combined information (S409).

The print information generated by the information processing unit 405 is transmitted to the issuing processing unit 407 and the issuing processing unit 407 controls the issuing unit 43 to issue an adjustment label (S410). Information of the articles corresponding to the selected first information display region and information relating to the sales price in which the sales prices of the articles are summed as well as the weight ratio of the articles and the like are appropriately encoded and displayed on the adjustment label issued at this time, so information of the plurality of articles is consolidated on one adjustment label.

The customer performs a selection operation using the first information display region and an issue request for an adjustment label for all of the articles for which provision is received, and issuing of an adjustment label is received for all of the articles for which provision is received (S411).

The customer who has received the adjustment label ejected from the label issuing port 4*a* inputs information relating to the sales price of the articles printed on the adjustment label to a prepared store terminal or the like for adjustment and executes a settlement operation corresponding to a predetermined settlement means.

An adjustment label in which the weight ratio of articles optionally selected by the customer is displayed is issued by the above processing. As a result, for example, when the articles are coffee beans or nuts, the customer can reference the weight ratio to obtain coffee beans or mixed nuts at a preferred mixture ratio.

(Screen Example)

Figure 15A:
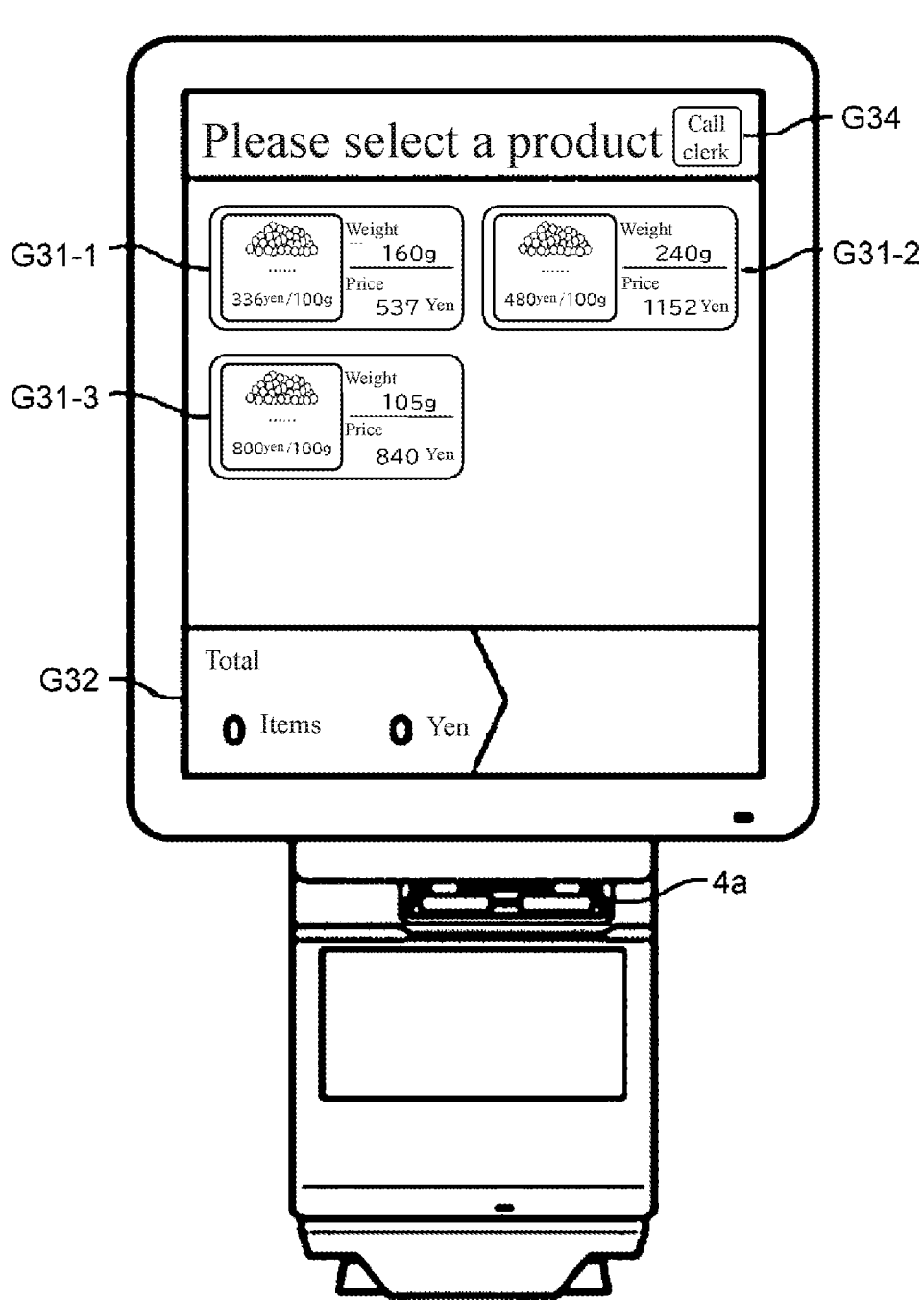
FIG. 15A shows a diagram describing, in the third operation mode, display and the like of the information terminal in a situation before a product is selected.

Display and the like on the information terminal 4 in the third operation mode will be described with reference to FIG. 15A to FIG. 15D. FIG. 15A is a diagram describing, in the third operation mode, display and the like of the information terminal 4 in a situation before a product is selected.

A first information display region G31 generated for each kind of articles provided to the customer (first information display region G31-1, first information display region G31-2, first information display region G31-3) is displayed on the screen illustrated in FIG. 15A. Note that the information terminal 4 displays the first information display region G31 each time a process of step S203 in FIG. 14 (FIG. 10) is executed.

Predetermined information is displayed on the first information display region G31, like the first information display region G11 described above. For example, a unit price "336", a weight "160", and a sales price "537" are displayed in the first information display region G31-1 and a unit price "480", a weight "240", and a sales price "1152" are displayed in the first information display region G31-2. Moreover, the first information display region G31, like the first information display region G11 described above, is also configured as a button that can be pressed on the screen, and by pressing, a selection operation for registering as an adjustment target and targeting for adjustment label issuing is received.

The second information display region G32 is provided at the bottom of the screen. A number of articles corresponding to the selected first information display region G31 and the sales price in which the sales prices of articles corresponding to the selected first information display region G31 are summed are displayed in the second information display region G32. Note that in the case of FIG. 15A, because the first information display region G31 has not been selected, the number of articles is displayed as "0" and the sales price is displayed as "0 yen" on the second information display region G32.

Moreover, at the top of the screen, a message similar to the second operation mode is displayed and a "Call clerk" button G34 similar to the "Call clerk" button G24 of the second operation mode is provided. The information terminal 4 may be provided with "Call clerk" as a mechanical key instead of or in addition to display of the "Call clerk" button G34.

Figure 15B:
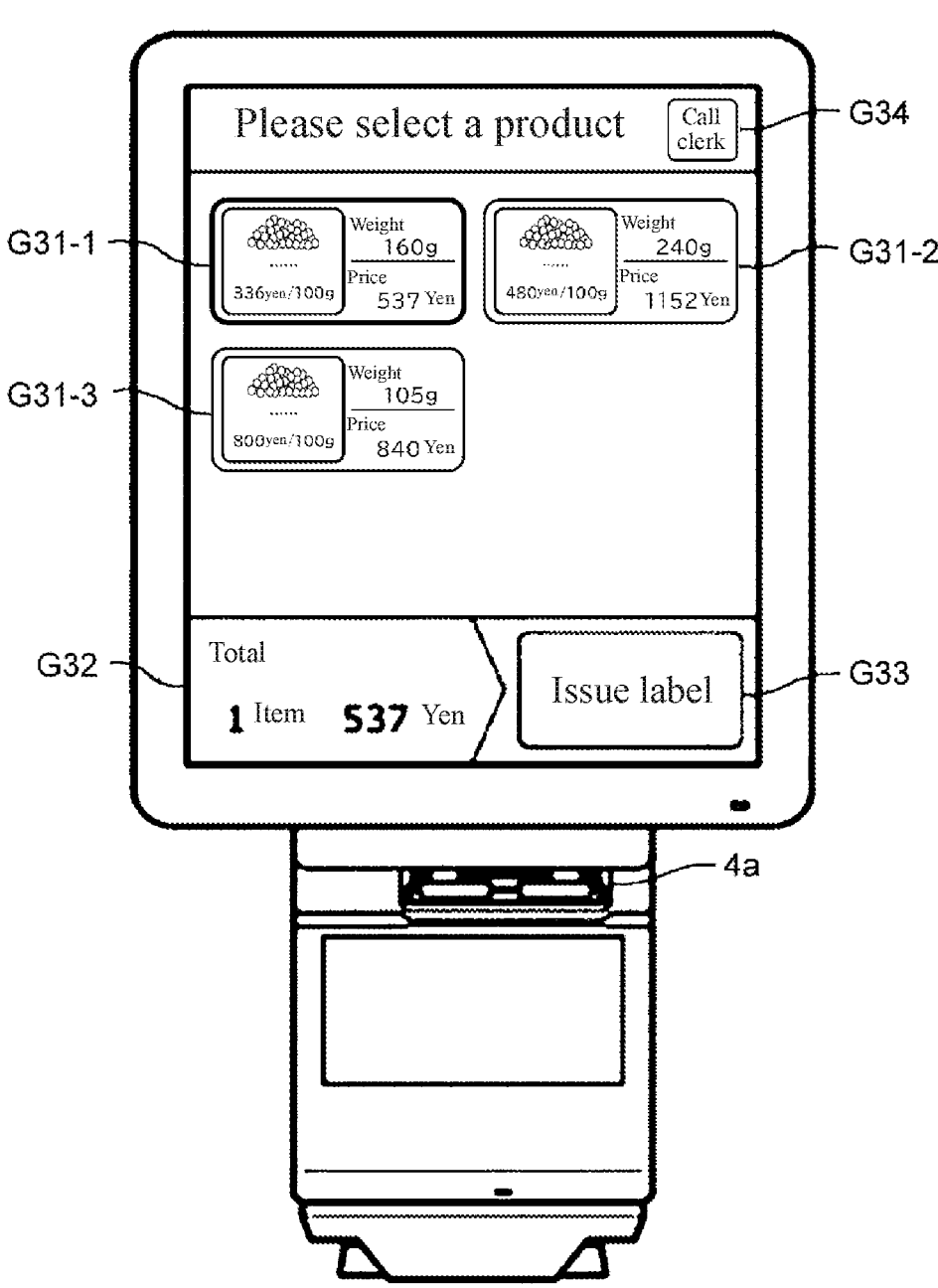
FIG. 15B shows a diagram describing, in the third operation mode, display and the like of the information terminal in a situation after a first product is selected.

FIG. 15B is a diagram describing, in the third operation mode, display and the like of the information terminal 4 in a situation after a first product is selected.

The screen illustrated in FIG. 15B is a screen when the first information display region G31-1 is selected by the customer on the screen illustrated in FIG. 15A.

On the screen illustrated in FIG. 15B, similarly to the screen illustrated in FIG. 13B, the first information display region G31-1 selected by the customer is displayed using a bold-line frame to distinguish from the first information display regions G31-2, G31-3 which were not selected. In the second information display region G32 of the screen, similarly to the second information display region G22 illustrated in FIG. 13B, in accordance with the first information display region G33-1 being selected, the number of articles is displayed as "1" and the sales price is displayed as "537 yen". At the bottom of the screen and next to the second information display region G32, an operation object G33 is displayed similarly to the operation object G23 illustrated in FIG. 13B.

Figure 15C:
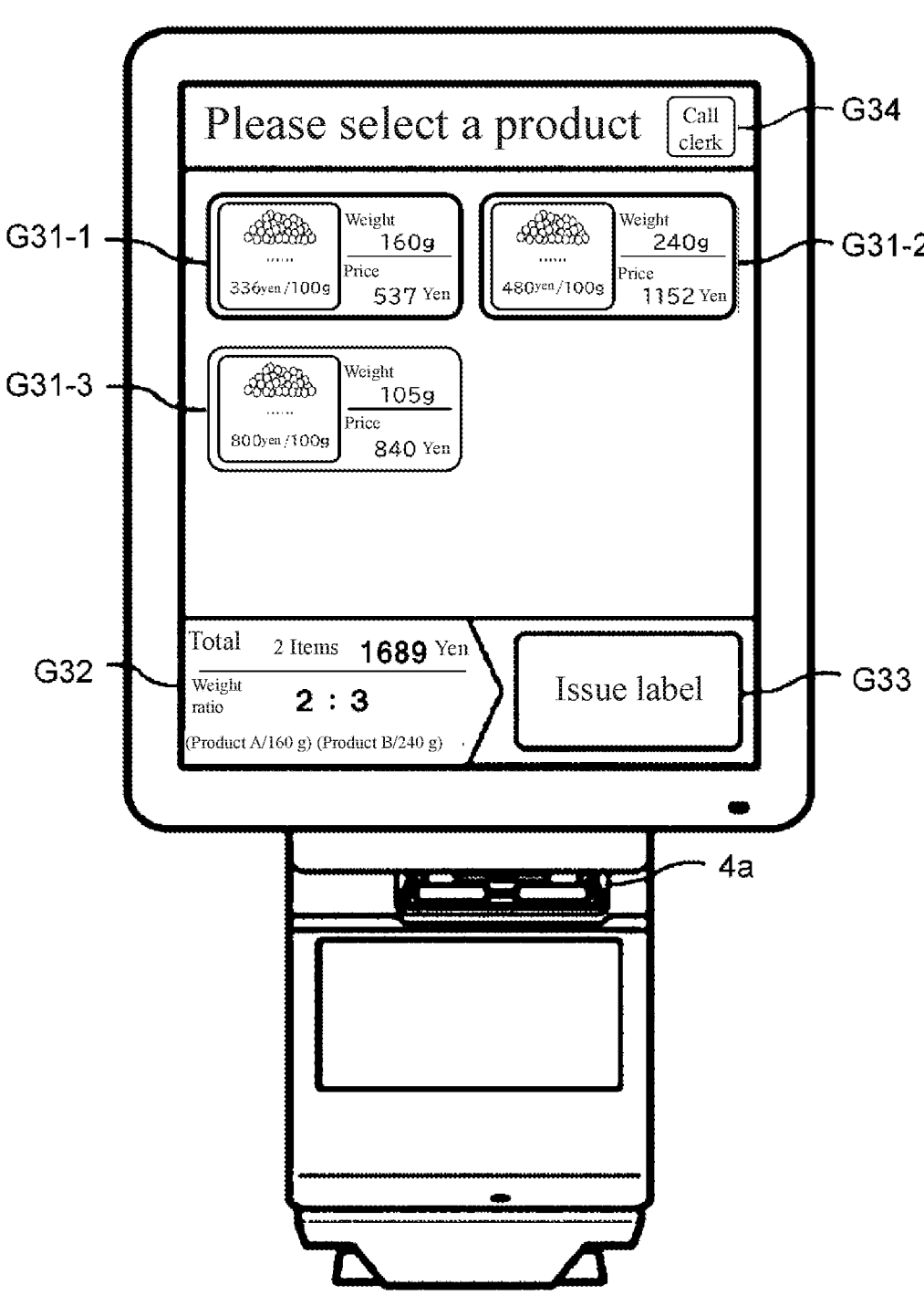
FIG. 15C shows a diagram describing, in the third operation mode, display and the like of the information terminal in a situation after a second product is selected.

FIG. 15C is a diagram describing, in the third operation mode, display and the like of the information terminal 4 in a situation after a second product is selected.

The screen illustrated in FIG. 15C is a screen when the first information display region G31-2 is further selected by the customer on the screen illustrated in FIG. 15B. That is, the screen illustrated in FIG. 15C illustrates a screen when a plurality of the first information display regions G31 (first information display regions G31-1, G31-2) are selected.

On the screen illustrated in FIG. 15C, the first information display regions G31-1, G31-2 selected by the customer are displayed using a bold-line frame to distinguish from the other first information display region G31-3 which was not selected. In the second information display region G32 of the screen, in accordance with the first information display region G31-1 and the first information display region G31-2 being selected, the number of articles is displayed as "2" and the sales price is displayed as "1689 yen" (sales price in which the sales prices of the selected articles are summed).

Moreover, the weight ratio of the articles corresponding to the first information display regions G31-1, G31-2 selected by the customer is displayed in the second information display region G32. In an illustrated example, a weight ratio "2:3" of a weight "160" of articles corresponding to the first information display region G31-1 and a weight "240" of articles corresponding to the first information display region G32-1 is displayed.

Figure 15D:
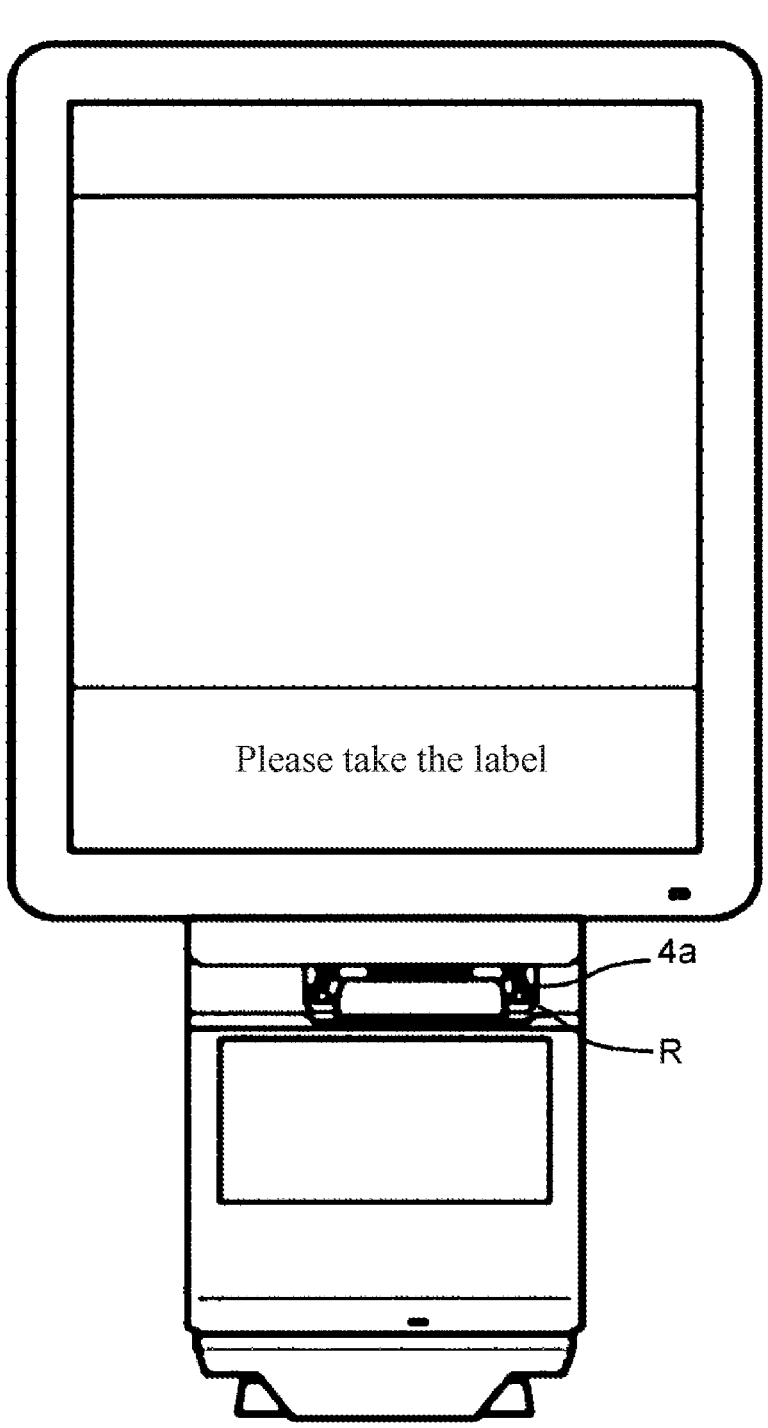
FIG. 15D shows a diagram describing, in the third operation mode, display and the like of the information terminal in a situation where a label is issued.

FIG. 15D is a diagram describing, in the third operation mode, display and the like of the information terminal 4 in a situation where a label is issued.

The screen illustrated in FIG. 15D is a screen when the operation object G33 is pressed on the screen illustrated in FIG. 15C.

From the label issuing port 4*a* of the information terminal 4, the adjustment label R in which the articles corresponding to the first information display region G31-1 and the articles corresponding to the first information display region G31-2 are consolidated is ejected in response to pressing of the operation object G33.

A message "Please take the label" is displayed at the bottom of the screen and taking of the adjustment label R is promoted.

When the customer takes the adjustment label R out of the label issuing port 4*a*, a screen on which the remaining first information display region G31-3 is displayed is expanded, and the customer performs the same operation for the first information display region G31-3 as for the first information display regions G31-1, G31-2.

According to the above weighing sales system 1, the customer can receive provision of articles of a desired amount by simple operation. Moreover, the weighing sales system 1 has a high degree of freedom in operability and can issue individual adjustment labels and collective adjustment labels for a plurality of articles for which the customer has received provision. Moreover, the customer can receive provision of articles wherein the articles are mixed to any weight ratio due to the display of information relating to a weight ratio of a plurality of articles.

Moreover, the mode was described above wherein, in regards to provision of articles using the first unit U1, the information terminal 4 acquires the weight of the articles and device identification information from the weighing device 3 in response to operation of the weighing device 3 by the customer, and in response to this, a price is calculated from information such as the unit price of the articles and the weight. However, as another mode, designation of articles desired by the customer may be received in the information terminal 4 (receiving of designation of desired weight), so that when the customer operates the weighing device 3, the information terminal 4 acquires the weight of the articles from the weighing device and in response, the price is calculated from information such as unit price of the articles and the weight. In the mode wherein the customer designates desired articles in the information terminal 4, one customer monopolizes and operates the weighing sales system 1, so designation of articles by an operation of another customer can be avoided and smoother operation is possible.
(Additional Functional Configuration)

In the weighing sales system 1, when a paid container is provided to a customer, the information terminal 4 is provided with a container information storage unit necessary for selling the container to a customer. Included in data items stored in the container information storage unit are, for example, container identification information, container weight information, and container price information. Container identification information is information that can identify a container and is, for example, information that can identify each of a personal container (container brought by a customer), a store container S (small size container provided by the store), a store container M (medium size container provided by the store), and a store container L (large size container provided by the store).

Using information relating these containers, when a container is provided to a customer, a price corresponding to the container can be included in the sales price.

Note that when a container is provided to a customer, selection of a container may be performed after the customer has received provision of the articles. For example, the articles are provided to a customer, the weight of the articles and device identification information is thus transmitted from the weighing device 3 to the information terminal 4, the first information display region is displayed on the display unit 41 of the information terminal 4, then a selection screen for a container is expanded in response to passage of a certain time of non-operation (for example, a few seconds), and selection of a container by the customer is received.

Moreover, the information terminal 4, instead of or in addition to the adjustment label, may output information such as the sales price and weight of the articles included in print information, the article name, and the like in various forms as adjustment information. For example, when a predetermined member code is assigned to a customer, the information terminal 4 may link the adjustment information to the member code and transmit such to a POS terminal for adjustment. Thus, a customer can input a member code to a POS terminal to call settlement information and perform an adjustment operation.

Figure 16:
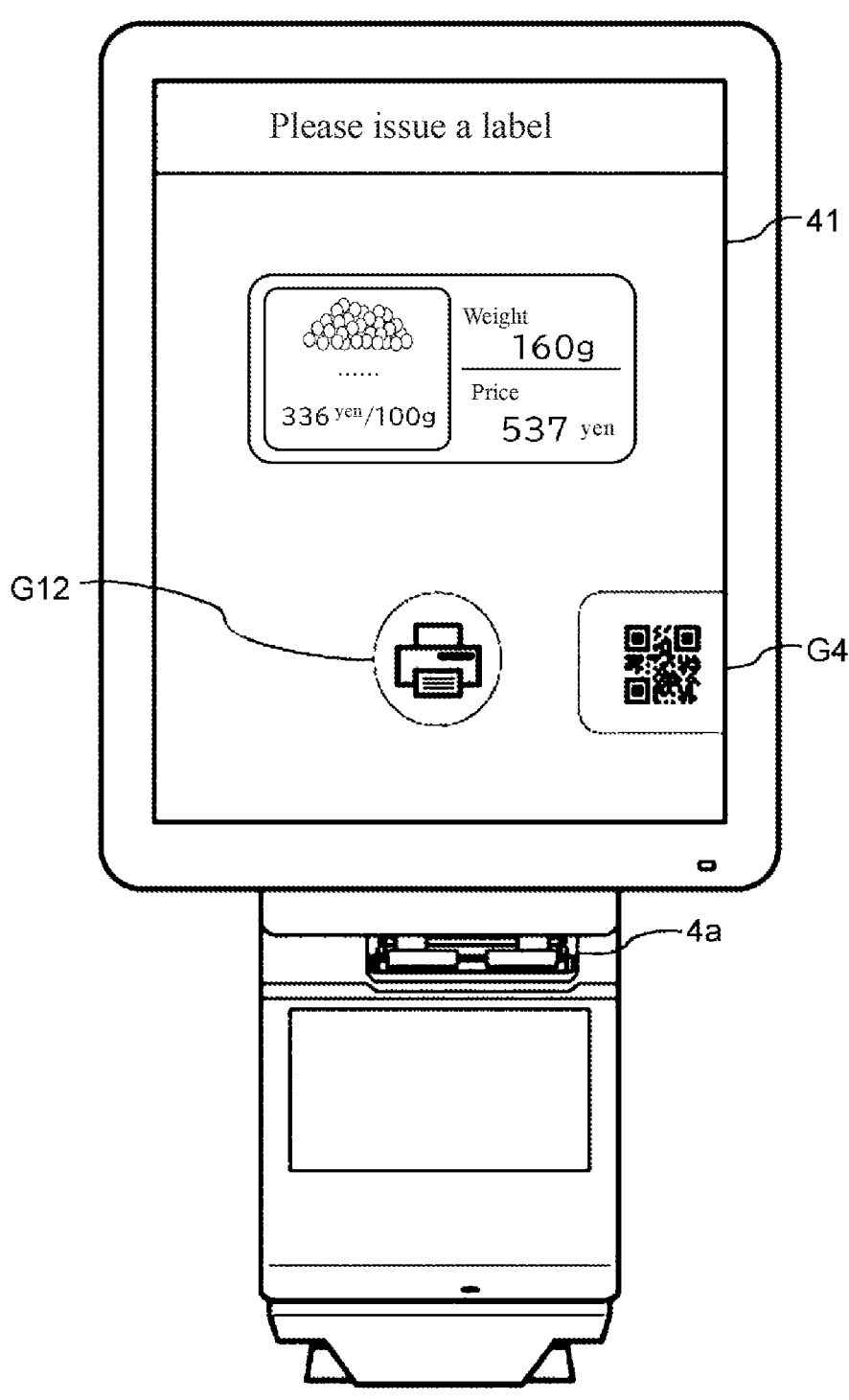
FIG. 16 shows a diagram describing, in the first operation mode, another display and the like of the information terminal in a situation after a product is selected.

FIG. 16 is a diagram describing, in the first operation mode described above, another display and the like of the information terminal 4 in a situation after a product is selected.

Moreover, when enabling execution of processing from registration of articles to adjustment using a dedicated application program or instructions stored in a customer terminal such as a smartphone owned by the customer, it is also possible to connect the information terminal 4 and the smartphone using short-distance communication to transmit adjustment information.

Connection by short-distance communication is authenticated by, for example, as illustrated in FIG. 16, symbol coding connection information to which one-time information is added, causing this to be displayed in a symbol code display section G4 provided on the display unit 41 of the information terminal 4, and imaging the symbol core using a camera of the customer terminal.

Note that FIG. 16 is an example of when the symbol code display section G4 is further provided on the screen illustrated in FIG. 11B of the first operation mode, but a symbol code may be similarly displayed on the screen of the second operation mode or the screen of the third operation mode.

Moreover, when a plurality of articles are provided at a predetermined weight ratio to one customer, the information terminal 4 may be configured to be able to assign identification information and store this weight ratio in a predetermined mixture information storage unit as information relating to a mixture ratio of the articles, and then output information of the mixture ratio as necessary. For example, identification information is assigned to information relating to a mixture ratio of a plurality of articles that has been provided to a customer once, then such is registered. The identification information is presented to the customer directly or by encoding and printing on an adjustment label, writing to a predetermined IC tag, or displaying on the display unit 41. A customer can call information relating to a mixture ratio of articles by directly inputting the identification information to the information terminal 4 or by reading encoded identification information using a scanner or the like separately provided by the information terminal 4, and then reference the mixture ratio to receive provision of articles at a desired mixture ratio.

In this case, information relating to a weight of mixed articles desired for purchase from a customer may be received and a weight for each kind of articles necessary to receive provision of mixed articles of a predetermined weight calculated based on a predetermined mixture ratio and presented to the customer. Moreover, instead of a weight of the articles after mixture, information relating to a sales price of the articles after mixture may be received and the weight of each kind of articles necessary to receive provision of the articles after mixture of a predetermined sales price calculated based on a predetermined mixture ratio and a unit price of each article and presented to the customer.

Moreover, the weighing sales system 1 which has acquired identification information linked to a mixture ratio may be supported so that a customer can receive provision of articles at a predetermined mixture ratio. Specifically, kinds of articles and target weights thereof may be displayed on the screen of the information terminal 4, and an LED lamp or the like separately provided on a corresponding article supplying device 2a may be turned on/flashed, and a target weight may be displayed flashing on the display unit 33-1 on which the weight is displayed.

Moreover, regardless of the provision of articles to a customer, a mixture ratio of a plurality of articles may be registered in a predetermined mixture information storage unit in advance at a store or the like that provides articles so that a customer can reference or select this as a mixture ratio recommended by the store or the like. When providing various recommended mixture ratios as selectable for a customer, each may be configured to a preset key and displayed on the display unit 41.

Figure 17:
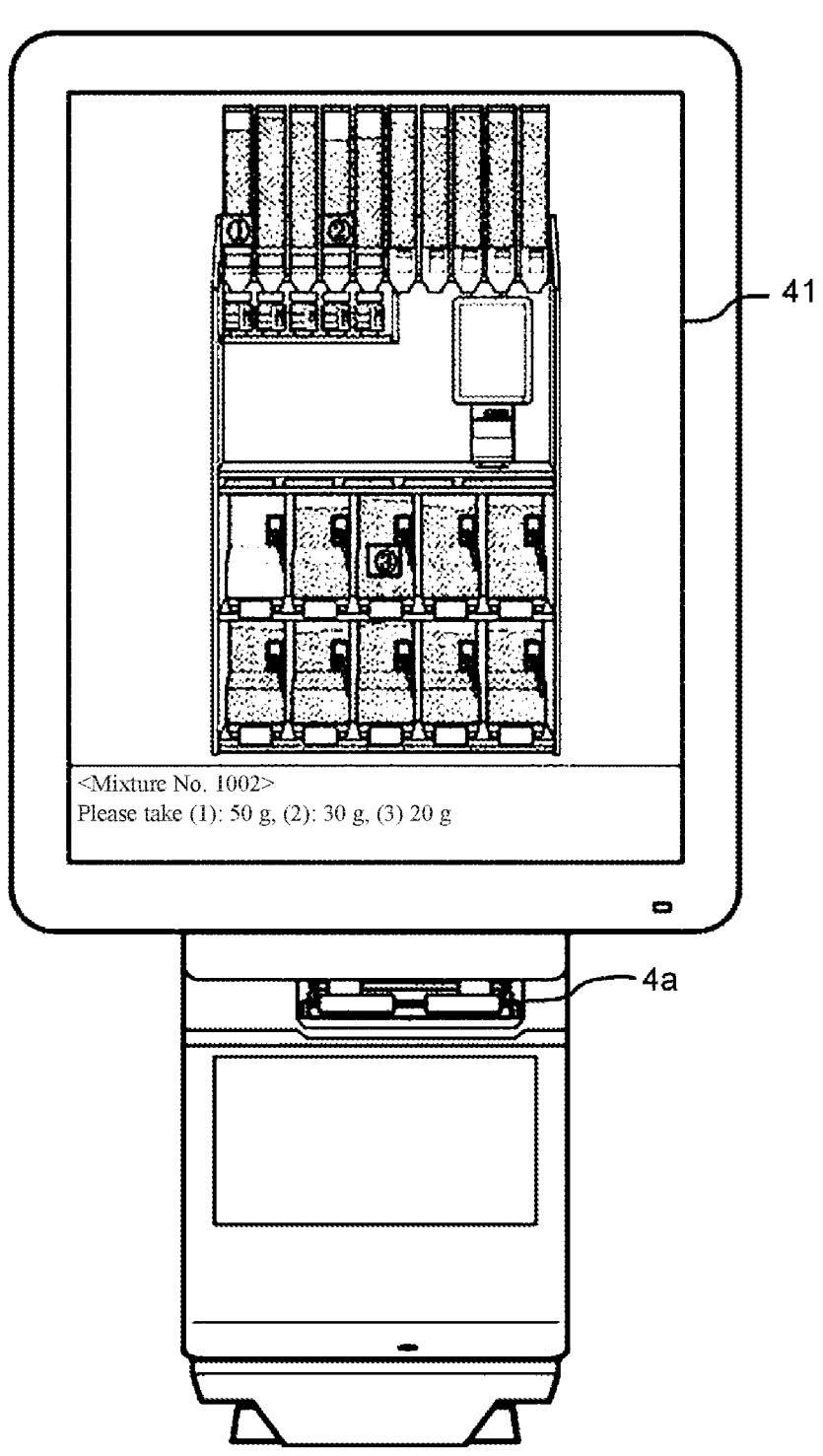
FIG. 17 shows a diagram describing, in the third operation mode, another display and the like of the information terminal.

FIG. 17 is a diagram describing, in the third operation mode described above, another display and the like of the information terminal 4. Specifically, the screen illustrated in FIG. 17 is an example of a screen alerting a customer of a position of the article supplying device 2a that supplies articles which are to be mixed.

In a case where information relating to a mixture ratio of articles is registered, when identification information of a predetermined mixture ratio is received from a customer or the like, guidance may be provided on the screen of a position of the article supplying device 2a that provides articles to be mixed. For example, as illustrated in FIG. 17, the information terminal 4 may display on the display unit 41 a schematic diagram of the weighing sales system 1 and guidance may be provided on the schematic diagram of a position of the article supplying device 2a that provides articles to be mixed. In the example illustrated in FIG. 17, a position of three articles to be mixed is indicated by numbers (1, 2, 3) in the schematic diagram, and a weight for which provision is to be received for each article indicated by numbers (product at position indicated by 1, product at position indicated by 2, product at position indicated by 3) is displayed ("1:50 g", "2:30 g", "3:20").

Thus, a customer can understand the article supplying device 2a that provides articles necessary for mixture without confusion. In particular, a customer need not be confused even when an arrangement of the article supplying device 2a which provides predetermined articles is changed. Furthermore, when a predetermined article is changed out or runs out, an operation object for calling a clerk (clerk call button) may be displayed or a clerk automatically called. Additionally, an apology message to the customer and guidance to such an effect may be displayed and guidance of replacement articles or a suggestion for a replacement mixture ratio made. Note that for guidance of replacement articles or a suggestion for a separate mixture ratio such as this, an operation of the customer similar to that described above may be supported.

Moreover, in a store, a POS terminal that executes adjustment processing for articles based on the adjustment label issued by the information terminal 4 is separately installed. This POS terminal is a store terminal operated by a clerk or a customer per se, and the clerk or customer inputs information and the like relating to the sales price of the articles printed on the adjustment label to the POS terminal and executes a settlement operation corresponding to a predetermined settlement means.

Moreover, in the weighing sales system 1, an operation (process) may be settable as a selectable operation mode according to the first operation mode, the second operation mode, or the third operation mode described above. Furthermore, a setting of an operation mode may be optionally changeable by a customer during an operation by a predetermined mode switching button or the like. Thus, for example, when a plurality of articles are provided to a customer, an operation mode corresponding to a third operation mode may be used when display of a weight ratio is desirable and an operation mode corresponding to the second operation mode may be used when it is not appropriate to display a weight ratio (when articles are not combined).

Moreover, for sale of articles by the first unit U1, designation of a desired weight and sales price of articles may be received from a customer, and a sales price corresponding to the desired weight may be calculated and displayed or a weight corresponding to a desired sales price may be calculated and displayed. Moreover, a weight of articles desired by the customer and a weight of articles (weighed value) supplied from the article supplying device 2a to the weighing device 3 may be compared and a remaining weight until the desired weight is reached may be displayed.

Display in this manner may be performed on the display unit 41 of the information terminal 4 and may be performed on the display unit 33 of the weighing device 3.

Moreover, for sale of articles by the first unit U1, selection of articles may be received directly on the information terminal 4. In this case, there is no need to receive device identification information from the article supplying device 2a to specify articles.

(Other Weighing Device)

Figure 18A:
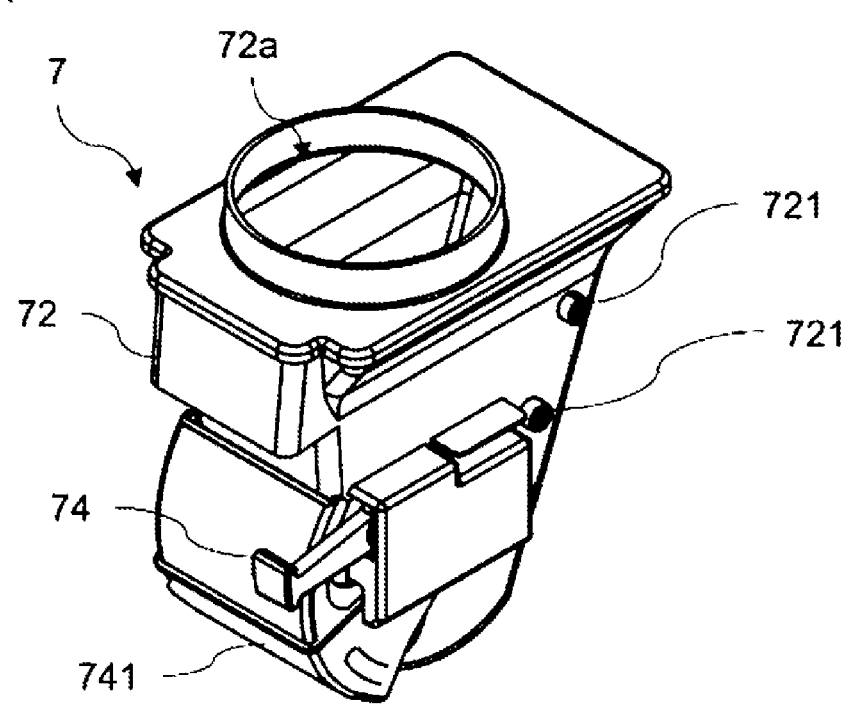
FIG. 18A shows an exploded perspective diagram of another weighing device illustrating a guiding body.
Figure 18B:
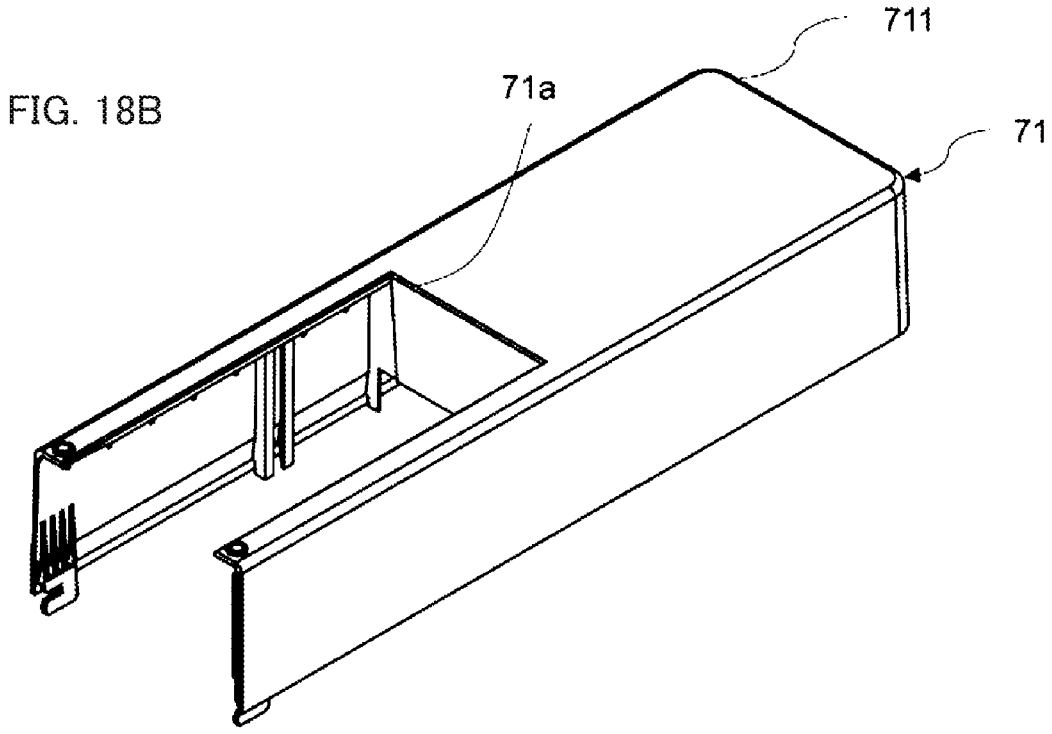
FIG. 18B shows an exploded perspective diagram of another weighing device illustrating a first member.
Figure 18C:
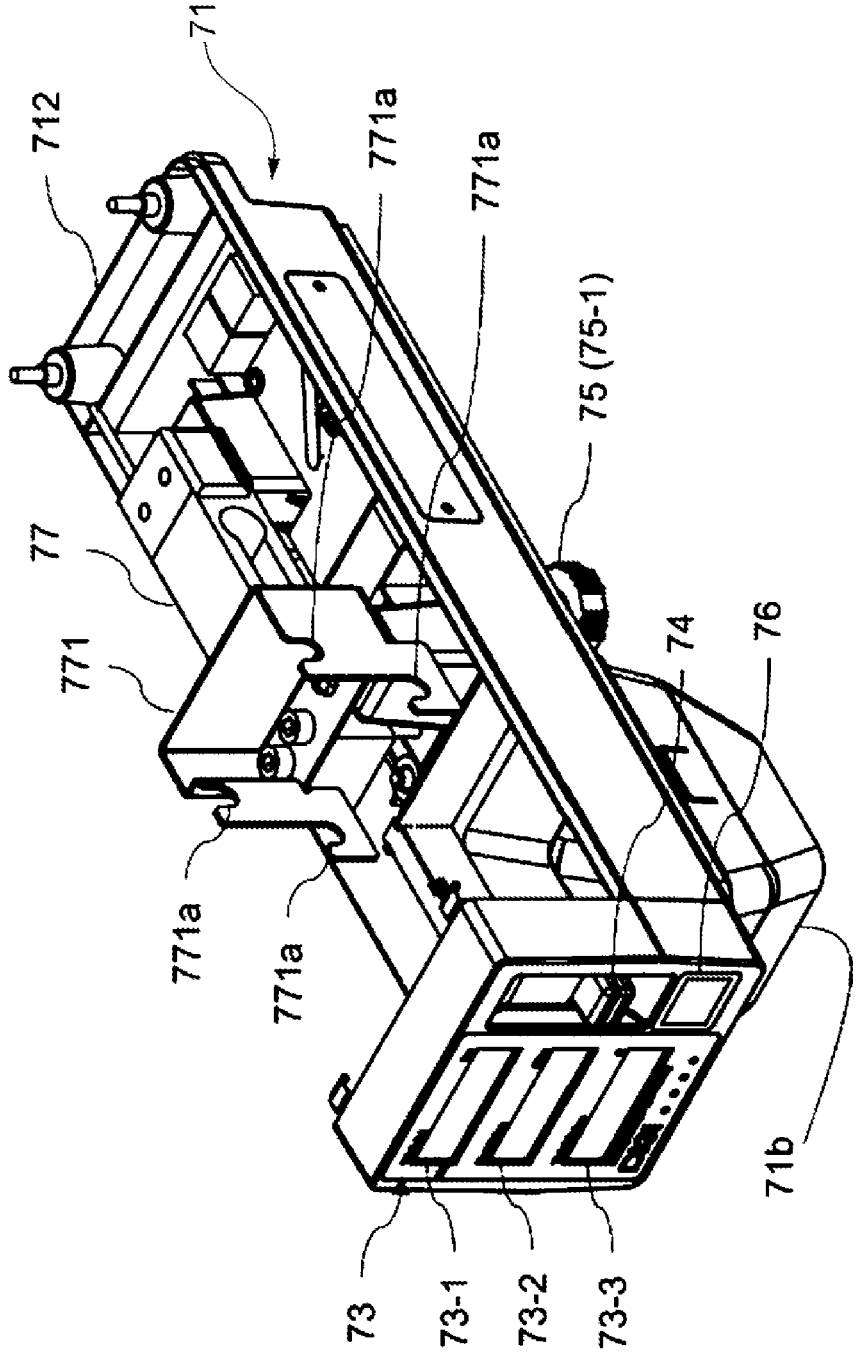
Figure 19A:
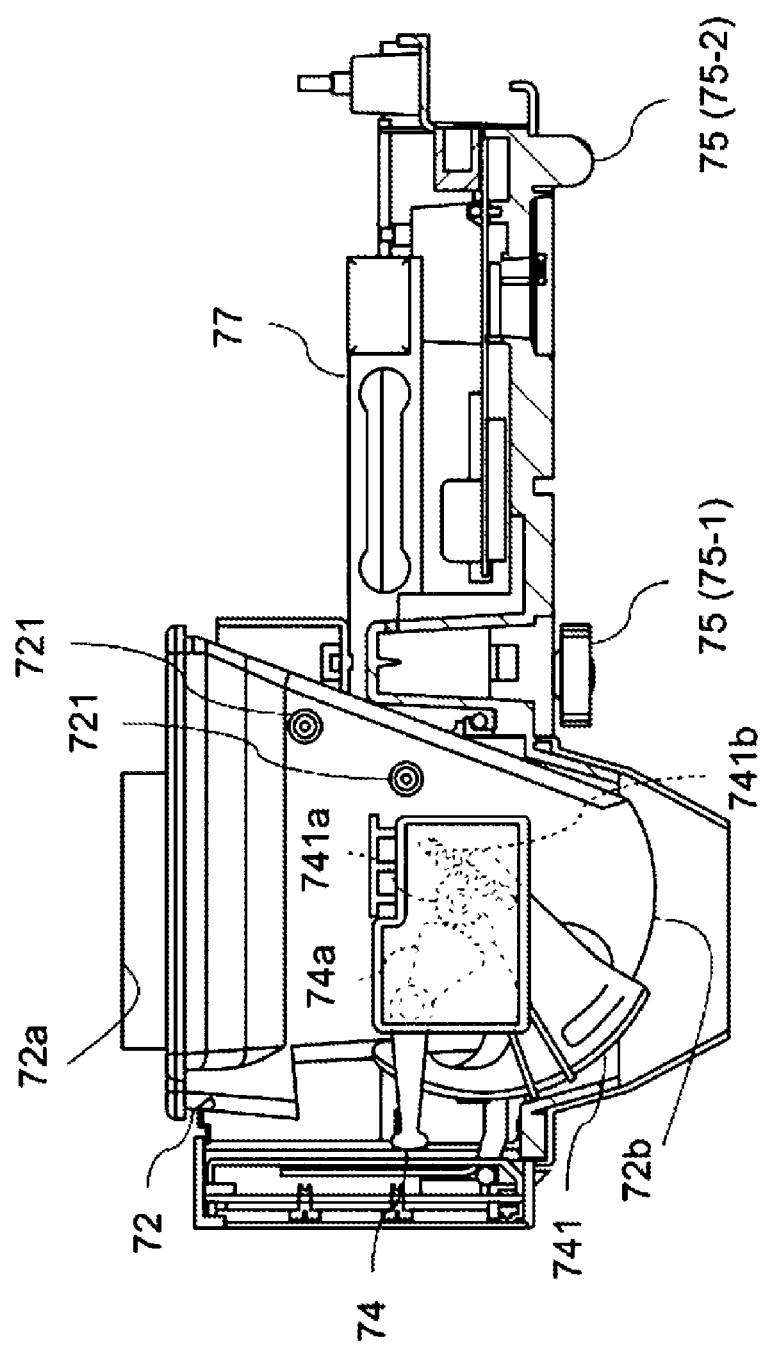
FIG. 19A shows a side surface diagram illustrating an internal structure of the weighing device, and a side surface diagram of when the ejection-side opening part is in a closed state.
Figure 19B:
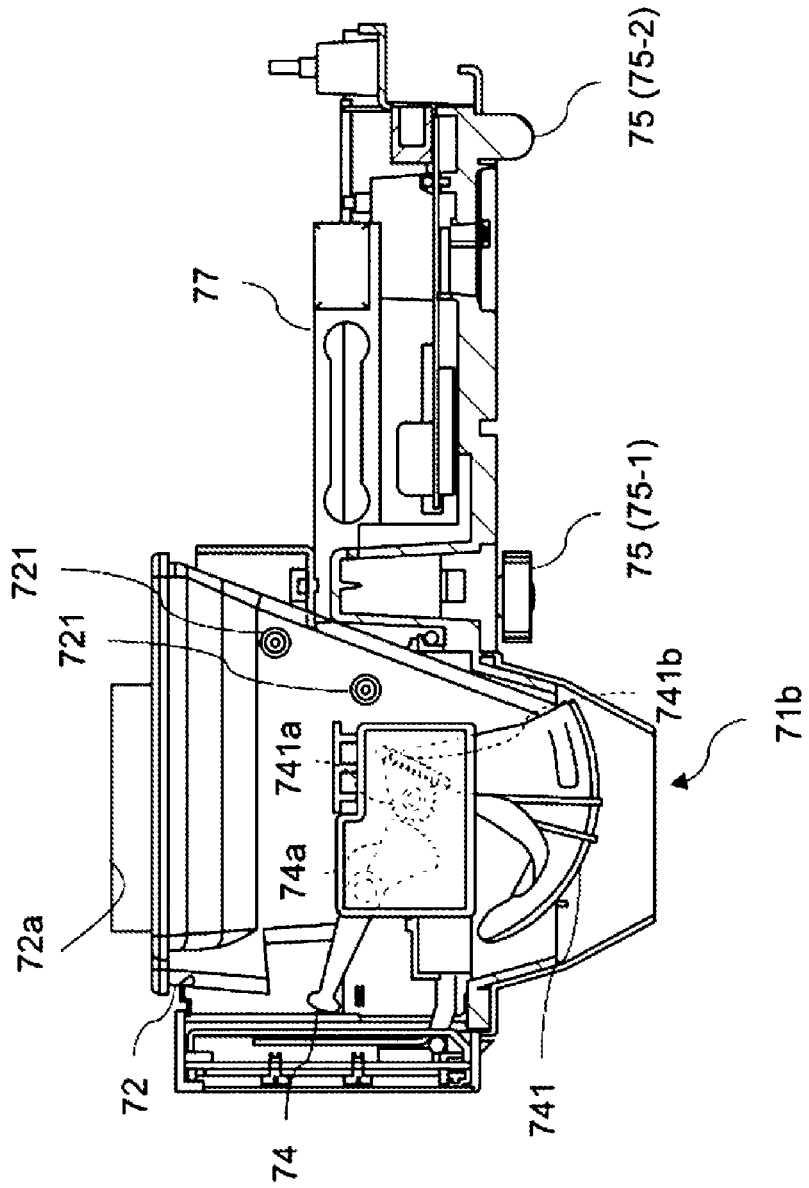
FIG. 19B shows a side surface diagram illustrating an internal structure of the weighing device, and a side surface diagram of when the ejection-side opening part is in an open state.

The weighing sales system 1 may be provided with another weighing device different from the weighing device 3 instead of or in addition to the weighing device 3. Another weighing device 7 different from the weighing device 3 will be described with reference to FIG. 18A to FIG. 18C, FIG. 19A, and FIG. 19B. FIG. 18A is an exploded perspective diagram of a weighing device 7, illustrating a guiding body 72. FIG. 18B is an exploded perspective diagram of the weighing device 7, illustrating a first member 711. FIG. 18C is an exploded perspective diagram of the weighing device 7, illustrating a second member 712 and the like. FIG. 19A is a side surface diagram illustrating an internal structure of the weighing device 7, and a side surface diagram of when the ejection-side opening part 72b is in a closed state. FIG. 19B is a side surface diagram illustrating an internal structure of the weighing device 7, and a side surface diagram of when the ejection-side opening part 72b is in an open state.

The weighing device 7, as illustrated in FIG. 18A to FIG. 18C, is provided with a main body 71, the guiding body 72, a first display unit 73, an operation unit 74, a support unit 75, and a second display unit 76.

The main body 71 is a casing having a substantially cuboid shape combining a lid-like first member 711 and a box-like second member 712.

The main body 71 has a hollow portion open vertically provided internally. The guiding body 72 described later is set into the hollow portion from an opening part 71a of a top-surface side connected to the hollow portion.

Moreover, as illustrated in FIG. 19A and FIG. 19B, a lid body 741 that opens and closes in response to an operation of the operation unit 74—described later—of the weighing device 7 are provided on a bottom-surface side of the weighing device 7. The opening part of a bottom-surface side constitutes a provision port 71b that opens and closes using the lid body 741 and, via the provision port 71b, provides the articles housed inside the weighing device 7 to the customer by ejecting to the outside.

The opening part 71a of a top-surface side is formed along a length-direction of the main body 71 from a front-surface side of the main body 71 extending to the rear via a central portion. Moreover, the freely opening and closing provision port 71b has an opening width narrower than the opening part 71a and is provided on a front side of the main body 71, at least further toward a front-surface side than the support unit 75. Further, the main body 71 is supported on the shelf board 62 at a position avoiding the provision port 71b provided on the front-surface side of the bottom surface and further toward a rear-surface side than the provision port 71b. Thus, the provision port 71b provided inclined towards a front-surface side of the main body 71 is provided in a depth direction of the shelf board 62 at a position protruding from an end portion of a front-surface side of the shelf board 62.

The guiding body 72 is a funnel-shaped part fit into the hollow portion from the opening part 71a of the main body 71 and also plays a role of a packing container. As illustrated in FIG. 18A, FIG. 19A, and FIG. 19B, a joining protrusion 721 is provided on a side surface on the guiding body 72. The joining protrusion 721 is removably joined to a joining indent 771a provided on a weighing unit 77 described later. Thus, a weight of articles housed inside the guiding body 72 is weighed by the weighing unit 77. Moreover, the guiding body 72 can be appropriately removed or replaced during cleaning or the like by releasing a joint of the joining protrusion 721 and the joining indent 771*a*.

Moreover, the guiding body 72 is provided with a receiving-side opening part 72*a* and an ejection-side opening part 72*b* on upper and lower surfaces, and when articles supplied from the article supplying device 2*b* are received from the receiving-side opening part 72*a*, the articles are housed internally when the lid body 741 is closed. Moreover, when the lid body 741 is opened, articles are ejected outside the weighing device 7 via the provision port 71*b* by the ejection-side opening part 72*b*. Thus, articles can be provided to the customer.

An opening width of the receiving-side opening part 72*a* may be relatively wide compared to an opening width of the ejection-side opening part 72*b*, or may be wider than an opening width of the supply port 24*a* of the article supplying device 2*a*. Moreover, the guiding body 72 is attached to the main body 71 so that a portion below the ejection-side opening part 72*b* is contained inside the housing part of the main body 71. Thus, the guiding body 72 receives articles supplied from the article supplying device 2*a* inside without spilling. Note that here, the receiving-side opening part 72*a* has a circular shape wherein a ring-like peripheral wall is formed, but may be a shape similar to the receiving-side opening part 32*a* of the weighing device 3 described above.

Moreover, the main body 71 (second member 712) is provided with the first display unit 73, the operation unit 74, the support unit 75, the second display unit 76, and the weighing unit 77.

The first display unit 73 is achieved by a liquid crystal display or the like and displays a weight of articles weighed by the weighing unit 77 described later, a unit price of the articles, and a sales price of the articles corresponding to the weight.

The first display unit 73 is constituted by three first display units 73-1, 73-2, 73-3 arranged vertically in parallel. For example, the weight of the articles supplied to the weighing device 7 from the article supplying device 2*a* is displayed on the first display unit 73-1, the unit price of the articles is displayed on the first display unit 73-2, and the sales price is displayed on the first display unit 73-3.

Because the weight, unit price, and sales price of the articles are displayed on the weighing device 7 in this manner, the customer can operate the article supplying device 2*a* while understanding this information to supply articles to the weighing device 7, and can confirm that the articles inside the weighing device 7 have reached a desired amount, to then perform an operation to stop supplying the articles.

The operation unit 74 is a part for operating an opening and closing mechanism for opening and closing the provision port 71*b*. In the first embodiment, the operation unit 74 is achieved by a lever which may be operated from a front-surface side and the opening and closing mechanism is achieved by the lid body 741 that opens and closes the provision port 71*b* using the operation unit 74. A gear unit 74*a* and a gear unit 741*a* are respectively provided on one end of the operation unit 74 and of the lid body 741, and the gear unit 74*a* and the gear unit 741*a* are mutually engaged. When the operation unit 74 is raised upward, the lid body 741 closes the provision port 71*b*, and when the operation unit 34 is pushed downward, the engaging gear units 74*a*, 741*a* interlock, and the lid body 741 opens the provision port 71*b*. When the provision port 71*b* is opened, the articles inside the guiding body 72 are ejected from the provision port 71*b* via the ejection-side opening part 72*b*. Thus, the articles are provided to the customer.

Note that a spring 741*b* is provided on the lid body 741 as biasing means, and this spring 741*b* biases the lid body 741 so that the lid body 741 lowers downward. Thus, the operation unit 74 reliably rises upward when not pushed downward and the provision port 71*b* closes. In a state where the provision port 71*b* is closed, ejection of the articles inside the guiding body 72 is regulated and the articles remain housed inside the guiding body 72.

Note that, the opening and closing mechanism may open and close the provision port 71*b* by electric control. Note that the lid body 741 normally lowers downward under its own weight to close the provision port 71*b*, and the operation unit 74 may be made to rise upward in response to this.

The support unit 75 is a leg part that supports the weighing device 7 on the shelf board 62, and is provided on a bottom surface of the main body 71. Note that here, the support unit 75 is constituted by two support units 75-1 provided in parallel in the width direction (only one appears in the drawing), and one support unit 75-2 provided to the rear of the support units 75-1, but this number is not particularly limited so long as the weighing device 7 is stably installed.

The support units 75-1 are provided with a height adjusting mechanism capable of adjusting height, and the main body 71 can be levelly supported on the shelf board 62 by appropriately adjusting a height thereof in relation to the support unit 75-2 having a fixed height. Such a height adjusting mechanism is achieved by, for example, a pole-like shaft part provided with a disk-like base portion wherein a female screw is cut into a center portion, and a male screw shape that screws into the female screw of the disk-like base portion. The height of the support units 75 can be adjusted by placing the disk-like base portion on the shelf board 62 and inserting the pole-like shaft part in the female screw to an appropriate depth.

Note that here, the support unit 75-2 is not provided with a height adjusting mechanism, but the support unit 75-2 may also be provided with a height adjusting mechanism.

Moreover, the support units 75 are provided inclined toward a rear-surface side on a bottom surface of the main body 71. That is, two support units 75-1 are provided in the width direction in a substantial center of a length direction of the main body 71, and the support unit 75-2 is provided near an end portion of a rear-surface side of the main body 71. Such a position of the support units 75 is a position that does not cover the provision port 71*b* and a position that cannot support the weighing device 7 on the shelf board 62.

The height adjusting mechanism provided by the support units 75 may be made to be controlled by electronic control. Furthermore, in this case, the weighing device 7 is provided with a sensor for detecting levelness such as a gyro sensor or accelerometer, and the height adjusting mechanism may be controlled so that the weighing device 7 is level in response to detection results of the sensor.

The second display unit 76 is provided below the operation unit 74. The second display unit 76 is achieved by, for example, a liquid crystal display or the like. The second display unit 76 displays a status display illustrating an operational state of the weighing device 7 (operation condition).

FIG. 20A to FIG. 20E are display examples of a status display displayed on the second display unit 76 of the weighing device 7.

Figure 20A:
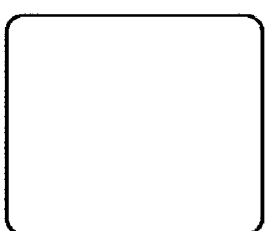
FIG. 20A shows a display example of a status display displayed on a second display unit of the weighing device.

FIG. 20A is a display example of a status display when the operational state of the weighing device 7 is a standby state (standby). The weighing device 7, as illustrated in FIG. 20A does, not display anything on the second display unit 76 while standing by.

Figure 20B:
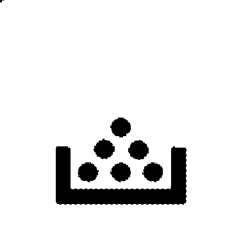
FIG. 20B shows a display example of a status display displayed on the second display unit.

FIG. 20B is a display example of a status display when the operational state of the weighing device 7 is a weighing state. The weighing device 7 displays a status display as illustrated in FIG. 20B on the second display unit 76 when weighing a weight of articles. That is, when the operation unit 23 of the article supplying device 2b is operated and articles are supplied to the guiding body 72 from the article supplying device 2b from a standby state, the weighing device 7 starts weighing using the weighing unit 77, but when weighing starts, a status display as illustrated in FIG. 20B is displayed on the second display unit 76 instead of the status display illustrated in FIG. 20A. During the time from start of weighing until weighing completes (that is, the time until the weighed value stabilizes), the weighing device 7 displays a status display as illustrated in FIG. 20B on the second display unit 76.

Figure 20C:
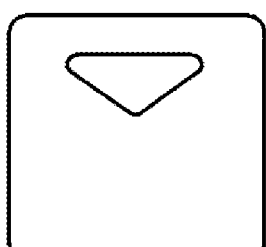
FIG. 20C shows a display example of a status display displayed on the second display unit.

FIG. 20C is a display example of a status display when the operational state of the weighing device 7 is a weighing complete state. The weighing device 7 displays a status display as illustrated in FIG. 20C on the second display unit 76 when weighing of a weight of articles is complete. That is, when the weighing device 7 moves from a weighing state (state where the weighed value is not stable) to a weighing complete state (state where the weighed value is stable), a status display as illustrated in FIG. 20C is displayed on the second display unit 76 instead of the status display illustrated in FIG. 20B. Note that when articles are again supplied from a weighing complete state, the weighing device 7 again displays the status display illustrated in FIG. 20B on the second display unit 76 instead of the status display illustrated in FIG. 20C.

Figure 20D:
FIG. 20D shows a display example of a status display displayed on the second display unit.

FIG. 20D is a display example of a status display of when the operational state of the weighing device 7 is a state of supplying the articles to a container. The weighing device 7 displays a status display such as that illustrated in FIG. 20D on the second display unit 76 when supplying (transferring) the articles from the guiding body 72 to the container. That is, when, from a state of weighing completion, the operation unit 74 is operated and the articles are being transferred from the guiding body 72 to the container, the weighing device 7 displays on the second display unit 76 a status display such as that illustrated in FIG. 20D instead of the status display illustrated in FIG. 20C. The weighing device 7 displays on the second display unit 76 a status display such as that illustrated in FIG. 20D during a time from starting movement of the articles to the container until movement completion (that is, during a time until the weighed value stabilizes at "0" (may be within a slight margin of error)).

Note that the weighing device 7 transmits no sales data (device identification information, selling price, net weight, and the like) in the state of supplying the articles to the container.

Note that in the state of supplying the articles from the guiding body 72 to the container, normally, the weighed value fluctuates in a subtracting direction. However, when the weighed value fluctuates in an adding direction midway, there is a possibility that articles were intentionally or inadvertently added to the guiding body 72 midway. Therefore, when the weighed value fluctuates in an adding direction midway, the weighing device 7 may display on the second display unit 76 a status display (not illustrated) of when the operational state is an error state. Moreover, the weighing device 7 may notify the information terminal 4 that the error state is entered into, and the information terminal 4 may issue an alert that the weighing device 7 is in the error state. Alternatively, the weighing device 7 may output to a device outside the weighing sales system 1 that the error state is entered into and alert a manager or the like that the weighing device 7 is in the error state.

Figure 20E:
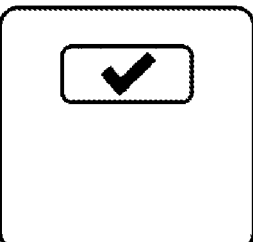
FIG. 20E shows a display example of a status display displayed on the second display unit.

FIG. 20E is a display example of a status display of when the operational state of the weighing device 7 is a state in which supplying the articles to the container is completed. The weighing device 7 displays a status display such as that illustrated in FIG. 20E on the second display unit 76 when supplying the articles to the container is completed (transferring the articles is ended). That is, when, from the state of supplying the articles to the container, transferring the articles to the container ends, the weighing device 7 displays on the second display unit 76 a status display such as that illustrated in FIG. 20E instead of the status display illustrated in FIG. 20D. The weighing device 7 determines whether transferring the articles to the container is ended based on whether the weighed value stabilizes at "0" (may be within a slight margin of error). Note that once the weighed value stabilizes at "0" and the status display of FIG. 20E is displayed, the weighing device 7 deems supplying of the articles to be completed; even if the actual weighed value moves up and down, the displayed weighed value is forcibly corrected to "0", and the status display of FIG. 20E is maintained.

Upon the weighed value stabilizing at "0", the weighing device 7 transmits the sales data to the information terminal 4.

When the sales data is transmitted or there is a notification from the information terminal 4, the weighing device 7 displays on the second display unit 76 the status display illustrated in FIG. 20A instead of the status display illustrated in FIG. 20E and resets the weight of the articles (weighed value) displayed on the first display unit 73-1 and the sales price displayed on the first display unit 73-3 to "0".

Note that when left in a state in which the weighed value is stabilized at a value other than "0" (when a predetermined time elapses), the weighing device 7 may behave as follows. As a situation of being left in the state in which the weighed value is stabilized at a value other than "0", a situation in which, in the state in which the status display of FIG. 20C is displayed, the customer moves away from the weighing device 7 without purchasing the articles or a situation in which, in the state in which the status display of FIG. 20D is displayed (state in which the status display of FIG. 20E is not displayed), the customer moves to the information terminal 4 can be assumed.

In the former situation, the weighing device 7 may perform error display by, for example, the first display unit 73 or the second display unit 76. The weighing device 7 may output to the second display unit 76 a status display in a manner that can be distinguished from the status display of FIG. 20C.

In the latter situation, the information terminal 4 may issue an error alert (voice output, screen display) by an error message such as "Some of the product is remaining. Have you placed all of it in the container?" Note that when the weighing device 7 is provided with a display that can display a message, the weighing device 7 may issue an error alert instead of or in addition to the alert by the information terminal 4. Moreover, the weighing device 7 may output to the second display unit 76 a status display in a manner that can be distinguished from the status display of FIG. 20D. Moreover, in this situation, on the display unit 41 of the information terminal 4, it is favorable to change the displaying manner of the button (preset key) that can complete registration of the articles as articles to be adjusted and can receive the selection operation for having an adjustment label issued for such, to stop displaying this button, or to prevent transitioning to label issuing.

The weighing unit 77 is a functional unit similar to the weighing unit 37. As described above, the guiding body 72 is removably attached to the weighing unit 77. The weighing unit 77 weighs the articles supplied from the article supplying device 2a to the guiding body 72 by, for example, a weight detection method using a load cell.

A review of the first embodiment is given below.

The present invention relates to art for supplying any amount of articles.

Due to, inter alia, loss from food waste, there is an increasing tendency to recommend sales utilizing selling by weight, whereby only a necessary amount is purchased. In conjunction therewith, self-weighing sales, whereby the customer per se makes the purchase, are also being reexamined, and further improvements in operability are being sought.

Here, a system is known of calculating the monetary amount by weighing a product or other articles (for example, see patent literature 1).

[Patent Literature 1] JP 2001-317990 A

However, in the above system, operability is low; a weighing sales system that can be easily operated by the customer and realizes operability providing a high degree of freedom is sought.

One or more embodiments of the present invention provide a weighing sales system that can provide any amount of articles.

A weighing sales system of one or more embodiments of the present invention is provided with: a plurality of weighing devices that weigh articles; and an information terminal; wherein the weighing device is provided with a detection processing unit for detecting a weight of the articles and a first communication processing unit for transmitting the detected weight of the articles and predetermined identification information, and the information terminal is provided with a second communication processing unit for receiving the weight of the articles and the predetermined identification information and an article information acquisition unit for acquiring article information from a predetermined storage based on the predetermined identification information.

The first communication processing unit may transmit the detected weight of the articles and the predetermined identification information when a detection value of the weight of the articles stabilizes.

The weighing device may be provided with a provision port that discharges the articles, which are housed in the device, from a bottom surface, and an opening and closing mechanism that opens and closes the provision port.

The information terminal may be provided with a first display control unit for displaying, based on the article information, information on the weight of the articles and on a sales price depending on the weight of the articles, as well as an operation object that receives the operation to complete the registration of the articles, on a display unit.

Further provided may be: a second display control unit for displaying, on a display unit, selectable information display regions provided for each kind of articles weighed by the weighing device and, when a plurality of information display regions is selected, the number of articles corresponding to the selected information display regions and a sales price that is a sum of sales prices of the articles.

A weighing sales system of another viewpoint of the present invention causes a display unit to display a first information display region, which is provided for each of a plurality of kinds of articles, displays information on at least a weight of predetermined articles, and is selectable; a second information display region that, when a plurality of first information display regions is selected, displays the number of articles corresponding to the selected first information display regions and a sales price that is a sum of sales prices of the articles; and an operation object that receives the operation to complete the registration of the articles corresponding to the selected first information display regions and, when the operation object is pressed in a state in which the plurality of first information display regions is selected, outputs a weight ratio of the articles corresponding to the selected plurality of first information display regions.

A weighing device of yet another viewpoint of the present invention is provided with: a main body that houses articles; a weighing unit that weighs a weight of the articles housed in the main body; a display unit that displays the weight of the weighed articles; a support unit that is provided to a bottom surface of the main body and supports the main body horizontally; and an opening and closing mechanism that opens and closes a provision port of the articles housed in the main body; wherein the main body is provided with an input port that is formed in an upper surface of the main body, is open from a front-surface side to a backward through a central portion of the main body, and in which the articles are charged, and the provision port that is formed in the bottom surface, at a front-surface side of the main body with respect to the support unit.

According to the above weighing sales system 1 of the first embodiment of the present invention, a system is provided that can provide any amount of articles, can be easily operated by a customer, and realizes operability providing a high degree of freedom.

Second Embodiment

Figure 21:
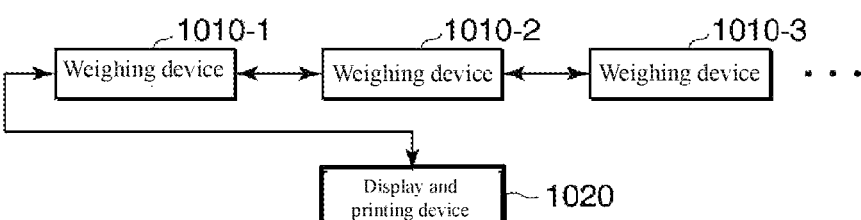
FIG. 21 shows an example of a network configuration of a sales processing system according to a second embodiment of the present invention.

FIG. 21 is one example of a network configuration of a sales processing system (may also be referred to as a "weighing sales system" as in the weighing sales system 1 according to the first embodiment) 1001 according to a second embodiment of the present invention. The sales processing system 1001 is adopted by a store that deals in products sold by weighing their weight (for example, a supermarket).

The sales processing system 1001 includes a plurality of weighing devices 1010 (weighing device 1010-1, weighing device 1010-2, weighing device 1010-3, . . . ) and a display and printing device 1020 (may also be referred to as an "information terminal" as in the information terminal 4 according to the first embodiment). The respective weighing devices 1010 and the display and printing device 1020 are connected so as to be able to communicate. For example, as illustrated in FIG. 21, the respective weighing devices 1010 and the display and printing device 1020 are subjected to a multidrop (daisy-chain) connection according to, for example, RS-485 so as to be able to communicate. Note that the topology is not limited to the multidrop connection illustrated in FIG. 21. For example, the topology may be a star topology (configuration) centered around the display and printing device 1020 or a ring topology (configuration) that includes the display and printing device 1020. The topology may also be radio communication (wireless communication).

(Summary of Weighing Device 1010)

The weighing device 1010 weighs a weighing-sales product (may also be referred to simply as a "product" below)

that is sold by being weighed. Upon weighing the product, the weighing device 1010 transmits to the display and printing device 1020 information necessary for the display and printing device 1020 to perform printing, issuing, and the like of a product label (price label). The weighing device 1010 has a plurality of types of operation modes (details described later on).

Figure 22A:
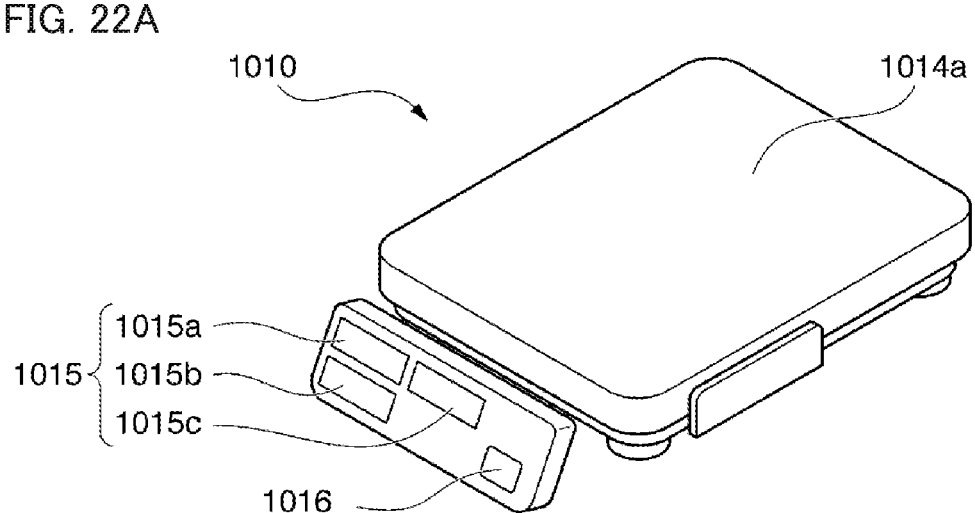
FIG. 22A shows an example of an external appearance and the like of a weighing device according to the second embodiment of the present invention.
Figure 22B:
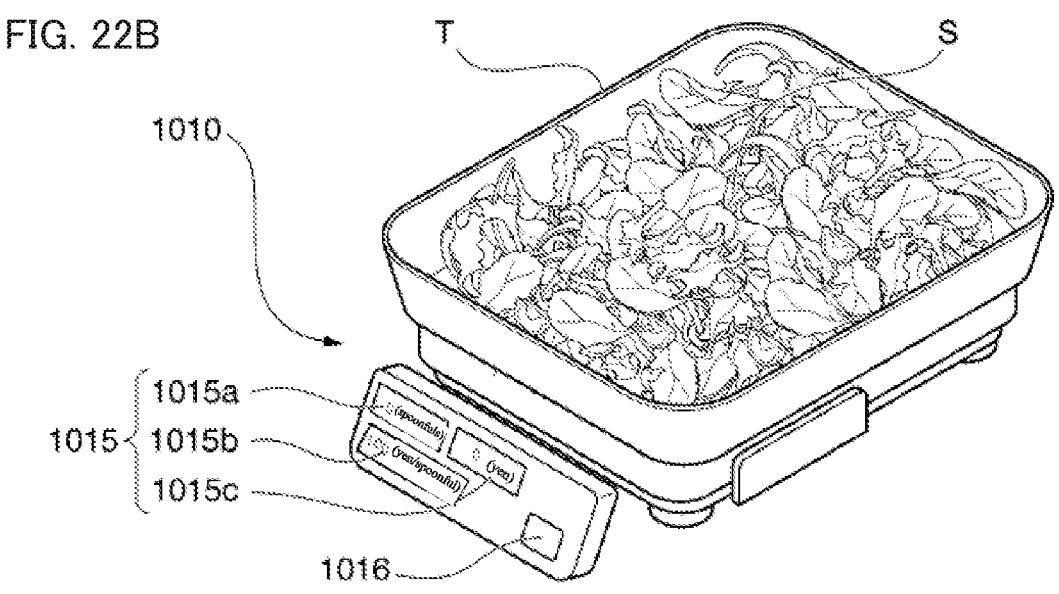
FIG. 22B shows an example of an external appearance and the like of the weighing device.
Figure 23:
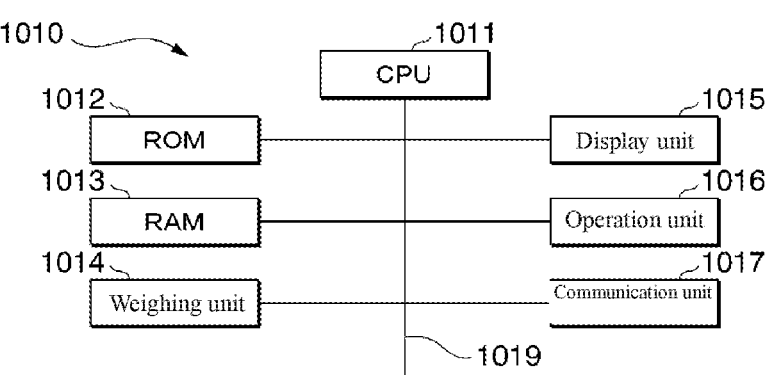
FIG. 23 shows an example of a configuration of the weighing device.

FIG. 22A and FIG. 22B are diagrams for describing the weighing device 1010. Specifically, FIG. 22A is one example of the external appearance (a perspective view) of the weighing device 1010. FIG. 22B illustrates the product being displayed on the weighing device 1010. FIG. 23 is one example of a configuration of the weighing device 1010. In FIG. 22A, FIG. 22B, and FIG. 23, identical portions are labeled with the same reference sign. The configuration of the weighing device 1010 illustrated in FIG. 23 is described below with reference to FIG. 22A and FIG. 22B.

The weighing device 1010 is provided with a CPU 1011 (central processing unit), a ROM 1012, a RAM 1013, a weighing unit 1014, a display unit 1015, an operation unit 1016, and a communication unit 1017. These are mutually connected via a bus 1019.

The CPU 1011 controls the behavior of the weighing device 1010 by reading and executing a program or instructions stored in the ROM 1012.

The ROM 1012 is a read-only memory and stores various information used by the CPU 1011, beginning with, for example, the program or instructions.

The RAM 1013 is a read—write memory and stores various information, such as information read from the ROM 1012, information acquired via the communication unit 1017, and information processed (computed or the like) by the CPU 1011.

The weighing unit 1014 weighs articles. For example, as illustrated in FIG. 22B, the weighing unit 1014 uses a weight detection method using a load cell to weigh, for example, the product displayed on a platform 1014*a* (see FIG. 22A) (for example, a product S on a platter (salver) P).

The display unit 1015 displays to an operator a sales price and the like. For example, the display unit 1015 may be a liquid-crystal panel. As illustrated in FIG. 22A and FIG. 22B, the display unit 1015 is provided with three indicators (indicator 1015*a*, indicator 1015*b*, indicator 1015*c*).

The operation unit 1016 receives operations by the operator. Note that in the example illustrated in FIG. 22A and FIG. 22B, the operation unit 1016 is one or more hard buttons (push buttons) disposed in a casing but may be one or more soft buttons (touch buttons) that are operably displayed. In other words, the operation unit 1016 may be a portion of the display unit 1015. That is, the display unit 1015 may be a touch panel that displays the sales price and the like to the operator and receives the operations of the operator.

The communication unit 1017 performs information transmission and reception with another device. For example, the communication unit 1017 transmits to the display and printing device 1020 information necessary to perform printing, issuing, and the like of the product label.

Note that although illustration is omitted, the weighing device 1010 may be provided with a hard disk. Instead of the RAM 1013, the hard disk may store the various information such as the information read from the ROM 1012, the information acquired via the communication unit 1017, and the information processed (computed or the like) by the CPU 1011. Moreover, the weighing device 1010 may be provided with an SSD (solid-state drive) instead of a hard disk.

Furthermore, the weighing device 1010 may be provided with a timing unit (timing function). For example, the weighing device 1010 may be made able to use the timing unit to manage a current time, a remaining time until a certain time, and an elapsed time since entering a certain state. Moreover, the weighing device 1010 may be provided with a human-presence sensor. For example, the weighing device 1010 may use the human-presence sensor to determine whether the operator is in the vicinity (for example, in front of the weighing device 1010).

(Display and Printing Device 1020)

Although illustration is omitted, the display and printing device 1020 is provided with, for example, a CPU, a ROM, a RAM, a display unit, a printing unit, an operation unit, and a communication unit. These are mutually connected via a bus. The display and printing device 1020 prints and issues the product label of the product weighed by the weighing device 1010. Specifically, the display and printing device 1020 prints and issues the product label based on information transmitted by the weighing device 1010 based on an operation of the operator (printing instruction operation). Moreover, the display and printing device 1020, when printing and issuing the product label of the product weighed by the weighing device 1010, displays information regarding this product (which may be information regarding the weighing of this product or information regarding the product label of this product). The display unit provided by the display and printing device 1020 may be a touch panel that displays to the operator, inter alia, the information regarding this product and receives the operations of the operator (for example, the printing instruction operation).

(Mode A, Mode B)

FIG. 24A and FIG. 24B are explanatory diagrams for describing the operation modes of the weighing device 1010. As illustrated in FIG. 24A, the weighing device 1010 has mode A and mode B as the operation modes. FIG. 24B is described later on.

A change in which operation mode is set (also referred to as a "behavior-mode change" or a "behavior-mode switch") is made by a mode-changing operation via the operation unit 1016 by a clerk (for example, a predetermined operation known only by the clerk). That is, the weighing device 1010 switches operation modes when the mode-changing operation is performed on the operation unit 1016. Note that the behavior-mode change may be performed by a mode-changing operation via a DIP switch (not illustrated) by the clerk. Moreover, the behavior-mode change may be performed by a mode-changing operation in another device (for example, the operation unit of the display and printing device 1020) by the clerk instead of or in addition to a mode-changing operation in the weighing device 1010 such as above (mode-changing operation via the operation unit 1016 or the DIP switch) (the behavior-mode change may be able to be made based on a remote operation from another device). That is, the weighing device 1010 may switch operation modes when a mode-changing command is received from another device instead of or in addition to when there is a mode-changing operation in the weighing device 1010.

(First Unit Weight, First Unit Price, Second Unit Weight, Second Unit Price, Difference Weight)

A first unit weight is a weight (mass) in general units (for example, CGS units).

A first unit price is a unit price based on the first unit weight. It is, for example, a price per 1 g or a price per 100 g. A second unit weight is a weight (mass) in units different from the first unit weight (for example, one spoonful). A second unit price is a unit price based on the second unit weight. It is, for example, a price per spoonful. A difference weight is the weight of the difference between a first weighed weight (standard weight), which is a weight weighed by the weighing unit 1014 and serving as a standard, and a second weighed weight, which is a weight weighed by the weighing unit 1014 and differing from the first weighed weight.

As illustrated in FIG. 22B, for a mode in which a product amount to be purchased is taken from a state in which the product is placed (displayed) on the weighing device 1010 (platform 1014*a*) (that is, a mode in which a decrease amount of the product placed on the weighing device is made to be a purchase weight), the weight before the product amount to be purchased is taken is the first weighed weight, and the weight after the product amount to be purchased is taken is the second weighed weight. There is no second weighed weight before the product amount to be purchased is taken.

As illustrated in FIG. 22A, for a mode in which the product amount to be purchased is placed on the weighing device 1010 (platform 1014*a*) from a state in which nothing is placed on the weighing device (that is, a mode in which a placement amount of the product is made to be the purchase weight), the weight before the product amount to be purchased is placed on the weighing device is the first weighed weight (fundamentally zero), and the weight after the product amount to be purchased is placed on the weighing device is the second weighed weight. There is no second weighed weight before the product amount to be purchased is placed on the weighing device.

The weighing device 1010 can display a unit price, the purchase weight, and the sales price (total) on the display unit 1015.

(Display in Mode A)

As illustrated in FIG. 24A, when the operation mode is mode A, the weighing device 1010 displays the second unit price when displaying the unit price on the display unit 1015, displays a converted amount that is the difference weight converted into the second unit weight when displaying the purchase weight on the display unit 1015, and displays a calculated monetary amount based on the first unit price and the difference weight when displaying the sales price on the display unit 1015. Note that the weighing device 1010 may display a calculated monetary amount based on the second unit price and the converted amount instead of the calculated monetary amount based on the first unit price and the difference weight when displaying the sales price on the display unit 1015. Because mode A uses the difference weight, for example, for the mode in which the decrease amount of the product placed on the weighing device 1010 is made to be the purchase weight, the weighing device is made to behave in mode A.

(Display in Mode B)

As illustrated in FIG. 24A, when the operation mode is mode B, the weighing device 1010 displays the first unit price when displaying the unit price on the display unit 1015, displays the weighed weight when displaying the purchase weight on the display unit 1015, and displays a calculated monetary amount based on the first unit price and the weighed weight when displaying the sales price on the display unit 1015. Because mode B does not use the difference weight, for example, in the case that the placement amount of the product is made to be the purchase weight, the weighing device 1010 is made to behave in mode B.

FIG. 25 is one example of information stored by the weighing device 1010. As illustrated in FIG. 25, the weighing device 1010 (for example, the weighing device 1010-1;

likewise in the description of FIG. 25) stores weighing-device identification information, the current operation mode, the first weighed weight (standard weight), the second weighed weight, a warning weight, the first unit weight, the first unit price, the second unit weight (one spoonful), and the second unit price (one spoonful) in a storage unit (ROM 1012, RAM 1013, hard disk, SSD).

The weighing-device identification information is information identifying the respective weighing devices 1010 in the sales processing system 1001. In the example illustrated in FIG. 25, the weighing device 1010 stores "K001" as the weighing-device identification information. The current operation mode is information indicating the operation mode that is currently set. In the example illustrated in FIG. 25, the weighing device 1010 stores "A", which indicates mode A, as the current operation mode. As above, the first weighed weight is the standard weight. In the example illustrated in FIG. 25, the weighing device 1010 stores "2040 (g)" as the first weighed weight. As above, the second weighed weight is a weighed weight different from the first weighed weight. In the example illustrated in FIG. 25, the weighing device 1010 stores no second weighed weight. That is, this is a circumstance before the product amount to be purchased is taken. The warning weight is a predetermined weight that is compared with the first weighed weight (or second weighed weight). For the mode in which the decrease amount of the product placed on the weighing device is made to be the purchase weight, when little remains of the product placed on the weighing device, an alert is issued as much; the warning weight is the weight serving as the basis of the alert. In the example illustrated in FIG. 25, the weighing device 1010 stores "200 (g)" as the warning weight. Note that a different warning weight may be set for each kind of product placed on the platform 1014*a*.

As above, the first unit weight is a weight in general units (for example, CGS units). In the example illustrated in FIG. 25, the weighing device 1010 stores "100 (g)" as the first unit weight. Note that the weighing device 1010 may store "1 (g)" as the first unit weight. As above, the first unit price is a unit price based on the first unit weight. In the example illustrated in FIG. 25, the weighing device 1010 stores "500 (yen/100 g)", which is a unit price per 100 g, as the first unit price. Note that the weighing device 1010 may store "5 (yen/1 g)", which is a unit price per 1 g, as the first unit price.

As above, the second unit weight is a weight in units different from the first unit weight. In the example illustrated in FIG. 25, the weighing device 1010 stores "20 (g/spoonful)", which is the weight of one spoonful, as the second unit weight. A second unit weight corresponding to the tool used to take the product is stored. As above, the second unit price is a unit price based on the second unit weight. In the example illustrated in FIG. 25, the weighing device 1010 stores "100 (yen/spoonful)", which is the unit price per spoonful, as the second unit price.

Figure 26:
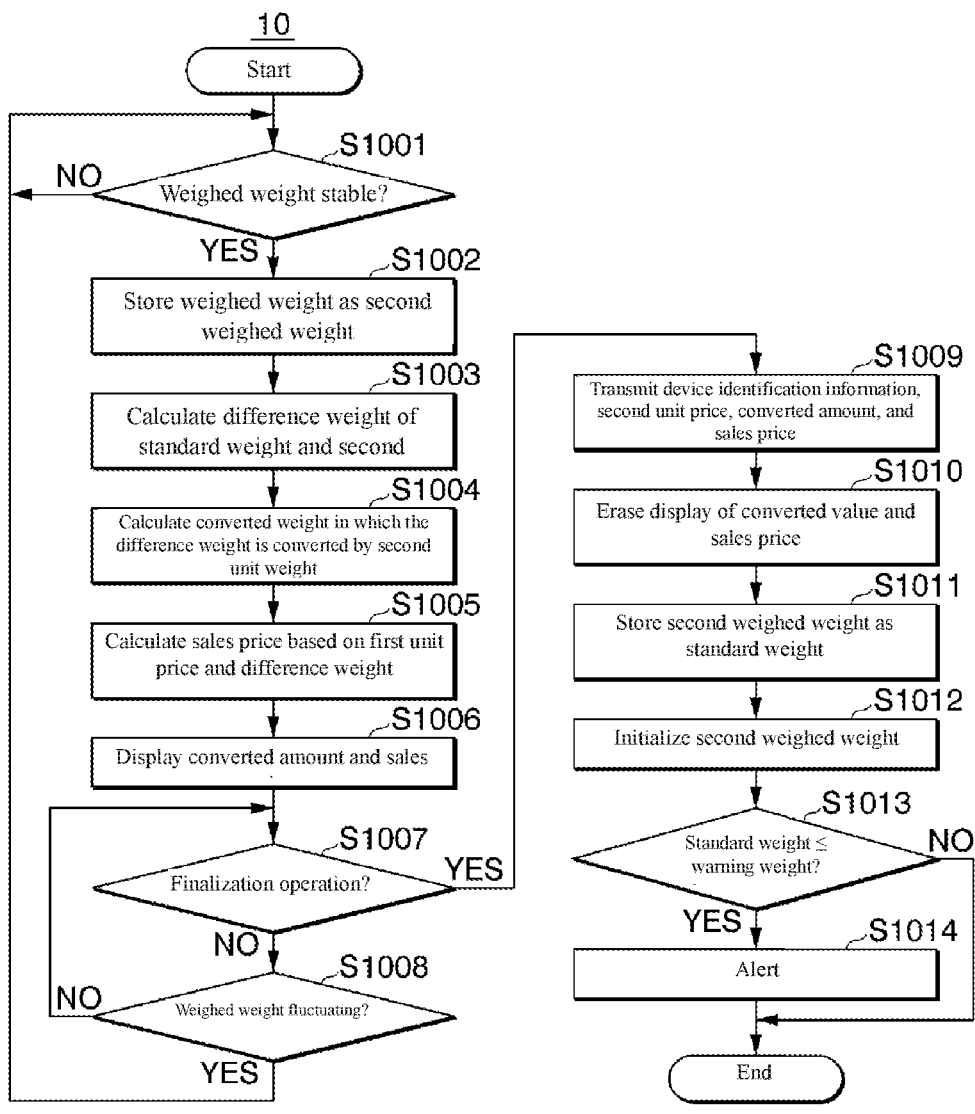
FIG. 26 shows a flowchart illustrating an example of operation of the weighing device.

FIG. 26 is a flowchart illustrating one example of behaviors of the weighing device 1010. Specifically, the flowchart in FIG. 26 illustrates one example of behaviors of the weighing device 1010 behaving in mode A. Note that the product is displayed on the weighing device 1010 (that is, the mode is the one in which the decrease amount of the product placed on the weighing device is made to be the purchase weight); the flowchart in FIG. 26 starts by the operator (for example, a certain customer C) taking the product amount to be purchased (that is, the weight weighed by the weighing unit 1014 (weighed value) fluctuating).

Step S1001: The weighing device 1010 determines whether the weighed weight is stabilized (that is, whether the fluctuation has ended). If the weighed weight is not stabilized (step S1001: NO), step S1001 is repeated. If the weighed weight is stabilized (step S1001: YES), the flow proceeds to step S1002.

Step S1002: The weighing device 1010 stores the weighed weight as the second weighed weight. Next, the flow proceeds to step S1003.

Step S1003: The weighing device 1010 calculates the difference weight between the standard weight (first weighed weight) and the second weighed weight. Next, the flow proceeds to step S1004.

Step S1004: The weighing device 1010 calculates the converted amount that is the difference weight converted by the second unit weight. Specifically, the weighing device 1010 obtains the converted amount by dividing the difference weight by the second unit weight. Next, the flow proceeds to step S1005.

Step S1005: The weighing device 1010 calculates the sales price based on the first unit price and the difference weight. Note that the weighing device 1010 may calculate the sales price based on the second unit price and the converted amount. Next, the flow proceeds to step S1006.

Step S1006: The weighing device 1010 displays the converted amount calculated at step S1004 as the purchase weight. Moreover, the weighing device 1010 displays the sales price calculated at step S1005 as the sales price (total). Note that the weighing device 1010 is displaying the second unit price as the unit price from before starting the present flowchart. Next, the flow proceeds to step S1007.

Step S1007: The weighing device 1010 determines whether there was a finalizing operation (operation for finalizing a purchase via the operation unit 1016). If there was a finalizing operation (step S1007: YES), the flow proceeds to step S1009. If there was no finalizing operation (step S1007: NO), the flow proceeds to step S1008.

Step S1008: The weighing device 1010 determines whether the weighed weight fluctuated. That is, the weighing device 1010 determines whether an additional amount of the product was taken (or whether an already taken amount of the product was returned). If the weighed weight fluctuated (step S1008: YES), the flow returns to step S1001. If the weighed weight did not fluctuate (step S1008: NO), the flow returns to step S1007.

That is, the customer C performs the finalizing operation when purchasing the current amount while confirming the monetary amount but can also increase or decrease the purchase amount without performing the finalizing operation. If the finalizing operation is performed (step S1007: YES), the weighing device 1010 executes the processes of step S1009 and the steps subsequent thereto, which are described later on. If the purchase amount is increased or decreased without the finalizing operation being performed (step S1008: YES), the weighing device 1010 re-executes the processes of step S1001 and the steps subsequent thereto that are described above. Note that in mode A, because the unit price of one spoonful of the spoon used to actually take the product (second unit price) is indicated, a time until a quantity according to a budget is reached is shortened, thus decreasing situations in which a quantity significantly exceeding the budget is weighed. That is, weighing of a desired product quantity is completed in a short time, and situations of returning the product after weighing are decreased.

Step S1009: The weighing device 1010 transmits the device identification information, the second unit price, the converted amount calculated at step S1004, and the sales price calculated at step S1005 to the display and printing device 1020. Next, the flow proceeds to step S1010. Note that the display and printing device 1020 stores the device identification information and the product (product identification information) in association with each other (or refers to, for example, a table, stored by another device, associating the device identification information and the product (product identification information) with each other), specifies the product from the device identification information received from the weighing device 1010, and prints and issues the product label.

Step S1010: The weighing device 1010 erases the converted amount and the sales price displayed at step S1006. Note that the weighing device 1010 does not need to erase the second unit price. Next, the flow proceeds to step S1011.

Step S1011: The weighing device 1010 stores the second weighed weight stored at step S1002 as the standard weight. That is, the weighing device 1010 stores the weight after the purchase (after the decrease) as the new standard weight. Next, the flow proceeds to step S1012.

Step S1012: The weighing device 1010 initializes (erases from storage) the second weighed weight stored at step S1002. Next, the flow proceeds to step S1013.

Step S1013: The weighing device 1010 determines whether the standard weight is at or below the warning weight. If the standard weight is at or below the warning weight (step S1013: YES), the flow proceeds to step S1014. If the standard weight is not at or below the warning weight (step S1013: NO), the present flowchart ends.

Step S1014: The weighing device 1010 issues an alert that little remains of the product on the platform 1014a. Specifically, the weighing device 1010 transmits information indicating that little remains of the product on the platform 1014a to the display and printing device 1020. The present flowchart then ends.

Note that in the flowchart in FIG. 26, the weighing device 1010 proceeds to step S1009 (finalizes the purchase) based on a predetermined operation (finalizing operation) (step S1007 (YES)) but may proceed to step S1009 based on another condition.

(1) Elapsed Time

The weighing device may proceed to step S1009 based on elapsed time instead of or in addition to the predetermined operation. For example, the weighing device may proceed to step S1009 if a time timed from a timing of starting display of the newest sales price or the like (a time that is measured from the latest execution of step S1006 and cleared at step S1008 (YES)) exceeds a predetermined time.

(2) Human-Presence Sensor

The weighing device may proceed to step S1009 based on the operator that was present in front of the weighing device 1010 becoming absent instead of or in addition to the predetermined operation and the elapsed time. For example, the weighing device may proceed to step S1009 if the human-presence sensor no longer detects human presence after continuing to detect human presence for a predetermined time (for example, a time whereby it is supposed that a purchase is being made as opposed to someone simply passing by) or longer.

Furthermore, in the flowchart in FIG. 26, the weighing device 1010 transmits the device identification information, the second unit price, the converted amount, and the sales price to the display and printing device 1020 (step S1009). However, it is sufficient for the information transmitted to the display and printing device 1020 to be information necessary for the display and printing device 1020 to perform printing, issuing, and the like of the product label; the transmitted information is not limited to the device identification information, the second unit price, the converted amount, and the sales price. For example, when the weighing device 1010 stores the product identification information identifying the product instead of or in addition to the device identification information, the weighing device 1010 may transmit the product identification information, the second unit price, the converted amount, and the sales price to the display and printing device 1020. Moreover, when the display and printing device 1020 stores a second unit price for each product, the weighing device 1010 may transmit the device identification information (or product identification information), the converted amount, and the sales price to the display and printing device 1020.

FIG. 27A to FIG. 27D are explanatory diagrams for describing display and the like by the weighing device 1010. Display and the like by the weighing device 1010 are described according to the flowchart in FIG. 26. Note that it is supposed that the weighing device 1010 is storing the various information illustrated in FIG. 25 at the time of starting the flowchart in FIG. 26.

Figure 27A:
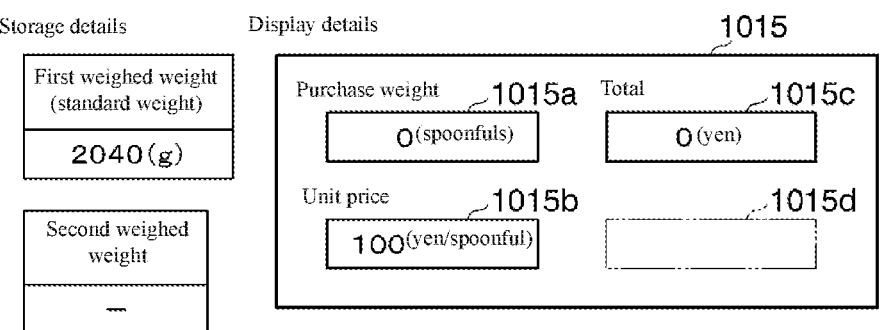
FIG. 27A shows an explanatory diagram describing display and the like of the weighing device.

FIG. 27A illustrates the storage content for the first weighed weight (standard weight), the storage content for the second weighed weight, and the display content of the display unit 1015 (indicator 1015*a*, indicator 1015*b*, indicator 1015*c*) at a point when the customer C has moved in front of the weighing device 1010 (that is, a stage whereat no amount of the product is taken from atop the weighing device 1010). Note that an indicator 1015*d*, illustrated using the dot-dot-dash line, is content according to a "variation (described later on)". In the description here, it is supposed that no indicator 1015*d* is present.

At the point when the customer C has moved in front of the weighing device 1010, no amount of the product on the weighing device 1010 has been taken (that is, the flowchart in FIG. 26 has yet to start). Thus, no second weighed weight is being stored. Moreover, as above, the weighing device 1010 has been displaying the second unit price "100 yen (yen/spoonful)" on the display unit 1015 (indicator 1015*b*) from before the start of the flowchart in FIG. 26.

FIG. 27B illustrates the storage content for the first weighed weight, the storage content for the second weighed weight, and the display content of the display unit 1015 after the customer C afterward takes one spoonful (it is supposed that this is exactly 20 g) of the product from atop the weighing device 1010. Specifically, illustrated is the above storage content and the above display content in the loop of steps S1007 and S1008 (loop of step S1007 (NO) to step S1008 (NO)) after one spoonful of the product is taken.

The second weighed weight "2020 (g)" in FIG. 27B is the weighed weight stored at step S1002. The purchase weight "1.0 (spoonfuls)" in FIG. 27B is the converted amount that is calculated at step S1004 and displayed at step S1006. That is, the weighing device 1010 calculates the converted amount "1.0 (spoonfuls)", which is the difference weight "20 (g)" converted by the second unit weight "20 (g/spoonful)" at step S1004, and displays such on the display unit 1015 (indicator 1015*a*) at step S1006. The total (sales price) "100 (yen)" in FIG. 27B is the converted amount that is calculated at step S1005 and displayed at step S1006. That is, the weighing device 1010 calculates the sales price "100 (yen)" based on the first unit price "500 (yen/100 g)" and the difference weight "20 (g)" at step S1005 and displays such on the display unit 1015 (indicator 1015*b*) at step S1006.

Note that at step S1005, the weighing device 1010 may calculate the sales price "100 (yen)" based on the second unit price "100 (yen/spoonful)" and the converted amount "1.0 (spoonfuls)" instead of calculating the sales price "100 (yen)" based on the first unit price "500 (yen/100 g)" and the difference weight "20 (g)".

FIG. 27C illustrates the storage content for the first weighed weight, the storage content for the second weighed weight, and the display content of the display unit 1015 after the customer C afterward takes another half spoonful (it is supposed that this is exactly 10 g) of the product from atop the weighing device 1010. Specifically, illustrated is the above storage content and the above display content in the loop of steps S1007 and S1008 after the half spoonful of the product is taken.

The second weighed weight "2010 (g)" in FIG. 27C is the weighed weight stored at the second step S1002. The purchase weight "1.5 (spoonfuls)" in FIG. 27C is the converted amount that is calculated at the second step S1004 and displayed at the second step S1006. That is, the weighing device 1010 calculates the converted amount "1.5 (spoonfuls)", which is the difference weight "30 (g)" converted by the second unit weight "20 (g/spoonful)" at the second step S1004, and displays such on the display unit 1015 (indicator 1015*a*) at the second step S1006. The total "150 (yen)" in FIG. 27C is the converted amount that is calculated at the second step S1005 and displayed at the second step S1006. That is, the weighing device 1010 calculates the sales price "150 (yen)" based on the first unit price "500 (yen/100 g)" and the difference weight "30 (g)" at the second step S1005 and displays such on the display unit 1015 (indicator 1015*b*) at step S1006.

Note that at the second step S1005, the weighing device 1010 may calculate the sales price "150 (yen)" based on the second unit price "100 (yen/spoonful)" and the converted amount "1.5 (spoonfuls)" instead of calculating the sales price "150 (yen)" based on the first unit price "500 (yen/100 g)" and the difference weight "30 (g)".

FIG. 27D illustrates the storage content for the first weighed weight, the storage content for the second weighed weight, and the display content of the display unit 1015 after the customer C afterward performs the finalizing operation. Specifically, illustrated are the above storage content and the above display content from when, after the finalizing operation is performed, the process of step S1012 ends (similar content being stored and displayed when the flowchart ends).

The purchase weight "0 (spoonfuls)" in FIG. 27D is a result of the purchase weight "1.5 (spoonfuls)" in FIG. 27C being erased at step S1010. The total "0 (yen)" in FIG. 27D is a result of the total "150 (yen)" in FIG. 27C being erased at step S1010. The first weighed weight "2010 (g)" in FIG. 27D is a result of the second weighed weight "2010 (g)" being stored as the first weighed weight at step S0011. The second weighed weight "-" in FIG. 27D is a result of the second weighed weight "2010 (g)" being initialized at step S0012.

The weighing device 1010 according to the second embodiment is described above. The weighing device 1010 makes it easy to understand a relationship between product amount and sales price. That is, using the second unit price, which is easy to intuitively understand, makes it easy to understand the relationship between product amount and sales price. Moreover, the weighing device 1010 has a plurality of operation modes. Thus, the weighing-sales product can be weighed and sold by selecting a suitable operation mode according to the sales method of the weighing-sales product (the mode in which the decrease amount of the product placed on the weighing device is made to be the purchase weight, the mode in which the placement amount of the product is made to be the purchase weight). In other words, the weighing device 1010 can weigh and sell the weighing-sales product in any unit weight (for example, the first unit weight, the second unit weight) according to the usage circumstances.

The second embodiment is described above. However, the above description is one example; a specific configuration is not limited to the above description and also includes designs and the like within a scope that does not depart from the gist of the invention. For example, the configuration may be as in (1) to (10) below. Moreover, (1) to (10) below may be combined as appropriate.

(1) The second embodiment describes an example in which the weighing device 1010, as a method of obtaining the converted amount according to the second unit weight, calculates by computation (divides the difference weight by the second unit weight). However, the way to obtain the converted amount by the weighing device 1010 is not limited to the method of calculating by computation.

For example, the weighing device 1010 may obtain the converted amount by referencing a conversion table associating the difference weight and the second unit weight. Note that the weighing device 1010 may obtain the converted amount by storing the conversion table in itself and referencing the conversion table stored in itself. Alternatively, the weighing device 1010 may obtain the converted amount by referencing the conversion table stored in another device (for example, the display and printing device 1020).

Moreover, the weighing device 1010 may obtain the converted amount by querying another device (for example, the display and printing device 1020). Specifically, the weighing device 1010 may transmit the difference weight to another device and receive the converted amount from the other device. Note that the other device may obtain the converted amount by calculation or obtain the converted amount by referencing a conversion table such as above.

Note that the above conversion table may, for example, as illustrated below, associate difference-weight ranges and converted amounts.

Difference weight "1.9 g or more and less than 2.1 g"→"0.1 (spoonfuls)"
Difference weight "19 g or more and less than 21 g"→"1.0 (spoonfuls)"
Difference weight "21 g or more and less than 23 g"→"1.1 (spoonfuls)"

(2) The second embodiment describes an example in which the weighing device 1010 stores the various information necessary for behavior (FIG. 25) in itself. However, like the above conversion table, a portion or the entirety of the various information necessary for behavior may be stored in another device.

(3) The second embodiment describes an example in which the weighing device 1010 stores in advance the information necessary for behavior (FIG. 25). However, the information may be derived (calculated) instead of being stored in advance. For example, in the example illustrated in FIG. 25, the weighing device 1010 may store in advance (in itself or in another device) the first unit price "500 (yen/100 g)" and the second unit weight "20 (g/spoonful)" and derive the second unit price "100 (yen/20 g)" from the first unit price "500 (yen/100 g)" and the second unit weight "20 (g/spoonful)".

(4) The second embodiment describes mode A and mode B as the operation modes provided by the weighing device 1010 (FIG. 24A). However, the operation modes provided by the weighing device 1010 are not limited to mode A and mode B.

For example, the weighing device 1010 may have mode D, illustrated in FIG. 24B, instead of or in addition to mode A, illustrated in FIG. 24A. For example, in the case that the decrease amount of the product placed on the weighing device is made to be the purchase weight, the weighing device 1010 may be made to behave in mode D instead of mode A. As illustrated in FIG. 24B, when the operation mode is mode D, the weighing device 1010 displays the first unit price when displaying the unit price on the display unit 1015, displays the difference weight when displaying the purchase weight on the display unit 1015, and displays a calculated monetary amount based on the first unit price and the difference weight when displaying the sales price on the display unit 1015.

(Summary of Behaviors in Mode D)

Behaviors of the weighing device 1010 when the operation mode is mode D in the case that the decrease amount of the product placed on the weighing device is made to be the purchase weight (behaviors until the sales price and the like are displayed on the display unit 1015) are as follows. The weighing device 1010 stores the weighed weight as the second weighed weight. Next, the weighing device 1010 calculates the difference weight between the standard weight and the second weighed weight. Next, the weighing device 1010 calculates the sales price based on the first unit price and the difference weight. Next, the weighing device 1010 displays the difference weight and the sales price.

(Summary of Behaviors in Mode A)

Note that the behaviors of the weighing device 1010 when the operation mode is mode A in the case that the decrease amount of the product placed on the weighing device is made to be the purchase weight are as described in FIG. 26 and FIGS. 27A-27D.

Furthermore, the weighing device 1010 may have mode C, illustrated in FIG. 24B, instead of or in addition to mode B, illustrated in FIG. 24A. For example, in the case that the placement amount of the product is made to be the purchase weight, the weighing device 1010 may be made to behave in mode C instead of mode B. As illustrated in FIG. 24B, when the operation mode is mode C, the weighing device 1010 displays the second unit price when displaying the unit price on the display unit 1015, displays a converted amount that is the weighed weight converted into the second unit weight when displaying the purchase weight on the display unit 1015, and displays a calculated monetary amount based on the first unit price and the weighed weight when displaying the sales price on the display unit 1015. Note that the weighing device 1010 may display a calculated monetary amount based on the second unit price and the converted amount instead of the calculated monetary amount based on the first unit price and the weighed weight when displaying the sales price on the display unit 1015.

(Summary of Behaviors in Mode C)

Behaviors of the weighing device 1010 when the operation mode is mode C in the case that the placement amount of the product is made to be the purchase weight (behaviors until the sales price and the like are displayed on the display unit 1015) are as follows. The weighing device 1010 calculates the converted amount that is the weighed weight converted by the second unit weight. Next, the weighing device 1010 calculates the sales price based on the first unit price and the weighed weight (or based on the second unit price and the converted amount). Next, the weighing device 1010 displays the converted amount and the sales price.

(Summary of Behaviors in Mode B)

Note that the behaviors of the weighing device 1010 when the operation mode is mode B in the case that the placement amount of the product is made to be the purchase weight (behaviors until the sales price and the like are displayed on the display unit 1015) are as follows. The weighing device 1010 calculates the sales price based on the first unit price and the weighed weight. Next, the weighing device 1010 displays the weighed weight and the sales price.

(5) In relation to (4) above, in the second embodiment, the weighing device 1010 is described as having a plurality of operation modes, but the weighing device 1010 does not need to have a plurality of operation modes. For example, the weighing device 1010 may continually behave according to behaviors similar to the behaviors of any one operation mode among mode A, mode C, and mode D.

(6) In the second embodiment, the display unit 1015 is described as being provided with three indicators (indicator 1015a, indicator 1015b, indicator 1015c). However, the individual indicators may be referred to as display units 1015. That is, the weighing device 1010 may be said to be provided with three display units 1015. Moreover, the second embodiment describes an example in which the display unit 1015 is provided with three indicators (in other words, an example in which the weighing device 1010 is provided with three display units 1015). However, the display unit 1015 may be provided with one, two, or four or more indicators (in other words, the weighing device 1010 may be provided with one, two, or four or more display units 1015). As one example, when the display unit 1015 is provided with one indicator (when the weighing device 1010 is provided with one display unit 1015), the unit price, the purchase weight, and the sales price (total) are displayed in the one indicator (display unit 1015). As another example, when the display unit 1015 is provided with four indicators (when the weighing device 1010 is provided with four display units 1015), for the mode in which the decrease amount of the product placed on the weighing device is made to be the purchase weight, the weighed weight (first weighed weight, second weighed weight) may be displayed on the fourth indicator (display unit 1015).

(Mode in which First Weighed Weight Is Displayed on Fourth Indicator)

A mode in which the weighing device 1010 displays the first weighed weight on the fourth indicator is described. Note that as illustrated in FIGS. 27A-27D, the weighing device 1010 is provided with the indicator 1015d, illustrated by the dot-dot-dash line as the fourth indicator, in addition to the indicator 1015a, the indicator 1015b, and the indicator 1015c.

(Display in Mode A)

For example, when one spoonful (20 g) is first taken from the product (2040 g) placed on the platform 1014a and then a half spoonful (10 g) is taken to purchase a combined 1.5 spoonfuls (30 g), display by the indicator 1015a to the indicator 1015d is as follows.

<Before Taking One Spoonful>

Display by indicator 1015a: Purchase weight (converted amount that is converted difference weight) "0 (spoonfuls)"

Display by indicator 1015b: Unit price (second unit price) "100 (yen/spoonful)"

Display by indicator 1015c: Total "0 (yen)"

Display by indicator 1015d: First weighed weight "2040 (g)"

<Before Taking One Spoonful>

Display by indicator 1015a: Purchase weight (converted amount that is converted difference weight) "1.0 (spoonfuls)"

Display by indicator 1015b: Unit price (second unit price) "100 (yen/spoonful)"

Display by indicator 1015c: Total "100 (yen)"

Display by indicator 1015d: Second weighed weight "2020 (g)"

<After Taking Half Spoonful>

Display by indicator 1015a: Purchase weight (converted amount that is converted difference weight) "1.5 (spoonfuls)"

Display by indicator 1015b: Unit price (second unit price) "100 (yen/spoonful)"

Display by indicator 1015c: Total "150 (yen)"

Display by indicator 1015d: Second weighed weight "2010 (g)"

<After Transaction Completion>

Display by indicator 1015a: Purchase weight (converted amount that is converted difference weight) "0 (spoonfuls)"

Display by indicator 1015b: Unit price (second unit price) "100 (yen/spoonful)"

Display by indicator 1015c: Total "0 (yen)"

Display by indicator 1015d: First weighed weight "2010 (g)"

(Display in Mode D)

For example, when 20 g is first taken from the product (2040 g) placed on the platform 1014a and then 10 g is taken to purchase a combined 30 g, display by the indicator 1015a to the indicator 1015d is as follows.

<Before Taking 20 g>

Display by indicator 1015a: Purchase weight (difference weight) "0 (g)"

Display by indicator 1015b: Unit price (first unit price) "500 (yen/100 g)"

Display by indicator 1015c: Total "0 (yen)"

Display by indicator 1015d: First weighed weight "2040 (g)"

<After Taking 20 g>

Display by indicator 1015a: Purchase weight (difference weight) "20 (g)"

Display by indicator 1015b: Unit price (first unit price) "500 (yen/100 g)"

Display by indicator 1015c: Total "100 (yen)"

Display by indicator 1015d: Second weighed weight "2020 (g)"

<After Taking 10 g>

Display by indicator 1015a: Purchase weight (difference weight) "30 (g)"

Display by indicator 1015b: Unit price (first unit price) "500 (yen/100 g)"

Display by indicator 1015c: Total "150 (yen)"

Display by indicator 1015d: Second weighed weight "2010 (g)"

<After Transaction Completion>

Display by indicator 1015a: Purchase weight (difference weight) "0 (g)"

Display by indicator 1015b: Unit price (first unit price) "500 (yen/100 g)"

Display by indicator 1015c: Total "0 (yen)"

Display by indicator 1015d: First weighed weight "2010 (g)"

(Display in Mode B)

For example, when 20 g is first placed on the platform 1014a and then 10 g is placed on the platform 1014a to purchase a combined 30 g, display by the indicator 1015a to the indicator 1015d is as follows.

<Before Placing 20 g on Platform>

Display by indicator 1015*a*: Purchase weight (weighed weight) "0 (g)"

Display by indicator 1015*b*: Unit price (first unit price) "500 (yen/100 g)"

Display by indicator 1015*c*: Total "0 (yen)"

Display by indicator 1015*d*: First weighed weight "0 (g)"

<After Placing 20 g on Platform>

Display by indicator 1015*a*: Purchase weight (weighed weight) "20 (g)"

Display by indicator 1015*b*: Unit price (first unit price) "500 (yen/100 g)"

Display by indicator 1015*c*: Total "100 (yen)"

Display by indicator 1015*d*: Second weighed weight "20 (g)"

<After Placing 10 g on Platform>

Display by indicator 1015*a*: Purchase weight (weighed weight) "30 (g)"

Display by indicator 1015*b*: Unit price (first unit price) "500 (yen/100 g)"

Display by indicator 1015*c*: Total "150 (yen)"

Display by indicator 1015*d*: Second weighed weight "30 (g)"

<After Transaction Completion>

Display by indicator 1015*a*: Purchase weight (weighed weight) "0 (g)"

Display by indicator 1015*b*: Unit price (first unit price) "500 (yen/100 g)"

Display by indicator 1015*c*: Total "0 (yen)"

Display by indicator 1015*d*: First weighed weight "0 (g)"

(Display in Mode C)

For example, when one spoonful (20 g) is first placed on the platform 1014*a* and then a half spoonful (10 g) is placed on the platform 1014*a* to purchase a combined 1.5 spoonfuls (30 g), display by the indicator 1015*a* to the indicator 1015*d* is as follows.

<Before Placing One Spoonful on Platform>

Display by indicator 1015*a*: Purchase weight (converted amount that is converted weighed weight) "0 (spoonfuls)"

Display by indicator 1015*b*: Unit price (second unit price) "100 (yen/spoonful)"

Display by indicator 1015*c*: Total "0 (yen)"

Display by indicator 1015*d*: First weighed weight "0 (g)"

<After Placing One Spoonful on Platform>

Display by indicator 1015*a*: Purchase weight (converted amount that is converted weighed weight) "1.0 (spoonfuls)"

Display by indicator 1015*b*: Unit price (second unit price) "100 (yen/spoonful)"

Display by indicator 1015*c*: Total "100 (yen)"

Display by indicator 1015*d*: Second weighed weight "20 (g)"

<After Placing Half Spoonful on Platform>

Display by indicator 1015*a*: Purchase weight (converted amount that is converted weighed weight) "1.5 (spoonfuls)"

Display by indicator 1015*b*: Unit price (second unit price) "100 (yen/spoonful)"

Display by indicator 1015*c*: Total "150 (yen)"

Display by indicator 1015*d*: Second weighed weight "30 (g)"

<After Transaction Completion>

Display by indicator 1015*a*: Purchase weight (converted amount that is converted weighed weight) "0 (spoonfuls)"

Display by indicator 1015*b*: Unit price (second unit price) "100 (yen/spoonful)"

Display by indicator 1015*c*: Total "0 (yen)"

Display by indicator 1015*d*: First weighed weight "0 (g)"

(7) Although description is omitted, in the second embodiment, the weighing device 1010 may issue an alert of the current operation mode (the operation mode at present). For example, in relation to (6) above, the weighing device 1010 may display the current operation mode on a fourth or fifth indicator (display unit 1015). Moreover, the weighing device 1010 may transmit information indicating the current operation mode to another device (for example, the display and printing device 1020, a management device (not illustrated)). The other device that receives the information indicating the current operation mode displays the current operation modes of the respective weighing devices 1010.

(8) Although description is omitted, in the second embodiment, the sales processing system 1001 may manage an operation history (behavior history). For example, the weighing device 1010 may store, as history information, a number of times of weighing in one transaction. For example, in the flowchart in FIG. 26, a process of adding up the number of times of weighing may be provided from step S1001 (YES) to immediately after step S1006 (immediately before step S1007). At step S1008 (YES) and thereafter, the number of times of weighing added up in the process of adding up the number of times of weighing (number of times the purchase amount increased or decreased) may be stored in the storage unit. Note that the types or kinds of the product and the number of times the purchase amount increased or decreased may be analyzed to, as appropriate, change, for example, a tool size for each kind of product so as to reduce the number of times the purchase amount increases or decreases. Moreover, by storing the weight before the increase or decrease in the purchase amount (before the fluctuation in the weighed weight) to compare the weights before and after the increase or decrease, it may be specified whether the increase or decrease in the purchase amount is an increase or a decrease. As appropriate, the tool size or the like may be changed for each kind of product so as to reduce in particular, among the number of times the purchase amount increase or decreases, the number of times the purchase amount decreases.

(9) The second embodiment describes an example in which the weighing device 1010 is provided with no printing unit. However, the weighing device 1010 may be provided with a printing unit that prints and issues the product label (printing unit similar to the printing unit provided by the display and printing device 1020). When the weighing device 1010 is provided with a printing unit, the display and printing device 1020 does not need to be disposed.

(10) The second embodiment describes an example in which the sales processing system 1001 is provided with the plurality of weighing devices 1010. However, the system may be provided with one weighing device 1010.

(1) to (10) above are described. However, the configuration may also be as in (11) to (19) below. Moreover, (1) above to (19) below may be combined as appropriate.

(11) The second embodiment describes an example in which the weighing device 1010 transmits the necessary information (information necessary for the display and printing device 1020 to perform printing, issuing, and the like of the product label) to the display and printing device 1020 and proceeds to the next process (such as the process of erasing the sales price and the like) immediately after transmission (step S1009→step S1010 in FIG. 26). However, a relationship between the process of transmitting the necessary information to the display and printing device 1020 and the process of erasing the sales price and the like is not limited to the example illustrated in FIG. 26.

For example, the weighing device 1010 may erase the sales price and the like on the condition of a predetermined time elapsing from the operation by the customer (operator) (step S1007 in FIG. 26). Note that the weighing device 1010 transmits the necessary information to the display and printing device 1020 before the predetermined time above elapses. That is, like the example illustrated in FIG. 26, the order is the process of transmitting the necessary information to the display and printing device 1020→the process of erasing the sales price and the like. However, instead of erasing the sales price and the like on the condition of the necessary information being transmitted to the display and printing device 1020, the sales price and the like may be erased on the condition of the predetermined time elapsing from the operation by the customer. Moreover, for example, the weighing device 1010 may erase the sales price and the like on the condition of receiving response information (any of the following response information) from the display and printing device 1020 after the necessary information is transmitted to the display and printing device 1020.

When the necessary information is received from the weighing device 1010 (that is, when the preparations of printing and issuing the product label of the product purchased by the customer are completed), the display and printing device 1020 transmits to the weighing device 1010 (replies with) response information indicating that the preparations of printing and issuing the product label are completed. Note that instead of or in addition to the response information indicating that the preparations of printing and issuing the product label are completed, the display and printing device 1020 may, in starting the printing and issuing of the product label, transmit to the weighing device 1010 response information indicating the starting of the printing and issuing of the product label. Moreover, instead of or in addition to the response information indicating that the preparations of printing and issuing the product label are completed or the response information indicating the starting of the printing and issuing of the product label, the display and printing device 1020 may, when the printing and issuing of the product label are completed, transmit to the weighing device 1010 response information indicating the completion of the printing and issuing of the product label.

(12) The second embodiment describes the display and printing device 1020 as printing and issuing the product label based on the information transmitted by the weighing device 1010 (information necessary for the display and printing device 1020 to perform printing, issuing, and the like of the product label) based on the operation by the customer. However, the display and printing device 1020 may display a standby screen prior to receiving the information transmitted by the weighing device 1010; even after receiving the information transmitted by the weighing device 1010, maintain display of the standby screen until an operation by the customer (for example, touching any region or a predetermined region of the standby screen); switch display from the standby screen to a product confirmation screen based on the operation by the customer on the standby screen; and print and issue the product label based on an operation by the customer on the product confirmation screen (operation of a print button disposed on the product confirmation screen).

Furthermore, for example, the display and printing device 1020 may display, instead of the product confirmation screen, a product selection screen whereby the product (product whose product label is waiting to be printed/issued) can be selected. The display and printing device 1020 may print and issue the product label based on an operation by the customer on the product selection screen (for example, an operation of a product button displayed on the product selection screen; the print button may also be operated). Note that in the mode in which the product selection screen is displayed, the standby screen does not need to be displayed but may be displayed. In the latter situation, the display and printing device 1020 may switch from the standby screen to the product selection screen based on the information transmitted by the weighing device 1010 being received. Alternatively, display may be switched from the standby screen to the product selection screen based on an operation by the customer (for example, touching any region or a predetermined region of the standby screen) after the information transmitted by the weighing device 1010 is received.

(13) In a configuration different from (12) above, the display and printing device 1020 may print and issue the product label based on the information transmitted by the weighing device 1010 and not based on the operation by the customer (even without the operation by the customer). When there are few weighing devices 1010 (as one example, when, as described in (10) above, there is one weighing device 1010), the display and printing device 1020 may print and issue the product label even without the operation by the customer. Note that in (11) above, it is described that the response information indicating the starting of the printing and issuing of the product label and the response information indicating the completion of the printing and issuing of the product label may be transmitted to the weighing device 1010. However, for example, the display and printing device 1020 may, when printing and issuing the product label even without the operation by the customer, transmit to the weighing device 1010 the response information indicating the starting of the printing and issuing of the product label and the response information indicating the completion of the printing and issuing of the product label.

(14) Although description is omitted, in the second embodiment, the weighing device 1010 may display a behavioral state (behavioral conditions; may be referred to as "status" below). For example, the weighing device 1010 may be provided with an indicator displaying the current status (may be referred to as "status indicator") and display the current status on the status indicator. Note that the weighing device 1010 is provided with the status indicator as a fourth to sixth indicator according to whether the indicator displaying the weighed weight (first weighed weight, second weighed weight) described in (6) above (indicator 1015*d* in FIGS. 27A-27D; may be referred to as "weighed-weight indicator") and the indicator displaying the current operation mode described in (7) above (not illustrated; may be referred to as "behavior-mode indicator") are provided. That is, the weighing device 1010 is provided with the status indicator as the fourth indicator when provided with neither the weighed-weight indicator nor the behavior-mode indicator, is provided with the status indicator as the fifth indicator when provided with any one among the weighed-weight indicator and the behavior-mode indicator, and is provided with the status indicator as the sixth indicator when provided with both the weighed-weight indicator and the behavior-mode indicator. Note that as described in (6) above, the respective indicators may be referred to as display units, and a plurality of indicators (display units) may be integrated into one.

(15) The status indicator (indicator 1015*e*) of (14) above is described. FIG. 28 is an explanatory diagram for describing the status indicator. For example, as illustrated in FIG. 28, the weighing device 1010 may provide the status indicator (indicator 1015*e*) above the operation unit 1016. Note that the configuration in FIG. 28 is when the weighing device 1010 is provided with the indicator 1015*d* (weighed-weight indicator) in addition to the indicator 1015*a*, the indicator 1015*b*, the indicator 1015*c*, and the indicator 1015*e*. However, as described in (14) above, the weighing device 1010 does not need to be provided with the indicator 1015*d* when provided with the indicator 1015*e*. Moreover, the behavior-mode indicator may be provided instead of or in addition to the indicator 1015*d*. Note that the size of the member in which the indicators 1015*a* to 1015*e* and the operation unit 1016 are disposed (FIGS. 22A-22B, FIG. 28) is one example; it is sufficient for the size of the member to be a size matching the number of indicators disposed and the sizes thereof.

Figure 29A:
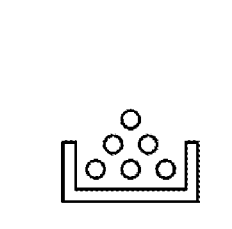
FIG. 29A shows a display example of the status indicator.
Figure 29B:
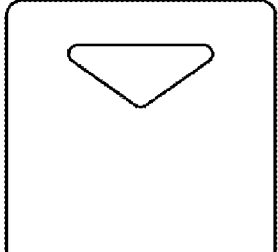
FIG. 29B shows a display example of the status indicator.
Figure 29C:
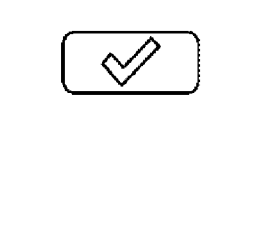
FIG. 29C shows a display example of the status indicator.

FIG. 29A to FIG. 29C are display examples of the status indicator (indicator 1015*e*). Display of the indicator 1015*e* is the same in all operation modes. Because display of the indicator 1015*e* is the same in all operation modes, mode A is described as a representative situation.

In a state in which the weighed weight (weighed value) is fluctuating (also referred to as "weighed-value fluctuating state"), the weighing device 1010 issues an alert on the indicator 1015*e* that the weighed-value fluctuating state is entered into. For example, the weighing device 1010 displays (lights continuously or flashes; likewise below) an image (mark, illustration) such as that illustrated in FIG. 29A on the indicator 1015*e*. In a state in which the weighed weight (weighed value) is stable (also referred to as "weighed-value stable state"), the weighing device 1010 issues an alert on the indicator 1015*e* that the weighed-value stable state is entered into. For example, the weighing device 1010 displays an image such as that illustrated in FIG. 29B on the indicator 1015*e*. In a state after a confirmation operation by the customer (also referred to as "post-confirmation-operation state"), the weighing device 1010 issues an alert on the indicator 1015*e* that the post-confirmation-operation state is entered into. For example, the weighing device 1010 displays an image such as that illustrated in FIG. 29C on the indicator 1015*e*. Note that the post-confirmation-operation state continues until, for example, the sales price and the like are erased (for example, ending when the sales price and the like are erased).

The weighing device 1010 does not display anything on the indicator 1015*e* in a state other than the weighed-value fluctuating state, the weighed-value stable state, and the post-confirmation-operation state (or displays only a background color on the indicator 1015*e*). For example, nothing is displayed on the indicator 1015*e* (or only the background color is displayed on the indicator 1015*e*) in a state before the weighed weight (weighed value) fluctuates (also referred to as "pre-transaction-starting state" or "standby state") and a state in which preparations for the next transaction (for example, erasing the sales price and the like) are being made (also referred to as "pre-transaction-ending state").

The states above (pre-transaction-starting state, weighed-value fluctuating state, weighed-value stable state, post-confirmation-operation state, pre-transaction-ending state) are described using the flowchart in FIG. 26. The pre-transaction-starting state is the state before "Start" in the flowchart in FIG. 26. The weighed-value fluctuating state is a state in which after "Start" (or after step S1008 (NO)), "step S1001→step S1001 (NO)→step S1001→ . . . " is being repeated. The weighed-value stable state is the state of "step S1002 to step S1006 (immediately before step S1007)" after step S1001 (YES). Alternatively, it is a state in which after step S1006, "step S1007→step S1007 (NO)→step S1008→step S1008 (NO)→step S1007→ . . . " is being repeated. The post-confirmation-operation state is the state of step S1009 (immediately before step S1010) after step S1007 (YES). Note that as described in (11) above, there are modes in which the flow does not proceed to step S1010 immediately after step S1009. The pre-transaction-ending state is the state from step S1010 to "End".

That is, a configuration may be such that before the flowchart start of the flowchart in FIG. 26, the weighing device 1010 displays, for example, only the background color on the indicator 1015*e*; at the start of the flowchart (the execution of step S1001), the image of FIG. 29A is displayed on the indicator 1015*e* instead of only the background color; at the execution of step S1002 (or before or after the execution of step S1002), the image of FIG. 29B is displayed on the indicator 1015*e* instead of the image of FIG. 29A; at the execution of step S1009 (or before or after the execution of step S1009), the image of FIG. 29C is displayed on the indicator 1015*e* instead of the image of FIG. 29B; and at the execution of step S1010 (or before or after the execution of step S1010), only the background color is displayed on the indicator 1015*e* instead of the image of FIG. 29C. Note that the weighing device 1010 may, at step S1014, despite being in the pre-transaction-ending state, issue an alert on the indicator 1015*e* that little remains of the product on the platform 1014*a* (display an image (not illustrated) indicating that little remains of the product).

Here, the behaviors in mode D are described. Although the behaviors in mode D are already described in various locations, these are mainly descriptions of behaviors until the sales price and the like are displayed (for example, see "Summary of Behaviors in Mode D"). Thus, the overall behaviors in mode D are described again (for the sake of confirmation). Specifically, the behaviors of the weighing device 1010 behaving in mode D are described according to the flowchart in FIG. 26 illustrating the behaviors of the weighing device 1010 behaving in mode A.

(Behaviors of Weighing Device 1010 Behaving in Mode D)

Step S1001: The weighing device 1010 determines whether the weighed weight is stabilized. If the weighed weight is not stabilized (step S1001: NO), step S1001 is repeated. If the weighed weight is stabilized (step S1001: YES), the flow proceeds to step S1002.

Step S1002: The weighing device 1010 stores the weighed weight as the second weighed weight. Next, the flow proceeds to step S1003.

Step S1003: The weighing device 1010 calculates the difference weight between the standard weight (first weighed weight) and the second weighed weight. Next, the flow proceeds to step S1005. That is, the weighing device 1010 does not execute the process of step S1004 when behaving in mode D.

Step S1005: The weighing device 1010 calculates the sales price based on the first unit price and the difference weight. Next, the flow proceeds to step S1006.

Step S1006: The weighing device 1010 displays the difference weight calculated at step S1003 as the purchase weight. That is, the weighing device 1010 displays the converted amount as the purchase amount when behaving in mode A but displays the difference weight as the purchase amount when behaving in mode D. Moreover, the weighing device 1010 displays the sales price calculated at step S1005 as the sales price (total). Moreover, the weighing device 1010 may display the second weighed weight. For example, as described as the display by the indicator 1015d, the weighing device 1010 may display the second weighed weight on the indicator 1015d. Note that the weighing device 1010 is displaying the first unit price as the unit price from before starting the present flowchart. Next, the flow proceeds to step S1007.

Step S1007: The weighing device 1010 determines whether there was a finalizing operation. If there was a finalizing operation (step S1007: YES), the flow proceeds to step S1009. If there was no finalizing operation (step S1007: NO), the flow proceeds to step S1008.

Step S1008: The weighing device 1010 determines whether the weighed weight fluctuated. If the weighed weight fluctuated (step S1008: YES), the flow returns to step S1001. If the weighed weight did not fluctuate (step S1008: NO), the flow returns to step S1007.

If the weighed weight fluctuated (step S1008: YES), the flow returned to step S1001, and the weighed weight stabilized (step S1001: YES), the weighing device 1010 re-executes step S1002 and the steps subsequent thereto. For the mode in which the weighing device 1010 also displays the second weighed weight at step S1006, the second weighed weight displayed by the weighing device 1010 at the re-executed step S1006 is a weight that is restabilized after the weighed weight that was stable re-fluctuated—that is, the current weight (weight of the articles currently placed on the platform 1014a). That is, the weighing device 1010 displays the first weighed weight or the second weighed weight on the indicator 1015d (see "Display in Mode D"), but both the first weighed weight and the second weighed weight displayed on the indicator 1015d are the current weight at the respective points in time.

Step S1009: The weighing device 1010 transmits the device identification information, the first unit price, the difference weight calculated at step S1003, and the sales price calculated at step S1005 to the display and printing device 1020. That is, the weighing device 1010 transmits the second unit price as the unit price when behaving in mode A but transmits the first unit price as the unit price when behaving in mode D. Moreover, the weighing device 1010 transmits the converted amount as the purchase amount when behaving in mode A but transmits the difference weight as the purchase amount when behaving in mode D. Next, the flow proceeds to step S1010.

Step S1010: The weighing device 1010 erases the difference weight and the sales price displayed at step S1006. That is, the weighing device 1010 erases the converted amount displayed as the purchase amount when behaving in mode A but erases the difference weight displayed as the purchase amount when behaving in mode D. Note that one example of the erasing is, as illustrated in FIG. 27D, making the value zero. However, the value may also be hidden from display. Note that the weighing device 1010 does not need to erase the first unit price. Next, the flow proceeds to step S1011.

Step S1011: The weighing device 1010 stores the second weighed weight stored at step S1002 as the standard weight. Next, the flow proceeds to step S1012.

Step S1012: The weighing device 1010 initializes the second weighed weight stored at step S1002. Next, the flow proceeds to step S1013.

Step S1013: The weighing device 1010 determines whether the standard weight is at or below the warning weight. If the standard weight is at or below the warning weight (step S1013: YES), the flow proceeds to step S1014. If the standard weight is not at or below the warning weight (step S1013: NO), the present flowchart ends.

Step S1014: The weighing device 1010 issues an alert that little remains of the product on the platform 1014a. Specifically, the weighing device 1010 transmits information indicating that little remains of the product on the platform 1014a to the display and printing device 1020.

Note that the weighing device 1010 proceeds to step S1009 (step S1007 (YES)) based on a predetermined operation (finalizing operation) in mode D but may proceed to step S1009 based on another condition (such as elapsed time) as in mode A. This is also the case in mode B and mode C.

Furthermore, in mode D, the weighing device 1010 transmits the device identification information, the first unit price, the difference weight, and the sales price to the display and printing device 1020 (step S1009). However, it is sufficient for the information transmitted to the display and printing device 1020 to be information necessary for the display and printing device 1020 to perform printing, issuing, and the like of the product label, as in mode A. For example, it is sufficient for the weighing device 1010 to transmit at least the difference weight.

(16) Although description is omitted in the second embodiment, a placing process and a re-placing process for the weighing device 1010 in the mode in which the decrease amount of the product placed on the weighing device is made to be the purchase weight (mode A, mode D) are described. The placing process is a process of placing the product (container (such as a platter) containing the product) on a weighing device 1010 that does not have the product (container containing the product) placed thereon. The re-placing process is a process of re-placing the product (container containing the product) on a weighing device 1010 whereon the product (container containing the product) is placed.

As the placing process, the weighing device 1010 may behave as follows (behavior 2→behavior 3→p behavior 4) based on operations such as the following by, for example, the clerk (operation 2→p operation 3→p operation 4). Moreover, as the re-placing process, the weighing device 1010 may behave as follows (behavior 1→behavior 2→behavior 3→behavior 4) based on operations such as the following by, for example, the clerk (operation 1→p operation 2→p operation 3→operation 4).

(Operation 1) The clerk unloads the container containing the product (when the product is sold out, the empty container) from the weighing device 1010 (platform 1014a). Note that when there is residue on the platform 1014a or the platform 1014a is soiled, the clerk removes such.

(Behavior 1) Based on operation 1, the weighing device 1010 starts weighing and displays the weighed value (stabilized weighed value) that has been weighed. Note that because nothing is placed on the weighing device 1010 (platform 1014a), the stabilized weighed value is fundamentally zero but may rarely be a value other than zero. For example, when, at the last weighing, a zero reset (operation 2 below) was performed despite something being placed on the weighing device and the value not being zero, removing this something at the current weighing yields a negative stabilized weighed value.

(Operation 2) The clerk operates (presses) the operation unit 1016 of the weighing device 1010. Note that the clerk operates the operation unit 1016 after the weighed value stabilizes.

(Behavior 2) Based on operation 2, the weighing device 1010 initializes (resets to zero) the stored standard weight and erases (clears) the stored unit price.

(Operation 3) The clerk places the container containing the product on the weighing device 1010 (platform 1014*a*). Note that when re-placing, the product contained in the container placed on the weighing device at operation 3 and the product contained in the container unloaded at operation 1 may be the same or different. The former is re-placement of the same product, and the latter is re-placement that switches to a new product. In re-placement that switches to a new product, the clerk changes the association between the weighing device 1010 and the product. For example, when the display and printing device 1020 is storing the device identification information and the product identification information in association with each other and the product identification information and the unit price (first unit price, second unit price) in association with each other, the clerk changes the product identification information associated with the device identification information of the weighing device 1010 to the product identification information of the new product.

(Behavior 3) Based on operation 3, the weighing device 1010 starts weighing and displays the stabilized weighed value.

(Operation 4) The clerk operates the operation unit 1016 of the weighing device 1010. Note that the clerk may operate the operation unit 1016 after the weighed value stabilizes or operate the operation unit 1016 before the weighed value stabilizes.

(Behavior 4) Based on operation 4 (or the weighed value stabilizing), the weighing device 1010 stores (sets) the weighed value (stabilized weighed value) as the standard weight, transmits information acquisition request information (including the device identification information) to the display and printing device 1020, and receives and stores (sets) the unit price transmitted from the display and printing device 1020. That is, the weighing device 1010, when the clerk operates the operation unit 1016 after the weighed value stabilizes, performs storage and the like of the weighed value as the standard weight based on the operation of the operation unit 1016. When the weighed value stabilizes after the clerk operates the operation unit 1016, storage and the like of the weighed value as the standard weight are performed based on the weighed value stabilizing. Note that the display and printing device 1020, when the information acquisition request information is received, specifies the product identification information from the device identification information included in the information acquisition request information, specifies the unit price from the product identification information, and transmits the unit price to the weighing device 1010.

Note that when the operation (operation 2) of the operation unit 1016 after the product is unloaded is performed before the weighing by behavior 1 ends (during weight fluctuation), the weighing device 1010 invalidates (for example, ignores) the operation (operation 2) and places behavior 2 on hold. Moreover, even when the operation (operation 2) is performed after the weighing by behavior 1 ends (after weight stabilization), if the weighed value at behavior 1 (weighed value stabilized after the product is unloaded) is not within a predetermined range from zero (for example, if not substantially zero), the weighing device 1010 may invalidate (for example, ignore) the operation (operation 2) and place behavior 2 on hold.

Furthermore, regarding the operation (operation 4) of the operation unit 16 after the product is placed on the weighing device, when the weighed value at behavior 3 (weighed value stabilized after the product is placed on the weighing device) is less than a predetermined weight (or at or below the predetermined weight), the weighing device 1010 may invalidate (for example, ignore) the operation (operation 4) and place behavior 4 on hold. For example, when the weighed value at behavior 3 is less than the weight of the container (preset container weight) (that is, when operation 3 is not performed appropriately), the weighing device 1010 may invalidate (for example, ignore) the operation (operation 4) and place behavior 4 on hold. As another example, when the weighed value at behavior 3 is less than a weight that is a predetermined weight (preset minimum placement weight of the product) added to the weight of the container (that is, when the product contained in the container is less than the set minimum placement weight), the weighing device 1010 may invalidate (for example, ignore) the operation (operation 4) and place behavior 4 on hold.

(17) As a special case, in the mode in which the decrease amount of the product placed on the weighing device is made to be the purchase weight (mode A, mode D), a circumstance can arise in which the weighed value (second weighed weight) exceeds the standard weight (first weighed weight). For example, the circumstance in which the weighed value exceeds the standard weight arises when, after the end of a transaction by a certain customer, the customer returns the product to the container on the weighing device 1010 (platform 1014*a*). The weighing device 1010 may issue an abnormality alert when the weighed value exceeds the standard weight. For example, in the flowchart in FIG. 26, when the weighed weight is stabilized (step S1001 (YES)), the weighed value and the standard weight (the weight after the end of the previous transaction stored at step S1011 of the previous transaction) are compared. When the weighed value exceeds the standard weight, the abnormality may be alerted.

Note that although a mode of the abnormality alert is not particularly limited, for example, the weighing device 1010 may issue an alert on the indicator 1015*e* that the weighed value exceeds the standard weight (display an image (not illustrated) indicating that the weighed value exceeds the standard weight). Alternatively, instead of or in addition to the alert by the indicator 1015*e*, a message that the weighed value exceeds the standard weight may be transmitted to a terminal being operated by the clerk. This is also the case in (18) below. Moreover, when the weighed value exceeds the standard weight, the weighing device 1010 may, instead of or in addition to the abnormality alert, stop processing. This is also the case in (18) below. Note that the clerk may execute the re-placing process given in (16) above for the weighing device 1010 for which the weighed value exceeds the standard weight. This is also the case in (18) below.

(18) In relation to (17) above, a circumstance can arise in which the weighed value at the time of the finalizing operation (step S1008 (YES)) (second weighed weight) exceeds the standard weight (first weighed weight). For example, the circumstance in which the weighed value at the time of the finalizing operation exceeds the standard weight arises when, after a certain customer A returns the product to the container on the weighing device 1010 (platform 1014*a*), another customer B (or even the customer A) starts a transaction and the customer B performs the finalizing operation in a state in which the amount taken by customer B is less than the amount returned by the customer A. As in (17) above, the weighing device 1010 may issue an abnormality alert when the weighed value at the time of the finalizing operation exceeds the standard weight.

(19) As already described, the operation unit 1016 can receive various operations. For example, as illustrated in the flowchart in FIG. 26, the operation unit 1016 receives an operation by the customer of finalizing the purchase amount at a time of a transaction (operation of preventing the flow from proceeding to step S1008). Moreover, as illustrated in the flowchart in FIG. 26, the operation unit 1016 receives an operation by the customer of transmitting information to the display and printing device 1020 (operation of proceeding to step S1009). Moreover, as given in (15) above, because the display content of the status indicator changes according to the flowchart in FIG. 26, the operation unit 1016 can also be said to receive an operation of changing the display content of the status indicator. Moreover, according to (16) above, the operation unit 1016 receives an operation of causing the placing process and the re-placing process to proceed.

In other words, despite the operation unit 1016 being one member, the operation thereof yields different effects according to the circumstances of the weighing device 1010. Moreover, different limits and the like are provided in operating the operation unit 1016 according to the circumstances of the weighing device 1010 (that is, for each operation-induced effect). For example, for the re-placing process, a normal transaction is as follows.

(After Unloading Product in Re-Placing Process)

In this situation, the effects of operation the operation unit 1016 (fundamentally performed by the clerk) are as follows.

Effect 1: Zero reset of standard weight

Effect 2: Unit price cleared

However, operation before the end of the weighing following unloading (during weight fluctuation) is invalid. Moreover, even if the operation is after the weighing ends (after weight stabilization), operation when the stabilized weighing is not within the predetermined range from zero may be invalidated.

(After Placing Product on Weighing Device in Re-Placing Process)

In this situation, the effects of operating the operation unit 1016 are as follows.

Effect 1: Stabilized weight set as standard weight

Effect 2: Unit price set (acquired from display and printing device 1020 and set)

Note that operation can even be during weight fluctuation instead of after weight stabilization. When operation is after weight stabilization, the standard weight and the like are set using the operation as a trigger. When operation is during weight fluctuation, the standard weight and the like are set using weight stabilization as a trigger.

However, the operation may be invalidated when the stabilized weight does not meet the container weight (setting weight) or when the stabilized weight does not meet the container weight+a small weight (setting weight). Note that the operation unit 1016 may be provided with an alert function (for example, a light emitting function) and alert a valid state/invalid state of the operation (emitting light when the operation is valid and turning off the light when the operation is invalid). This is also the case in other situations (for example, in a transaction)

(Transactions)

In this situation, the effects of operating the operation unit 1016 (fundamentally performed by the customer) are as follows.

Effect 1: Purchase amount finalized

Effect 2: Information transmitted to display and printing device 1020

Note that operation before the end of the weighing following unloading (during weight fluctuation) is invalid. That is, the flow proceeds to step S1009 in a situation of weight stabilization→operation but does not proceed to step S1009 in a situation of operation during fluctuation→weight stabilization.

As above, one operation unit 1016 has various functions. However, the various functions of the operation unit 1016 may be realized by two or more buttons. For example, a button for finalizing the purchase amount and a button for transmitting information to the display and printing device 1020 may be disposed (prepared) separately.

Furthermore, as already described, the operation unit 1016 may be a button displayed so as to be able to be operated. For example, in FIG. 28, the indicators 1015a to 1015e and the operation unit 1016 are disposed on the member, but the member may be a display unit. That is, the weighing device 1010 may be provided with a display unit (touch panel) displaying display units (display regions) respectively corresponding to the indicators 1015a to 1015e and an operation button corresponding to the operation unit 1016. Note that when operation is invalid, the above operation button may be displayed in a display manner indicating that operation is invalid (for example, grayed-down display). Alternatively, the operation button may be hidden from display.

A review of the second embodiment is given below.

The present invention relates to a weighing device.

For example, a system is known of selling a product by weighing the product (for example, see patent literature 1).

[Patent Literature 1] JP H6-50740 Y2

However, in a conventional system such as that illustrated in patent literature 1, a relationship between product amount and sales price at a stage before actual weighing is hard to understand (that is, it is difficult to grasp what amount will yield what weight (monetary amount)), and there is room for improvement. The present invention is made in view of such circumstances, and one or more embodiments of the present invention provide art for an improvement that makes it easy to understand a relationship between product amount and sales price.

Note that when the relationship between product amount and sales price is hard to understand, a situation of weighing by taking a small amount at a time so as to not take too much of a product, a situation of returning a portion of the weighed product upon taking too much, and a situation of returning the entirety of the weighed product because the sales price indicated after weighing exceeds a monetary amount anticipated before weighing are more likely to arise. That is, when the relationship between product amount and sales price is hard to understand, more time and effort than necessary would be expended. Moreover, regarding the situation of returning the weighed product, an unfavorable appearance may be caused in product display after the product is returned as well as sanitary issues. Moreover, even in a mode in which a customer per se weighs the product, when operations are such that a clerk intervenes when the weighed product is to be returned, the clerk is called over each time a weighed product is to be returned, placing a large burden on the clerk.

(A1) One aspect of the present invention is a weighing device, provided with: a weighing unit (for example, a weighing unit 1014) for weighing a weight of articles; a selling-price calculation unit for calculating a sales monetary amount (for example, 150 yen) based on the weight weighed by the weighing unit (for example, 30 g) and a first unit price according to a first unit weight (for example, 500 yen/100 g) or based on the weight weighed by the weighing unit and a second unit price (for example, 100 yen/spoonful) according to a second unit weight (for example, 20 g per spoonful) that differs from the first unit weight; and a display unit (for example, a display unit 1015) for displaying the second unit price according to the second unit weight that differs from the first unit weight, information based on a conversion result that is the weight weighed by the weighing unit converted into a numerical quantity according to the second unit weight (for example, 1.5 spoonfuls), and a sales price calculated by the selling-price calculation unit.

According to (A1), a relationship between product amount and sales price is easy to understand. That is, using the second unit price, which is easy to intuitively understand, makes it easy to understand the relationship between product amount and sales price.

(A2) The weighing device of (A1), further provided with: a conversion unit or convertor for converting the weight weighed by the weighing unit into a numerical quantity according to the second unit weight.

According to (A2), a numerical quantity according to the second unit weight can be easily obtained.

(A3) The weighing device of (A1) or (A2), wherein the display unit, based on a predetermined condition (for example, after a predetermined operation or upon a predetermined time elapsing), erases the information based on the conversion result and the sales price calculated by the selling-price calculation unit.

According to (A3), the information is suitably erased such that needless confusion can be avoided.

(A4) The weighing device of any among (A1) to (A3), wherein the display unit, when displaying the second unit price, displays the weight weighed by the weighing unit.

According to (A4), the weighed weight can be confirmed together with the second unit price.

(A5) The weighing device of any among (A1) to (A4), wherein the weighing device has a plurality of operation modes that can be changed, and the display unit, in a first operation mode (for example, mode C as given in FIG. 24B), displays the second unit price, the information based on the conversion result, and the sales price and, in a second operation mode (for example, mode B as given in FIG. 24A) that differs from the first operation mode, displays the first unit price instead of the second unit price and displays the weight weighed by the weighing unit instead of the information based on the conversion result.

According to (A5), weighing can be performed by selecting a suitable operation mode.

(A6) One aspect of the present invention is a non-transitory computer-readable medium storing instructions that cause a computer of a weighing device provided with weighing unit for weighing a weight of articles to function as: selling-price calculation unit for calculating a sales monetary amount based on the weight weighed by the weighing unit and a first unit price according to a first unit weight or based on the weight weighed by the weighing unit and a second unit price according to a second unit weight that differs from the first unit weight; and display unit for displaying the second unit price according to the second unit weight that differs from the first unit weight, information based on a conversion result that is the weight weighed by the weighing unit converted into a numerical quantity according to the second unit weight, and a sales price calculated by the selling-price calculation unit.

According to (A6), a relationship between product amount and sales price is easy to understand.

(B1) One aspect of the present invention is a weighing device, provided with: a weighing unit (for example, a weighing unit 1014) for weighing a weight of a product placed on a placement unit (for example, a platform 1014*a*);

a difference-weight calculation unit or calculator for calculating a difference weight (for example, 30 g) between a first weighed weight (for example, 2040 g), which is a weight weighed by the weighing unit and serving as a standard, and a second weighed weight (for example, 2010 g), which is a weight weighed by the weighing unit and differing from the first weighed weight; a selling-price calculation unit for calculating a sales monetary amount (for example, 150 yen) based on the difference weight calculated by the difference-weight calculation unit and a first unit price (for example, 500 yen/100 g) according to a first unit weight or based on the difference weight and a second unit price (for example, 100 yen/spoonful) according to a second unit weight (for example, 20 g per spoonful) that differs from the first unit weight; and display unit (for example, a display unit 1015) for displaying the second unit price, information based on a conversion result of converting the difference weight into a numerical quantity according to the second unit weight (for example, 1.5 spoonfuls), and a sales price calculated by the selling-price calculation unit.

According to (B1), a relationship between product amount and sales price is easy to understand. That is, using the second unit price, which is easy to intuitively understand, makes it easy to understand the relationship between product amount and sales price.

(B2) The weighing device of (B1), further provided with: a conversion unit or convertor for converting the difference weight into a numerical quantity according to the second unit weight.

According to (B2), a numerical quantity according to the second unit weight can be easily obtained.

(B3) The weighing device of (B1) or (B2), wherein the display unit, based on a predetermined condition (for example, after a predetermined operation or upon a predetermined time elapsing), erases the information based on the conversion result and the sales price calculated by the selling-price calculation unit.

According to (B3), the information is suitably erased such that needless confusion can be avoided.

(B4) The weighing device of any among (B1) to (B3), wherein the display unit, when displaying the second unit price, displays the weight weighed by the weighing unit.

According to (B4), the weighed weight can be confirmed together with the second unit price.

(B5) The weighing device of any among (B1) to (B4), further provided with: a storage for storing, based on a predetermined condition (for example, after a predetermined operation or upon a predetermined time elapsing), the second weighed weight as the first weighed weight.

According to (B5), processing for the next transaction (customer) can be executed similarly to the current transaction (customer).

(B6) The weighing device of any among (B1) to (B5), further provided with: a communication unit (for example, a communication unit 1017) for transmitting identification information for identifying the product placed on the placement unit (for example, weighing-device identification information, product identification information) to another device (for example, a display and printing device 1020); wherein the communication unit transmits, together with the identification information, at least the sales price calculated by the selling-price calculation unit to the other device.

According to (B6), for example, a product label can be printed and issued at the other device.

(B7) The weighing device of any among (B1) to (B6), further provided with: an alerting unit or alerting device for issuing an alert when the first weighed weight or the second weighed weight reaches a predetermined weight (for example, a warning weight).

According to (B7), a clerk can be alerted of circumstances regarding a product (remaining amount).

(B8) The weighing device of any among (B1) to (B7), wherein the weighing device has a plurality of operation modes that can be changed, and the display unit, in a first operation mode (for example, mode A as given in FIG. 24A, mode C as given in FIG. 24B), displays the second unit price, the information based on the conversion result, and the sales price and, in a second operation mode (for example, mode D as given in FIG. 24B, mode B as given in FIG. 24A) that differs from the first operation mode, displays the first unit price instead of the second unit price and displays the difference weight or the weight weighed by the weighing unit instead of the information based on the conversion result.

According to (B8), weighing can be performed by selecting a suitable operation mode.

(B9) One aspect of the present invention is a non-transitory computer-readable medium storing instructions that cause a computer of a weighing device provided with a weighing unit for weighing a weight of articles to function as: a weighing unit for weighing a weight of a product placed on a placement unit; a difference-weight calculation unit or calculator for calculating a difference weight between a first weighed weight, which is a weight weighed by the weighing unit and serving as a standard, and a second weighed weight, which is a weight weighed by the weighing unit and differing from the first weighed weight; selling-price calculation unit for calculating a sales monetary amount based on the difference weight calculated by the difference-weight calculation unit and a first unit price according to a first unit weight or based on the difference weight and a second unit price according to a second unit weight that differs from the first unit weight; and a display unit for displaying the second unit price, information based on a conversion result of converting the difference weight into a numerical quantity according to the second unit weight, and a sales price calculated by the selling-price calculation unit.

According to (B9), a relationship between product amount and sales price is easy to understand.

(C1) One aspect of the present invention is a weighing device, provided with: a weighing unit (for example, a weighing unit 1014) for weighing a weight of articles (for example, a container containing a product) placed on a placement unit (for example, a platform 1014a); a display unit (for example, a display unit 1015) that can display (for example, see "Display in Mode D") a first weight (for example, a first weighed weight (standard weight)) weighed by the weighing unit as a weight of articles placed on the placement unit from before the purchase, a second weight (for example, a second weighed weight) weighed by the weighing unit as a weight of articles still placed on the placement unit after a purchase amount (that is, a decrease amount of the product placed on the platform 1014a) is subtracted, a unit price (for example, a first unit price) of the articles, a purchase weight (for example, a difference weight) that is a weight of the articles of the purchase amount calculated from the first weight and the second weight, and a sales price of the articles of the purchase amount calculated from the unit price and the purchase weight; and a transmission unit or transmitter (for example, a communication unit 1017) for transmitting (for example, executing the transmission at step S1009 in FIG. 26) at least the purchase weight after the second weight is displayed by the display unit (for example, after the displaying at step S1006 in FIG. 26).

According to (C1), a relationship between product amount and sales price is easy to understand. For example, at least before transmission (before proceeding to a printing step), the second weight is indicated such that the relationship between product amount and sales price is easy to understand.

(C2) One aspect of the present invention is a weighing device, provided with: a weighing unit (for example, a weighing unit 1014) for weighing a weight of articles (for example, a container containing a product) placed on a placement unit (for example, a platform 1014a); a display unit (for example, a display unit 1015) that can display (for example, see "Display in Mode D") a first weight (for example, a first weighed weight (standard weight)) weighed by the weighing unit as a weight of articles placed on the placement unit from before the purchase, a second weight (for example, a second weighed weight) weighed by the weighing unit as a weight of articles still placed on the placement unit after a purchase amount (that is, a decrease amount of the product placed on the platform 1014a) is subtracted, a unit price (for example, a first unit price) of the articles, a purchase weight (for example, a difference weight) that is a weight of the articles of the purchase amount calculated from the first weight and the second weight, and a sales price of the articles of the purchase amount calculated from the unit price and the purchase weight; and a transmission unit or transmitter (for example, a communication unit 1017) for transmitting (for example, executing the transmission at step S1009 in FIG. 26) at least the purchase weight after the purchase weight is displayed by the display unit (for example, after the displaying at step S1006 in FIG. 26).

According to (C2), a relationship between product amount and sales price is easy to understand. For example, at least before transmission (before proceeding to a printing step), the purchase weight is indicated such that the relationship between product amount and sales price is easy to understand.

(C3) The weighing device of (C1) or (C2), wherein the display unit, after the transmission by the transmission unit (for example, after executing the transmission at step S1009 in FIG. 26), erases (for example, executes the erasing at step S1010 in FIG. 26) or changes to zero the display of at least the purchase weight and the sales price.

According to (C3), unnecessary information is erased or the like as appropriate such that needless confusion can be prevented.

(C4) The weighing device of any among (1) to (3), further provided with: an operation unit or operation device (for example, an operation unit 1016); wherein the operation unit can be operated in a state in which the display unit is displaying the second weight (for example, after the displaying at step S1006 in FIG. 26), the purchase weight is finalized when the operation unit is operated in the state in which the display unit is displaying the second weight (that is, in a state in which weighing of the second weight is stabilized), and the transmission unit transmits at least the finalized purchase weight (for example, executes the transmission at step S1009 in FIG. 26).

According to (C4), processing can proceed after the weight stabilizes.

(C5) The weighing device of any among (C1) to (C3), further provided with: an operation unit or operation device; and a zero reset unit implemented by the CPU for resetting the first weight to zero; wherein the operation unit can be operated in a state in which no articles are placed on the placement unit or in a state in which there is a change from the state in which no articles are placed on the placement unit to a state in which articles are placed thereon; the zero reset units, when the operation unit is operated in the state in which no articles are placed on the placement unit, resets the first weight to zero based on the operation; the transmission unit, when, in the state in which there is a change from the state in which no articles are placed on the placement unit to the state in which articles are placed thereon, the operation unit is operated before the weighing by the weighing unit stabilizes, transmits information requesting the unit price of the articles based on the weighing by the weighing unit stabilizing and, when, in the state in which there is a change from the state in which no articles are placed on the placement unit to the state in which articles are placed thereon, the operation unit is operated after the weighing by the weighing unit stabilizes, performs a zero reset of the first weight based on the operation.

According to (C5), a re-placing process can be suitably executed.

Note that a program or instructions for realizing the devices described in the first embodiment and the second embodiment (for example, the weighing device 3, the weighing device 7, the information terminal 4, and the like in the first embodiment and the weighing device 1010, the display and printing device 1020, and the like in the second embodiment) may be recorded on a computer-readable recording medium, and this program or instructions may be read and executed by a computer system. As referred to here, a "computer system" includes OSs and hardware such as peripherals. Moreover, "computer-readable recording medium" refers to a portable medium such as a flexible disk, a magneto-optical disc, a ROM, or a CD-ROM or to a storage device such as a hard disk built into a computer system. Moreover, a "computer-readable recording medium" also includes a medium that retains a program or instructions for a certain time, such as a volatile memory (RAM) in a computer system serving as a server or client when the program or instructions are transmitted via a network such as the internet or a communication circuit such as a telephone circuit. Moreover, the above program or instructions may be transmitted from a computer system storing this program or instructions in a storage device or the like to another computer system via a transmission medium or by a transmitted wave in a transmission medium. Here, the "transmission medium" transmitting the program or instructions refers to a medium having a function of transmitting information, such as a network (communication network) such as the internet or a communication circuit (communication line) such as a telephone circuit. Moreover, the above program or instructions may be for realizing a portion of the functions described above. It may also be a program or instructions that can realize the functions described above by being combined with a program or instructions already recorded in a computer system—a so-called differential file (differential program or instructions).

Combinations of First Embodiment and Second Embodiment

The first embodiment is described above using FIG. 1 to FIG. 20E, and the second embodiment is described above using FIG. 20A to FIG. 29C. However, the content described as the first embodiment and the content described as the second embodiment may be combined as appropriate. That is, the content described as the first embodiment may be applied to the second embodiment as the content of the second embodiment, and the content described as the second embodiment may be applied to the first embodiment as the content of the first embodiment. Combination examples are given below.

(1) The weighing device 1010 of the second embodiment may be used in the first unit U1 of the first embodiment. That is, the weighing device 1010 of the second embodiment may be used instead of or in addition to the weighing device 3 constituting the first unit U1. As above, in the first unit U1, the weighing device 3 weighs the articles supplied from the article supplying device 2a. Therefore, when using the weighing device 1010 in the first unit U1, the weighing device 1010 is made to behave in an operation mode in which the placement amount of the product is made to be the purchase weight (mode B or mode C). Moreover, in the weighing device 3, display such as that of FIG. 29A to FIG. 29C may be performed. Moreover, in the weighing device 1010, display such as that of FIG. 20A to FIG. 20E may be performed.

(2) The weighing device 1010 of the second embodiment may be used instead of or in addition to the weighing device 7 of the first embodiment. As above, the weighing device 7 weighs the weight of articles placed thereon. Therefore, when using the weighing device 1010 instead of or in addition to the weighing device 7, the weighing device 1010 is made to behave in an operation mode in which the placement amount of the product is made to be the purchase weight (mode B or mode C). Moreover, in the weighing device 7, display such as that of FIG. 29A to FIG. 29C may be performed. Moreover, in the weighing device 1010, display such as that of FIG. 20A to FIG. 20E may be performed.

(3) The weighing device 1010 of the second embodiment may be used in the third unit U3 of the first embodiment. That is, the weighing device 1010 of the second embodiment may be used instead of or in addition to the weighing unit provided by the article supplying device 5 constituting the third unit U3. As above, in the third unit U3, a weight of articles in the retention body is weighed. Therefore, when using the weighing device 1010 in the third unit U3, the weighing device 1010 is made to behave in an operation mode in which the decrease amount of the product placed on the weighing device is made to be the purchase weight (mode A or mode D). Moreover, in the third unit U3, display such as that of FIG. 20A to FIG. 20E or display such as that of FIG. 29A to FIG. 29C may be performed.

(4) The weighing device 1010 whereon the platter P is placed that is described in the first embodiment (see FIG. 22B) may be disposed on the shelf 6 of the first embodiment. For example, the size of the shelf 6 may be changed (changed so as to increase, for example, the space between the shelf board 61 and the shelf board 63) so the weighing device 1010 whereon the platter P is placed can be disposed.

(5) In the first embodiment, the display and printing device 1020 may be used instead of or in addition to the information terminal 4.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

73

REFERENCE SIGNS LIST

1: weighing sales system
2a, 2b, 5: article supplying device
21: accumulation unit; 22: supply unit; 23: operation unit; 24: supply port unit; 24a: supply port
3: weighing device; 31: main body; 31a: input port; 31b: provision port; 32: guiding body; 33: display unit; 34: operation unit; 35: support unit; 36: communication unit; 37: weighing unit; 371: weight detection unit; 372: AD converter; 3A identification information storage unit 301: detection processing unit; 302: display control unit; 303: communication processing unit
4: information terminal; 41: display unit; 42: communication unit; 43: issuing unit; 4A: article information storage unit; 4B: setting information storage unit; 401: specifying processing unit; 402: extraction processing unit; 403: calculation processing unit; 404: display control unit; 405: information processing unit; 406: communication processing unit; 407: issuing processing unit
6: shelf
7: weighing device; 71: main body; 71a: input port; 71b: provision port; 72: guiding body; 73: first display unit; 74: operation unit; 75: support unit; 76: second display unit
G11, G21, G31: first information display region
G12, G23, G33: operation object
G22, G32: second information display region
R: adjustment label
U1: first unit
U2: second unit
U3: third unit
1001: sales processing system
1010: weighing device
1011: CPU
1012: ROM
1013: RAM
1014: weighing unit
1015: display unit
1016: operation unit
1017: communication unit
1020: display and printing device

What is claimed is:

1. A weighing sales system comprising:
weighing devices that each comprise:
a main body that houses articles and comprises:
an input port that is formed in an upper surface of the main body and is open from a front-surface side to a backward through a central portion of the main body, and
a provision port that is formed in the bottom surface and from which the articles are discharged;
a guiding container that fits into the main body and has a shape narrowing from above toward the provision port, wherein the articles are charged through the guiding container;
a load cell that is disposed in the main body and measures a weight of the articles housed in the guiding container;
a display that displays the weight measured by the load cell;
a support leg that is disposed on a bottom surface of the main body and supports the main body horizontally, wherein the provision port is formed at a front-surface side of the main body with respect to the support leg;

a lever that operates a pair of lids to open and close the provision port; and
a weighing device processor that
transmits the weight measured by the load cell and identification information of each of the weighing devices; and
an information terminal that comprises:
a terminal processor that:
receives the weight measured by the load cell and the identification information, and
acquires article information from a predetermined storage based on the identification information.

2. The weighing sales system of claim 1, wherein the weighing device processor transmits the weight measured by the load cell and the identification information when a detection value of the weight stabilizes in each of the weighing devices.

3. The weighing sales system according to claim 1, wherein
the information terminal comprises a display, and
the terminal processor causes the display to display, based on the article information:
information on the weight and on a sales price depending on the weight, and
an operation object that receives an operation to complete registration of the articles.

4. The weighing sales system according to claim 1, wherein
the information terminal comprises a display, and
the terminal processor causes the display to display:
information display regions for plural kinds of the articles weighed by the weighing device, wherein each of the kinds of the articles is selectable by an operation in each of the information display regions, and
upon selection of plural kinds of the articles by the operation in each of the information display regions, a number of the kinds of the articles and a sum of sales prices of the kinds of the articles.

5. The weighing sales system according to claim 1, wherein the information terminal comprises a display, and
the terminal processor causes the display to display:
first information display regions for plural kinds of articles each displaying information on a weight of each kind of the articles, wherein each kind of the articles is selectable by an operation in each of the first information display regions;
upon selection of plural kinds of the articles by the operation in each of the first information display regions, a second information display region that displays a number of the kinds of the articles and a sum of sales prices of the kinds of the articles; and
an operation object that receives an operation to complete registration of the selected kinds of the articles, wherein
in response to the operation object being pressed in a state that the plural kinds of the articles are being selected, the terminal processor outputs a weight ratio of the selected kinds of the articles.

6. The weighing sales system of claim 1, further comprising:
a plurality of article supplying devices that are disposed above the weighing devices and house the plural kinds of the articles, respectively, wherein
each of the article supplying devices supplies each of the kinds of the articles to each of the weighing devices.

75

76

7. A weighing device comprising:

a main body that houses articles and comprises:

an input port that is formed in an upper surface of the main body and is open from a front-surface side to a backward through a central portion of the main body, and a provision port that is formed in the bottom surface and from which the articles are discharged;

a guiding container that fits into the main body and has a shape narrowing from above toward the provision port, wherein the articles are discharged through the guiding container;

a load cell that is disposed in the main body and measures a weight of the articles housed in the guiding container;

a display that displays the weight measured by the load cell;

a support leg that is disposed on a bottom surface of the main body and supports the main body horizontally, wherein the provision port is formed at a front-surface side of the main body with respect to the support leg; and a lever that operates a pair of lids to open and close the provision port.

\* \* \* \* \*